United States Patent [19]

Haselby et al.

[11] Patent Number: 4,567,565
[45] Date of Patent: Jan. 28, 1986

[54] APPARATUS AND METHOD FOR PEN-LIFT SYSTEM

[75] Inventors: Robert D. Haselby, Escondido; Samuel R. Haugh, Mountain View; Lowell J. Stewart, San Diego, all of Calif.

[73] Assignee: Hewlett-Packard Company, Palo Alto, Calif.

[21] Appl. No.: 317,980

[22] Filed: Nov. 3, 1981

[51] Int. Cl.[4] .............................................. G05B 19/18
[52] U.S. Cl. ...................................... 364/520; 346/29; 318/571; 318/574; 364/167
[58] Field of Search ............... 364/520, 558, 559, 560, 364/561, 562, 167, 474, 475, 478; 340/520; 346/33 A, 112, 116, 30, 141, 29, 139 R; 33/1 M, 18 R; 178/18, 19; 318/574, 575, 571; 901/1, 16

[56] References Cited

U.S. PATENT DOCUMENTS

| | | | |
|---|---|---|---|
| 3,609,319 | 9/1971 | Clifford et al. | 364/520 |
| 3,633,087 | 1/1972 | Vawter et al. | 318/574 |
| 3,749,995 | 7/1973 | Leenhouts | 318/574 |
| 3,753,384 | 8/1973 | Anfindsen | 346/141 |
| 3,864,695 | 2/1975 | Nagashima et al. | 346/139 R |
| 3,887,796 | 6/1975 | Trousdale et al. | 364/520 |
| 3,893,616 | 7/1975 | Trousdale | 364/520 |
| 3,904,858 | 9/1975 | Rosshirt | 364/167 |
| 4,062,648 | 12/1977 | Hennessee | 364/520 |
| 4,115,858 | 9/1978 | Kaufman | 364/474 |
| 4,415,967 | 11/1983 | Russell | 364/474 |

Primary Examiner—Errol A. Krass
Assistant Examiner—Thomas G. Black
Attorney, Agent, or Firm—Douglas A. Kundrat; Joseph H. Smith

[57] ABSTRACT

A pen-lift system is provided which can achieve high speed plotting while maintaining line definition of drafting quality. The system includes a pen-lift mechanism for raising and lowering the pen, a pressure control system in order to provide a constant pen force for different kinds of pens, a velocity controller for varying the vertical velocity of the pen in response to changes in platen height and relative lateral pen position, and a position controller for sensing the present pen height relative to the platen and for actuating the pen-lift mechanism to achieve the desired pen-lift heights for different plotting situations.

25 Claims, 10 Drawing Figures

APPARATUS AND METHOD FOR PEN-LIFT SYSTEM

BACKGROUND OF THE INVENTION

This invention relates to X-Y plotters, and in particular to an adaptive servo-controlled pen-lift system for raising and lowering a pen relative to a platen in such a plotter.

Generally, the pen-lift system in a high quality plotter becomes as important as the lateral positioning system if plots of drafting quality are to be obtained. For example, even if the lateral positioning system moves the pen accurately in a straight line, a drafting quality line will not result if there is uncontrolled pen bounce or if there is an incorrect pen force.

In the past, pen-lift systems have typically used a spring system to hold the pen to the recording medium and platen with a prescribed force, that force depending on the weight of the pen and pen carriage, the effective force constant of the spring system, and the pen-lift height. Attempts have been made to control pen bounce through spring damping systems of various kinds. In most implementations, the complications inherent in such mechanically intensive systems have led to two-state pen-height system, i.e., pen-up or pen-down.

It is important to note that such two state systems are manifestly inefficient in the often encountered plotting situation, e.g., lettering or drafting dashed lines, in which many pen lifts are required. Despite the fact that most pen strokes in these situations are in close proximity, the pen travels to its full height between successive separate strokes. Hence, a substantial amount of time is spent raising and lowering the pen rather than in plotting.

To date, no available plotting system has been developed which utilizes a feedback control system adaptive to platen height irregularities to control pen bounce and to increase the plotting speed by controlling pen-lift height.

SUMMARY OF THE INVENTION

In accordance with the illustrated preferred embodiment of the present invention, a pen-lift system achieves high speed plotting while simultaneously maintaining line definition of drafting quality. The system includes a pen-lift mechanism for raising and lowering the pen, a pressure control system for providing a constant pen force, a velocity controller for varying the vertical velocity of the pen in response to changes in platen height and relative lateral pen position, and a position controller for sensing the present pen height relative to the platen and for actuating the pen-lift mechanism to achieve the desired pen-lift heights for different plotting situations.

The pen-lift mechanism is a voice coil actuator for providing a constant pen force which is linearly dependent on coil current and which is independent of pen position. The pressure control system effectuates this constant pen force via a microprocessor controlled force adjustment potentiometer to supply suitable magnitudes of current to the voice coil actuator. Eight different levels of pen force are selectable by the user with this system by utilizing a 3-bit force selector A/D converter.

The pen position controller and velocity controller form an interactive system under microprocessor control for raising and lowering the pen more quickly than is possible in systems encountered in the prior art. Variations in platen height from one lateral position to another are reasonably small for small lateral distances. Hence, if the pen is to plot a series of vectors in which the end point of one is close to the beginning point of another, then it is necessary to lift the pen a small distance in order to clear the writing medium before the pen is moved from the end point of one vector to its next location, the beginning point of the succeeding vector. This process is achieved by storing the height of the pen in contact with the writing medium just prior to pen-lift. In this way, the pen may be lifted during successive operations based on its last vertical position rather than relative to some artificial reference.

Furthermore, knowing the last height of the pen allows appropriate velocity control. Only when the pen is within a certain distance of the platen is a low vertical pen velocity required in order to avoid damage to the pen on impact. Hence, for high pen lifts which are necessary in moving the pen a substantial distance, the uppermost portion of the pen drop may occur at a relatively high velocity, followed by a terminal portion at a sufficiently low velocity to avoid pen damage. Control of the pen drop velocity in this manner provides a substantial increase in plotting speed.

DESCRIPTION OF THE PREFERRED EMBODIMENT

Figure 1:
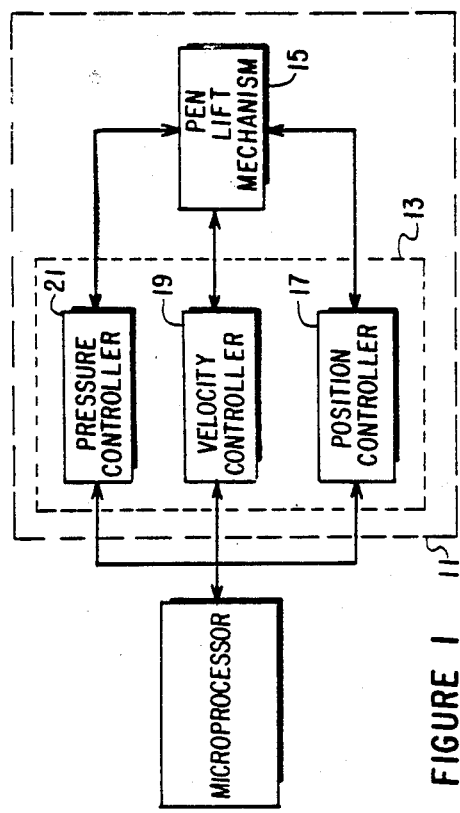
FIG. 1 is a block diagram showing the general relationship of the major components of the preferred embodiment of the present invention.

FIG. 1 shows a pen-lift control system 11 of the preferred embodiment of the present invention. The system 11 includes a control system 13 and a pen-lift mechanism 15, both of which may be included, for example, in a plotter apparatus. Operating under computer (microprocessor) control, the control system 13 controls the pen-lift mechanism 15 and, hence, the pen-lift operations of the plotter. Control system 13 includes a pen position controller 17, a pen velocity controller 19, and a pen pressure controller 21. Taken together, the lift mechanism 15 and the control system 13 form an adaptive servo system.

Figure 2:
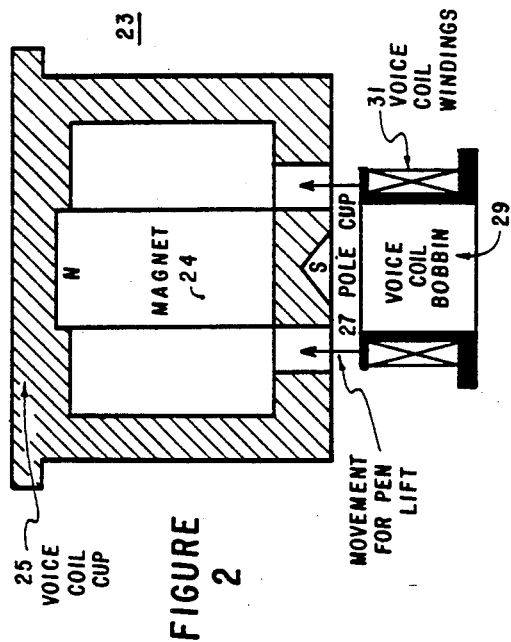
FIG. 2 shows the details of a voice coil system used to effect the pen-lift.

FIG. 2 shows the pen-lift mechanism 15, including a voice-coil actuator (linear pen actuator) 23 having a magnet 24, a voice-coil cup or housing 25, a pole cup assembly 27, and a voice coil bobbin 29 with windings 31 for moving a pen-lift arm (with or without a pen) vertically downward onto, or up and away from, a medium such as paper on a platen.

Figure 3A:
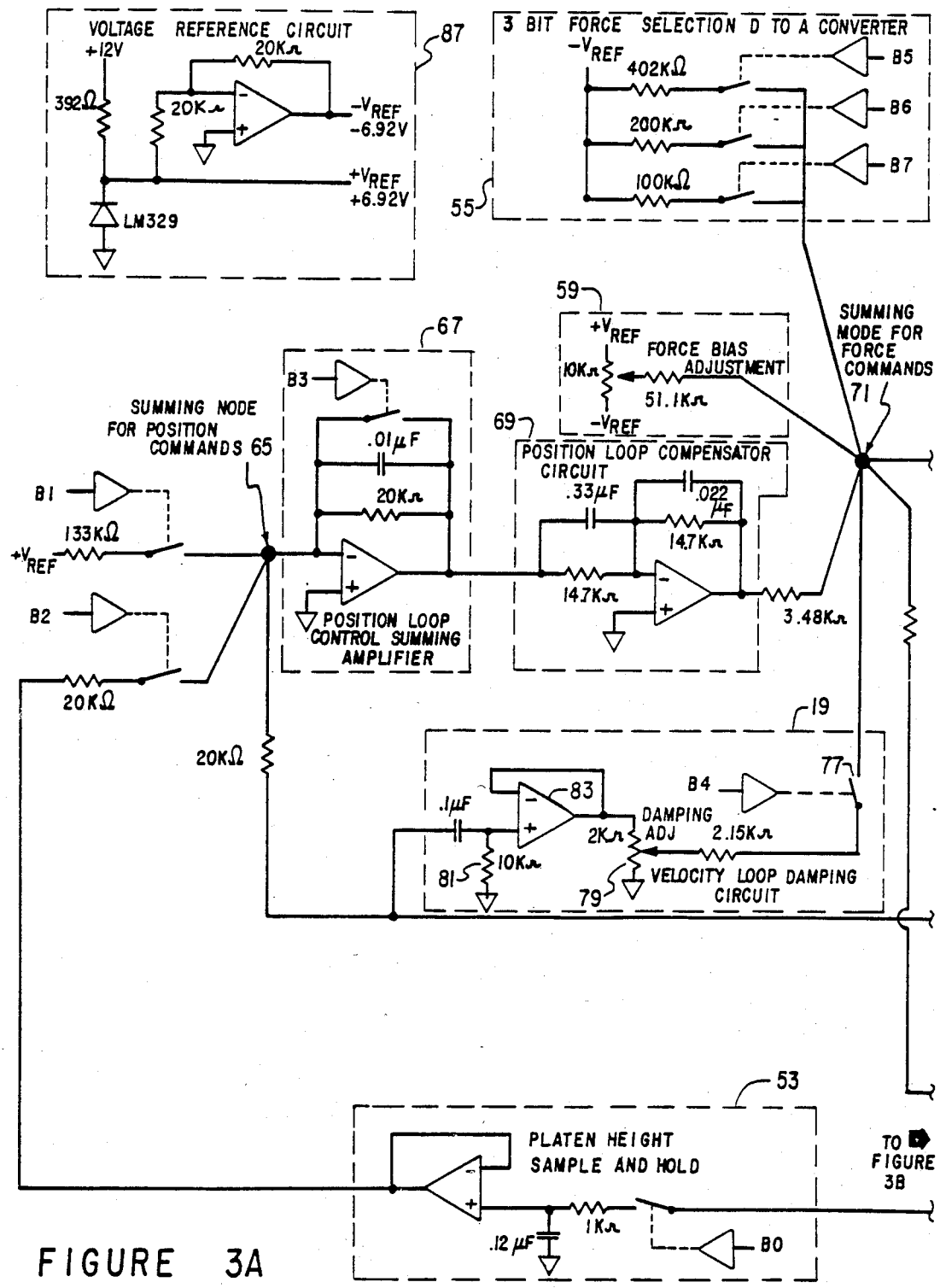
FIGS. 3A and 3B show a schematic of the pen-lift control system.
Figure 3B:
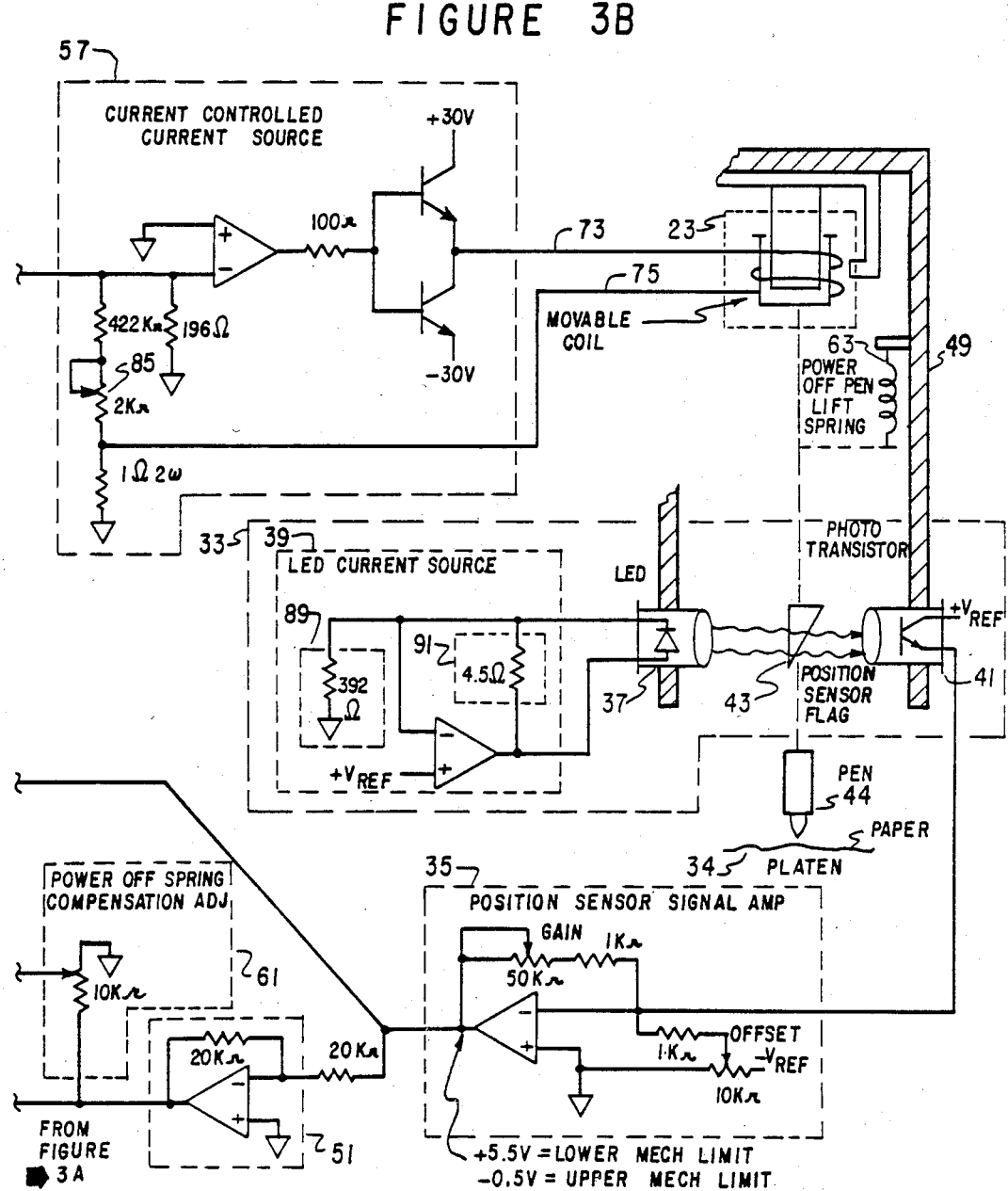
Figure 4:
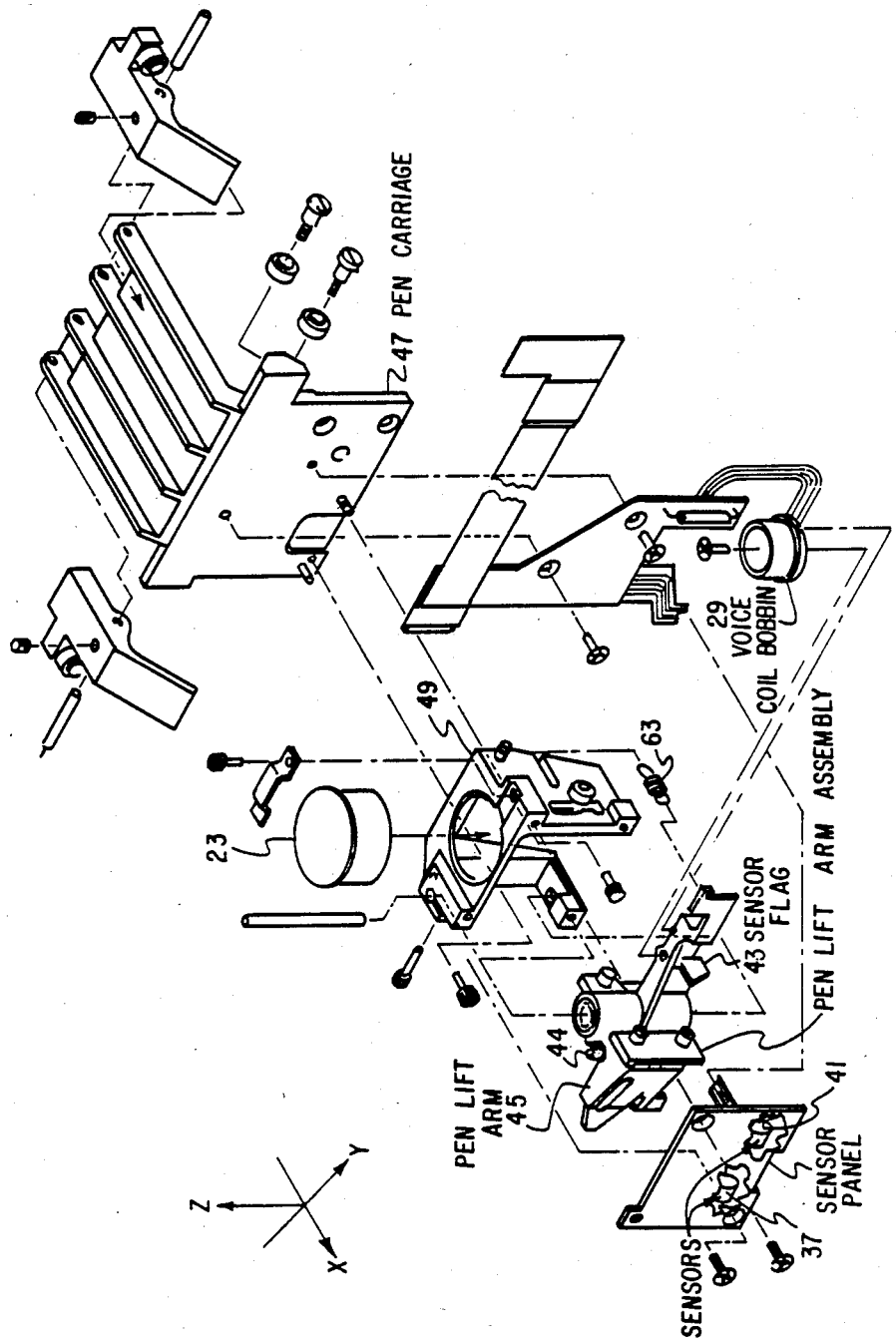
FIG. 4 is a diagram showing the mechanical configuration of the pen-lift system.

Referring to FIG. 3, position controller 17 (not particularly shown) includes an optical position sensor 33, and a position sensor signal amplifier 35. The position sensor 33 includes a light-emitting diode (LED) 37 with a current source 39, a phototransistor 41, and an opaque shutter or flag 43 positioned for movement with actuator 23 affixed to pen-lift arm 45 (shown in FIG. 4) carried by pen carriage 47. Flag 43 is disposed a selected distance from the LED 37 for movement relative to the LED 37 in accordance with the action of actuator 23 and, hence, with movement of lift arm 45. The LED 37 and the phototransistor 41 are fixed with respect to the pen-lift housing 49 (shown in FIG. 3) such that the optical path between them, and hence the infrared beam from LED 37 to phototransistor 41, can be partially occluded in proportion to the position of flag 43 attached to the pen actuator 23. The optical position sensor 33 senses the voice coil actuator position relative to the pen-lift carriage frame by sensing the amount of light reaching phototransistor 43 due to occlusion by flag 43.

Figure 5:
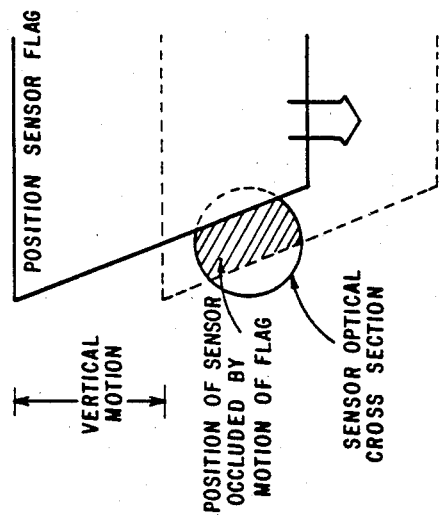
FIG. 5 illustrates the function of the optical position sensor.

As shown in FIG. 5, an end portion of the flag 43 may be slanted at, for example, a thirty degree angle causing it to block varying portions of the beam from LED 37 as the pen arm 45 moves up and down in accordance with the action of actuator 23. Although not shown, the optical position sensor 33 is temperature compensated to render it substantially insensitive to temperature changes that would ordinarily affect the optical output of LED 37, and the gain of phototransistor 33.

As shown in FIG. 3, the output of position sensor 33 is amplified by amplifier 35, then inverted by an invertor 51 before being stored by a sample and hold circuit 53. Under microprocessor control, this circuit 53 stores a voltage representing the pen position (i.e., the vertical or Z-axis position of a pen 44 in pen arm 45, just prior to the last (immediately previous) pen-lift. This stored pen position signal represents the position of pen arm 45 relative to pen-lift carriage 47 when pen tip 44 was last down and in contact with the writing medium. Exactly how this sampled position signal is used is described as follows.

Figure 6C:
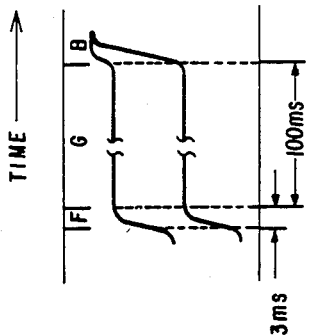
FIGS. 6A, 6B, and 6C illustrate pen position as a function of time for different pen commands.
Figure 6B:
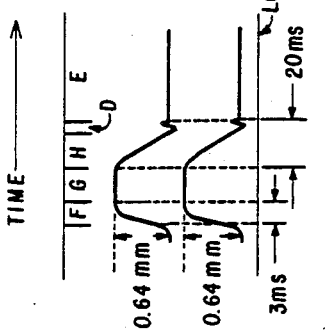
Figure 6D:
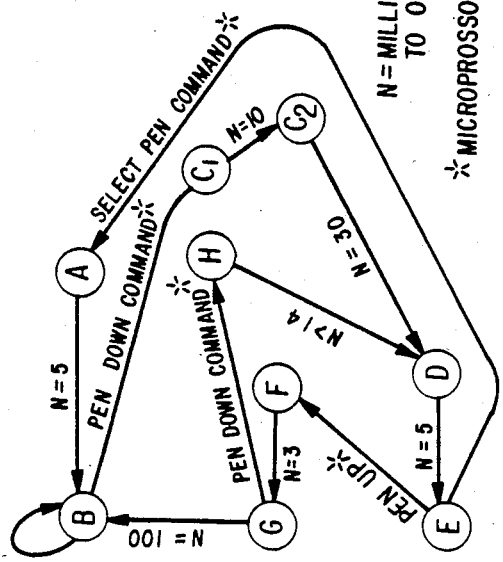
FIG. 6D is a state diagram of the pen-lift system.
Figure 6A:
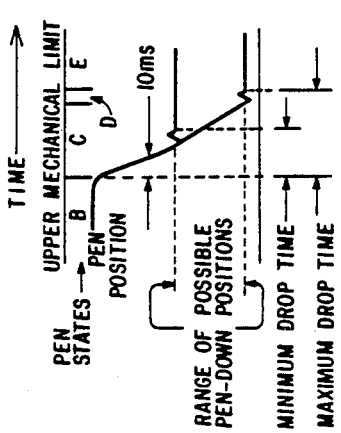

In a pen-up or position control mode of operation, switches B0 through B7 are opened by the microprocessor. The all switches open condition causes the pen 44 to be lifted (raised) to its full up position until the output of the optical position sensor 33 becomes substantially zero. (A sensor offset potential signal amplifier 35 shown in FIG. 3 is adjusted so that this full up position is approximately 0.025 mm below the upper mechanical limit of travel.) In a velocity-control mode of operation, the pen 44 is lowered at a controlled rate (velocity) onto the platen 34. In this mode, switches B3, B4, B5, B6, and B7 are closed while switches B0, B1, and B2 are opened. The closing of switch B3 by the microprocessor disables the pen-lift position control loop operation by setting the gain in the position control loop to zero. In the velocity-control mode, switches B5, B6, and B7 apply a downward input force signal, and switch B4 applies a velocity feedback signal to the input of voice coil drive amplifier 57 (current controlled current source). Approximately ten milliseconds after entering this mode, switches B5 and B7 are opened by the microprocessor. This results in a high initial velocity for the first ten milliseconds, and a slower constant velocity (e.g., approximately 4 mm/sec) until the pen 44 contacts the platen 34, as shown in FIG. 6A. Thus, after a long move (i.e., a move greater than 100 ms in elapsed time), the pen 44 is dropped at a high initial velocity then at a slower constant velocity. As shown in FIG. 6B, during short lateral moves, the pen 44 is lifted a smaller distance above the current platen 34 height and is then dropped after the move to the same platen 34 height. Further, as shown in FIG. 6C, if a pen-up move takes longer than 100 ms, the pen 44 is raised to its upmost or full up position and the move is treated as a long move for purposes of subsequent pen movement. Also, it should be noted that although a short travel time condition (e.g., a long pen combined with a high spot in the writing surface produces a short travel time of about 20 ms) may result, because this condition is not known prior to the move, a full delay period (e.g., 45 ms) must elapse before start of writing and commencement of lateral pen motion.

With respect to the level of writing force selected to match the type of pen 44 used (fiber tip, ball point or drafting) eight levels of writing force may be set by microprocessor control of switches B5, B6, and B7. These switches control the output current of a 3-bit force selection A/D converter 55 (shown in FIG. 3) which is applied to the input of the current-controlled current source output amplifier 57. This results in application of a constant pen 44 force since the voice-coil force is independent of pen position and is linearily dependent on coil current. Other input signals to the output amplifier 57 are applied from a force bias adjustment circuit 59 and from a power-off pen-up spring compensator adjustment 61. Spring compensator adjustment 61 feeds back a signal that is proportional to the actuator 23 position and minimizes the effect of the power-off pen-up spring 63 upon the commanded pen force from the microprocessor. This adjustment and the force bias adjustment are required since tolerances of springs are generally not closely controlled. Once the commanded force is applied (i.e., the force pursuant to the command signal) an additional 5 ms is allowed for pen settling before lateral pen motion is started.

At the time the microprocessor sets the force by application of selected signals via switches B5, B6, and B7, it also closes switch B3 which disables the position mode and switch B0 which sets the platen height sample-and-hold circuit 53 to the sample state enabling this circuit's output to now follow and track the pen 44 position as the pen 44 moves in the lowered position to trace a vector.

When the end of a vector is reached and a pen-up command signal is recognized by the microprocessor, the following state changes take place. First, the platen-height sample-and-hold circuit 53 is placed in the hold state by the microprocessor opening switch B0. This causes a voltage level to be stored representing the present platen position of the pen 44. The microprocessor also opens force input switches B5, B6, and B7 at this time. Next, the position mode is enabled by the opening of switch B3 and the closing of switches B1 and B2. This causes the pen 44 to lift about 0.64 mm above its last pen-down position. This lift requires only about a 3 ms delay before lateral pen-up movement can begin. In the event a pen-up time, caused by a long movement or no further commands, lasts longer than 100 ms, the pen position control status is modified by the opening of switches B1 and B2. This modification results in the pen 44 being lifted to the full up position and to the state associated therewith, namely, a subsequent initial high velocity pen drop followed by a predetermined lowered velocity pen drop. Where the pen up time is less than 100 ms, the pen 44 drops at a predetermined lower velocity, but this time the approximate distance that the pen 44 must travel is known and a combined drop time and settling time of only 20 ms is found to be satisfactory. This shows that plotting involving short pen-up moves saves about 25 ms per pen lift cycle. A lateral pen-up move of about 6 cm takes about 100 ms. It is assumed that the platen irregularities are smooth enough that the required pen height will not change significantly in less than that distance. Of course, other values of time and distance for negligible irregularities may be assumed.

A safety shutdown circuit (not shown) may be included in the pen lift mechanism to prevent damage to the voice coil by excessive power dissipation that could be caused by either a malfunction or misadjustment of the mechanism.

From the foregoing, therefore, it is shown that, whereas time spent lifting and lowering the pen of a plotter is time not spent plotting, the system disclosed herein reduces the time spent lifting and lowering the pen. This is especially beneficial when the plotting task is pen-lift intensive, as when alphanumeric characters and symbols are written. The actual pen-lift rates selected (in response to pen-up and pen-down command signals from the microprocessor) are approximately 36 cycles per second for the short lift cycle and approximately 17 cycles per second for the high lift cycle.

Returning now to FIG. 3, the interaction of the various circuit elements including pen position controller 17, pen velocity controller 19, and pen pressure controller 21, is described in greater detail below. Pen position controller 17 (shown in block form in FIG. 1 and shown as a position control loop in FIG. 3) includes input node 65 (a summing node for receiving pen position command signals from the microprocessor controlled switches B1 and B2), position summing amplifier 67, position compensator circuit 69, current controlled current source 57, feedback or sensor circuit 33, and position sensor signal amplifier 35. Position command signals from the microprocessor, and feedback signals from amplifier 35 are summed at node 65 and are applied to position control loop summing amplifier 67 (which is also a gain control stage) for enabling the position control loop. The output signal from summing amplifier 67 is given phase lead by a compensator circuit 69, the output then being applied, via node 71, to current source 57. The output of current source 57 is then applied via conductors 73, 75 to voice coil actuator 23. Thus, the effective output of position controller or control loop 17 is a control current applied to voice coil actuator 23 in response to signals applied from the microprocessor and from feedback amplifier 35. The voice coil actuator 23 has a predetermined linear force to current ratio (for example, 100 grams per ampere). Upon passage of current through the windings 31 (shown in FIG. 2) of the voice coil bobbin 29, the voice coil bobbin 29 slides up and down over the magnetic pole piece 24, moving with it flag 43, pen-lift arm 45 (shown in FIG. 4), and any pen 44 that may be positioned in the arm.

The following Table I, when read in conjunction with FIGS. 6A, 6B, 6C, and 6D serves to explain the various states that the pen-lift control system 11 is made to assume.

TABLE I

MICROPROCESSOR CONTROLLED BIT STATE
(Each 1 bit represents a closed switch condition.)
(F0, F1, and F2 are binary pen-down force parameters selectable by a user.)

| STATE | B7 FORCE CONT. | B6 FORCE CONT. | B5 FORCE CONT. | B4 DAMP- ING 1 = ON 0 = OFF | B3 POSITION LOOP CONT. 1 = OPEN 0 = CLOSED | B2 SHORT LIFT DISTANCE | B1 SHORT LIFT REFERENCE | B0 SAMPLE HOLD CONT. 1 = TRACK 0 = HOLD | COMMENTS |
|---|---|---|---|---|---|---|---|---|---|
| A | 0 | 0 | 0 | 0 | 0 | 0 | 0 | 0 | Full-Up Stationary |
| B | 0 | 0 | 0 | 0 | 0 | 0 | 0 | 0 | Full-Up Mobile |
| C1 | 1 | 1 | 1 | 1 | 1 | 0 | 0 | 0 | Long Drop 1st 10 msec |
| C2 | 0 | 1 | 0 | 1 | 1 | 0 | 0 | 0 | Long Drop Last 30 ms (next 30 ms) |
| D | F2 | F1 | F0 | 1 | 1 | 0 | 0 | 1 | Down Stationary |
| E | F2 | F1 | F0 | 1 | 1 | 0 | 0 | 1 | Down Mobile |
| F | 0 | 0 | 0 | 0 | 0 | 1 | 1 | 0 | Short Lift Stationary |
| G | 0 | 0 | 0 | 0 | 0 | 1 | 1 | 0 | Short Lift Mobile |
| H | 0 | 1 | 0 | 1 | 1 | 0 | 0 | 0 | Short Drop |

In the above Table and in FIGS. 6A, 6B, 6C and 6D, state B represents long pen-up moves, states C1, C2, and D (shown in FIG. 6A) represents long pen-drops of unknown height, state E represents any length pen-down moves, and states F, G, H, and D (shown in FIG. 6B) represent short pen-up moves. In FIGS. 6A and 6B, the slope shown for states C2 and H may be set by a damping adjustment 79. State D allows for settling time of the pen 44 after impact and writing force selection before lateral movement begins. Elapsed time in state H is shown to be a minimum because the approved distance for pen 44 drop to the platen 34 is known (and small, 0.64 mm). Time in state C2 must be set to a selected maximum figure since the distance from pen 44 to platen 34 is not known. In the state diagram shown in FIG. 6D, N represents the number of milliseconds that the pen 44 remains in a given state. This number is contained in a counter of the microprocessor, which counter is reset upon the entering of each state. As described herein, the microprocessor, upon execution of the program listed in Appendix A hereto, enables various control functions shown in blocks 17, 19, 21 (of FIG. 1) by performing various calculations, and opening and closing the various switches B0-B7 shown in FIG. 3 in accordance with the bit settings shown in Table I above.

In response to signals from the microprocessor, pen velocity controller 19 controls the rate at which the pen 44 is dropped to the platen 34, as shown in states C and H. Pen velocity controller 19 includes control switch 77, adjustment potentiometer 79, capacitor-resistor network 81, and buffer amplifier 83. With switch 77 closed, pen velocity controller 19 receives an output signal from position sensor signal amplifier 35 and differentiates it through the capacitor-resistor network 81 producing a signal proportional to velocity of the pen 44. In producing such a signal, the output from the RC network 81 is then applied to buffer amplifier 83, then to damping adjustment potentiometer 79.

Also, as shown in FIG. 3, pressure controller 21 includes A/D converter 55, input node 71, spring adjustment potentiometer 61 and force adjustment potentiometer 59. In order to lower the pen 44 and have it make contact with the platen 34 with an appropriate writing force or pressure, a current of suitable magnitude is applied to voice coil actuator 23 from current source 59 in response to one or more input signals applied via input node 71 (actually, a summing node for force command signals from the processor). From a possibility of eight force levels, specifiable by the microprocessor in controlling switches B5, B6, and B7 of 3-bit force selector A/D converter 55, any one of these eight possible forces may be preselected by the user to provide the writing forces suitable for the different possible pen 44 tips. The closing of switch B3 disables the position control loop and allows the pen 44 to be lowered and to contact the platen with a writing force corresponding to the force level (number) selected at converter 55. The rate at which the pen 44 is lowered prior to contacting the platen 34 may be selected by closing switch B4 in velocity controller or damping circuit 19. The closing of switch B4 causes a force proportional to the velocity of the pen 44 to act counter to the direction of motion of the pen 44 thereby setting a certain constant velocity for the pen 44 as it moves downward toward the platen 34. This constant downward velocity may be changed by adjusting potentiometer 79. The constant downward velocity is, however, affected by the pen-up action of spring 63 when the latter is distended. Spring 63 is provided to hold and maintain the pen 44 in an upward position relative to the platen 34 when power is off. To counteract the effect of the spring 63 when the pen 44 is being lowered toward the platen 34, a power-off spring compensation adjustment circuit or potentiometer 61 is provided which applies a current to node 71 (in proper phase relationship with other input signals to the node) substantially eliminating the effects of the spring 63. Thus, as shown in FIG. 3, signals to node 71 include input signals applied via converter 55, feedback signals from amplifier 35 via velocity controller or damping circuit 19, and input signals from power-off spring compensation adjustment circuit 61.

Spring 63 exerts a force F equal to $Ax+B$, where x represents the height or length of the spring 63, A represents the spring constant of spring 63, and B represents a parameter proportional to the initial (substantially non-distended) tension of the spring 63. The output from circuit 61 compensates for the effect off the spring constant A. However, compensation is needed for the effect of parameter B. Accordingly, a force bias adjustment circuit or potentiometer 59 is provided which applies a selected constant current to node 71 to compensate for the initial tension of the spring 63, and to provide a selected downward bias (offset) force (e.g., ten grams) to the pen 44.

Potentiometer 85 changes the gain of the current controlled current source 57. This allows normalization of the control system 13 necessary due to variations in the force constant (i.e., grams) amplifier of pen-lift actuator 23 from one unit to another.

A voltage reference circuit 87 provides a substantially stable reference, for example, a $-6.92$ volts and a $+6.92$ volts used by the position control circuit in determining short lift heights and by the LED 37 in providing light of substantially uniform intensity. The stable reference voltage from circuit 87 is also used in conjunction with resistors 89 and 91 as shown in FIG. 3, with resistor 91 arranged parallel to LED 37, to substantially eliminate temperature drift and variations in intensity of the LED 37.

```
  2            R0     REG   0                          00003000
  3   0000     R1     REG   1                          00004000
  4   0001     R2     REG   2                          00005000
  5   0002     R3     REG   3                          00006000
  6   0003     R4     REG   4                          00007000
  7   0004     R5     REG   5                          00008000
  8   0005     R6     REG   6                          00009000
  9   0006     R7     REG   7                          00010000
 10   0007     R8     REG   8                          00011000
 11   0008     R9     REG   9                          00012000
 12   0009     R10    REG   10                         00013000
 13   000A     R11    REG   11                         00014000
 14   000B     R12    REG   12                         00015000
 15   000C     R13    REG   13                         00016000
 16   000D     R14    REG   14                         00017000
 17   000E     S      REG   15                         00018000
 18   000F     PSAP   REG   5                          00019000
 19   0005
 20*                                                   00020000
 39*SP
 40*
 41***********************************************    00041100
 42*** CONSTANTS DESCRIBING THE PEN TURRET ***        00042000
 43***********************************************    00043000
 44   0000    1918    TABLE  ABS   1918H              00044000
 45   0002    1A12            ABS   1A12H             00045000
 46   0004    1614            ABS   1614H
 47   0006    1511            ABS   1511H
 48   0008                    ABS
 49   0008                    EXT   SIZE              00048000
 50   0008                    EXT   ASIZE             00049000
 51   0008                    EXT   PEN1              00050000
 52   0008                    EXT   PEN2              00051000
 53   0008                    EXT   PEN3              00052000
 54   0008                    EXT   PEN4              00053000
 55   0008                    EXT   PEN5              00054000
 56   0008                    EXT   PEN6              00055000
 57   0008                    EXT   PEN7              00056000
 58   0008                    EXT   PEN8              00057000
 59   0008                    EXT   FILLTURN          00058000
 60   0008                    EXT   TTYP1             00059000
 61   0008                    EXT   TTYP2             00060000
 62   0008                    EXT   TTYP3             00061000
 63   0008                    EXT   TTYP4             00062000
 64   0008                    EXT   TTYP5             00063000
 65   0008                    EXT   TTYP6             00064000
 66   0008                    EXT   TTYP7             00065000
 67   0008                    EXT   MHVPE             00066000
 68   0008                    EXT   MSTRL             00067000
                              EXT   NALIM             00068000
                                                      00069000
                                                      00070000
                                                      00071000
                                                      00071100
```

```
 69          EXT  LENCK                                    00071200
 70  0008    EXT  NAMIN                                    00071300
 71  0008    EXT  CUPA                                     00071400
 72  0008    EXT  CUPB                                     00071500
 73  0008    EXT  CUPC                                     00071600
 74  0008    EXT  CUPD                                     00071700
 75  0008    EXT  CUPE                                     00071800
 76* SF                                                    00071990
 77*                                                       00072000
 78********    BUFFER VARIABLES    *********               00073000
 79**********************************                     00074000
 80**********************************                     00075000
 81  0016    RAM  MBRDY(2)                                 00076000
 82  0018    RAM  SWOOP(2)                                 00077000
 83  001A    RAM  NN(4)                                    00078000
 84*                                                       00079000
 85*        BACKGROUND SIDE OF BUFFER                      00080000
 86*                                                       00081000
 87  001E    RAM  NATMP(4)                                 00082000
 88  0022    RAM  NSTMP(4)                                 00083000
 89  0026    RAM  NDTMP(4)                                 00084000
 90  002A    RAM  XATMP(8)                                 00085000
 91  002E    RAM  YATMP(8)                                 00086000
 92  003A    RAM  XSTRT(4)                                 00087000
 93  003E    RAM  YSTRT(4)                                 00088000
 94  0042    RAM  CMTMP(2)                                 00089000
 95*                                                       00090000
 96*        FOREGROUND SIDE OF BUFFER                      00091000
 97*                                                       00092000
 98  0044    RAM  NA(4)                                    00093000
 99  0048    RAM  NS(4)                                    00094000
100  004C    RAM  ND(4)                                    00095000
101  0050    RAM  XACCL(8)                                 00096000
102  0058    RAM  YACCL(8)                                 00097000
103  0060    RAM  XWANT(8)                                 00098000
104  0068    RAM  YWANT(8)                                 00099000
105  0070    RAM  CMAND(2)                                 00100000
106*                                                       00101000
107*                                                       00102000
108*********   INTEGRATION VARIABLES  *********            00103000
109**********************************                     00104000
110**********************************                     00105000
111*                                                       00106000
112  0072   RAM  XVINP(2)                                  00107000
113  0074   RAM  YVINP(2)                                  00108000
114  0076   RAM  XHAVE(4)                                  00109000
115  007A   RAM  YHAVE(4)                                  00110000
116  007E   RAM  XEND(4)                                   00111000
117  0082   RAM  YEND(4)                                   00112000
```

```
118  008G        RAM   AXDIF(8)                                  00113000
119  008E        RAM   AYDIF(8)                                  00114000
120  0096        RAM   VXMAX(8)                                  00115000
121  009E        RAM   VYMAX(8)                                  00116000
122*                                                             00117000
123***********  SEEK VARIABLES **********                        00118000
124*********************************                             00119000
125*                                                             00120000
126  00A6        RAM   XCURRENTV(4)                              00121000
127  00AA        RAM   YCURRENTV(4)                              00122000
128  00AE        RAM   XACCELERATE(4)                            00123000
129  00B2        RAM   YACCELERATE(4)                            00124000
130  00B6        RAM   XDESIREDV(4)                              00125000
131  00BA        RAM   YDESIREDV(4)                              00126000
132  00BE        RAM   POINTER(2)                                00127000
133  00C0        RAM   OTHERPOINT(2)                             00128000
134*                                                             00129000
135*                                                             00130000
136******************* OTHER *****                               00131000
137*********************************                             00132000
138*                                                             00133000
139*                                                             00134000
140*                                                             00135000
141  00C2        RAM   MASK(2)                                   00136000
142  00C4        RAM   STATE(2)                                  00137000
143*                                                             00138000
144  00C6        RAM   MCNTR(1)                                  00139000
145  00C7        RAM   PCNTR(1)                                  00140000
146  00C8        RAM   MOTOR(2)                                  00141000
147  00CA        RAM   PENIO(1)                                  00142000
148  00CB        RAM   GRITO(1)                                  00143000
149  00CC        RAM   LASTMOVE(4)                               00144000
150  00D0        RAM   ENDPT(2)                                  00145000
151  00D2        RAM   TEMPI(32)                                 00146000
152  00D8        ENT   TEMPI                                     00147000
153  00F2        RAM   PAPER(2)                                  00148000
154*                                                             00149000
155  00F4        RAM   TIME(2)                                   00150000
156  00F6        RAM   FORCE(2)                                  00151000
157*                                                             00152000
158*                                                             00153000
159*                                                             00154000
160  0008        EXT   EXFLG                                     00155000
161*                                                             00156000
162  00F8        RAM   LASTK(1)                                  00157000
163  00FA        RAM   BUTON(2)                                  00158000
164  00FC        RAM   TURTI(2)                                  00159000
165*                                                             00160000
166  0008        EXT   LEDST                                     00161000
167  0008        EXT   LEDFL                                     00162000
```

```
168  0008           EXT  TURVA                                            00163000
169*                                                          00164000
170  00FE           RAM  HVPEN(4)                                         00165000
171  0102           RAM  STBLE(4)                                         00166000
172  0106           RAM  INLED(4)                                         00167000
173  010A           RAM  TEST(2)    BYTE                                  00168000
174  010C           RAM  LOC(4)                                           00169000
175*                                                          00170000
176  0110           RAM  BWLMT(4)        BAND WITH LIMIT                  00178000
177*                                                          00178100
178  0114           RAM  PRELFT(2)                                        00178110
179  0116           RAM  TLFTLONG(2)          PEN LIFT RAM LOCATIONS      00178200
180  0118           RAM  TLFTSHRT(2)                                      00178300
181  011A           RAM  TDWNBOTH(2)                                      00178400
182  011C           RAM  HUNDRDLG(2)                                      00178500
183  011E           RAM  HUNDRDSH(2)                                      00178600
184  0120           RAM  TLFTHI(2)                                        00178700
185*                                                          00179000
186  0122           RAM  CNST0(4)                                         00180000
187  0126           RAM  CNST1(4)   ACCELERATION AND SPEED                00181000
188  012A           RAM  CNST2(4)   PARAMETERS                            00182000
189  012E           RAM  CNST3(4)                                         00183000
190*                                                          00184000
191  0132           RAM  OLSPD(16)        SPACE TO SAVE SPEED PARAMETERS  00185000
192*                                                          00186000
193  0142           RAM  UP(2)       LOCATION TO STORE UP,DOWN PEN INFO   00187000
194*                                                          00188000
195  0008           EXT  CLRFG     FLAG TO SHOW IF CLEAR OR RESET HAS OCCURED  00189000
196  0008           EXT  GRCLR     ROUTINE FOR GRAPHICS CLEAR             00190000
197*                                                          00191000
198  0008           EXT  EUXLO                                            00192000
199  0008           EXT  EUYLO        HARD CLIP LIMITS                    00193000
200  0008           EXT  EUXHI                                            00194000
201  0008           EXT  EUYHI                                            00195000
202*                                                          00196000
203  0144           RAM  STAT2(2)                                         00197000
204  0146           RAM  NN2(2)                                           00198000
205  0148           RAM  D1(4)                                            00199000
206  014C           RAM  D2(4)                                            00200000
207  0150           RAM  LOCATE(4)                                        00201000
208*                                                          00202000
209  0154           RAM  ENDJOY(2)        JOYSTICK RAM LOCATIONS          00203000
210  0156           RAM  XVALUE1(2)                                       00204000
211  0158           RAM  XINTGT(2)                                        00205000
212  015A           RAM  YVALUE1(2)                                       00206000
213  015C           RAM  YINTGT(2)                                        00207000
214  015E           RAM  XOFX(8)                                          00208000
215  0166           RAM  XOFY(8)                                          00209000
216  016E           RAM  YOFX(8)                                          00210000
```

```
217  0176                    RAM  YOFY(8)                          00211000
218  017E                    RAM  PLAST(4)                         00212000
219  0182                    RAM  MLAST(4)                         00213000
220  0186                    RAM  JSFLG(1)                         00214000
221  0187                    RAM  JOYUP(1)                         00214100
222  0188                    RAM  JOYSC(2)                         00215000
223  018A                    RAM  JOYBC(2)                         00216000
224  018C                    RAM  LASTPRO(2)                       00216100
225  018E                    RAM  LASTVM(2)                        00216200
226  0190                    RAM  NORST(1)                         00216300
227  0191                    RAM  IGERROR(1)                       00216400
228*                                                    00216410   00216420
229  0192                    RAM  UPA(4)                           00216430
230  0196                    RAM  UPB(4)                           00216440
231  019A                    RAM  UPC(4)                           00216450
232  019E                    RAM  UPD(4)                           00216460
233  01A2                    RAM  UPE(4)                           
234*                                                    00216470   00217000
235  0008                    EXT  XPRESD                           00218000
236  0008                    EXT  YPRESD                           
237*                                                    00219000   00220000
238  0008                    EXT  OST                              00220100
239  0008                    EXT  DEL                              00220200
240  0008                    EXT  CMD                              
241*                                                    00220210   00220220
242  0008                    EXT  KLUGE                            
243*                                                    00220300   00220400
244  0008                    EXT  URERR                            00220500
245  0008                    EXT  PTIME                            00220600
246  0008                    EXT  LASTG                            00220700
247  0008                    ENT  JOYUP                            
248*SP
249*
250*
251**** DEBUG ENTRY POINTS ***
252***************************
253***************************
254*
255  0008                    ENT  TSHORT                           00226100
256  0008                    ENT  TLONG                            00226200
257  0008                    ENT  DEFLT                            00226300
258  0008                    ENT  TLOW                             00226400
259  0008                    ENT  TDOWN                            00226500
260  0008                    ENT  BEFOR                            00226600
261  0008                    ENT  JOYST                            00227000
262  0008                    ENT  BWLMT                            00234000
263  0008                    ENT  MBRDY                            00235000
264  0008                    ENT  INLED                            00236000
265  0008                    ENT  STBLE                            00237000
266  0008                    ENT  HVPEN                            00238000
```

| | | | |
|---|---|---|---|
| 267 | 0008 | ENT MRDY | 00239000 |
| 268 | 0008 | ENT FORCE | 00240000 |
| 269 | 0008 | ENT SWOOP | 00241000 |
| 270 | 0008 | ENT DEBNC | 00242000 |
| 271 | 0008 | ENT IGNOR | 00243000 |
| 272 | 0008 | ENT TURTI | 00244000 |
| 273 | 0008 | ENT BUTON | 00245000 |
| 274 | 0008 | ENT RETURN | 00246000 |
| 275 | 0008 | ENT NATMP | 00247000 |
| 276 | 0008 | ENT NSTMP | 00248000 |
| 277 | 0008 | ENT NDTMP | 00249000 |
| 278 | 0008 | ENT XATMP | 00250000 |
| 279 | 0008 | ENT YATMP | 00251000 |
| 280 | 0008 | ENT XSTRT | 00252000 |
| 281 | 0008 | ENT YSTRT | 00253000 |
| 282 | 0008 | ENT CMAND | 00254000 |
| 283 | 0008 | ENT CNST0 | 00255000 |
| 284 | 0008 | ENT CNST1 | 00256000 |
| 285 | 0008 | ENT CNST2 | 00257000 |
| 286 | 0008 | ENT CNST3 | 00258000 |
| 287 | 0008 | ENT NA | 00259000 |
| 288 | 0008 | ENT NS | 00260000 |
| 289 | 0008 | ENT ND | 00261000 |
| 290 | 0008 | ENT XACCL | 00262000 |
| 291 | 0008 | ENT YACCL | 00263000 |
| 292 | 0008 | ENT XWANT | 00264000 |
| 293 | 0008 | ENT YWANT | 00265000 |
| 294 | 0008 | ENT CMTMP | 00266000 |
| 295 | 0008 | ENT XVINP | 00267000 |
| 296 | 0008 | ENT YVINP | 00268000 |
| 297 | 0008 | ENT XHAVE | 00269000 |
| 298 | 0008 | ENT YHAVE | 00270000 |
| 299 | 0008 | ENT XFND | 00271000 |
| 300 | 0008 | ENT YFND | 00272000 |
| 301 | 0008 | ENT AXDIF | 00273000 |
| 302 | 0008 | ENT AYDIF | 00274000 |
| 303 | 0008 | ENT BEGIN | 00275000 |
| 304 | 0008 | ENT HN | 00276000 |
| 305 | 0008 | ENT STATE | 00277000 |
| 306 | 0008 | ENT INITL | 00278000 |
| 307 | 0008 | ENT PAINT | 00279000 |
| 308 | 0008 | ENT PUINT | 00280000 |
| 309 | 0008 | ENT PDINT | 00281000 |
| 310 | 0008 | ENT PLOTT | 00282000 |
| 311 | 0008 | ENT LFTPN | 00283000 |
| 312 | 0008 | ENT LWRPN | 00284000 |
| 313 | 0008 | ENT MCNTR | 00285000 |
| 314 | 0008 | ENT PCNTR | 00286000 |
| 315 | 0008 | ENT TYPE | 00287000 |

```
316  0008                        ENT   TABLE                                           00290000
317  0008                        ENT   POSTN                                           00291000
318  0008                        ENT   PNTER                                           00292000
319  0008                        ENT   POINTER                                         00293000
320  0008                        ENT   XDESIREDV                                       00294000
321  0008                        ENT   YDESIREDV                                       00295000
322  0008                        ENT   XCURRENTV                                       00296000
323  0008                        ENT   YCURRENTV                                       00297000
324  0008                        ENT   XACCELERATE                                     00298000
325  0008                        ENT   YACCELERATE                                     00299000
326 *****************************************                                          00300000
327 *** BACKGROUND ENTRY POINTS **                                                      00301000
328 *****************************************                                          00302000
329 *****************************************                                          00303000
330 *****************************************                                          00304000
331 *                                                                                   00305000
332  0008                        ENT   SVINI                                           00305010
333  0008                        EXT   JPTBL                                           00305100
334  0008  5E08 16DA      AJMPTBL JP   SVPOS                                           00307000
335  000C  5E08 16BC              JP   JSSET                                           00308000
336  0010  5E08 00B8              JP   PUSET                                           00311000
337  0014  5E08 00F0              JP   PDSET                                           00312000
338  0018  5E08 1B16              JP   WHLUP                                           00313000
339  001C  5E08 1B04              JP   WHLDN                                           00314000
340  0020  5E08 011B              JP   XLSET                                           00315000
341  0024  5E08 01AE              JP   PASET                                           00316000
342  0028  5E08 04E6              JP   SERVO                                           00318000
343  002C  5E08 1390              JP   ITSET                                           00320000
344  0030  5E08 1450              JP   SPSET                                           00321000
345  0034  5E08 147E              JP   PPSET                                           00322000
346  0038  5E08 1582              JP   HPSET                                           00323000
347  003C  5E08 15C2              JP   OTSET                                           00324000
348  0040  5E08 1AC4              JP   CHSET                                           00325000
349  0044  5E08 1AF4              JP   CLSET                                           00326000
350  0048  5F08 161A              JP   PSSET                                           00327000
351  004C  5E08 1A5A              JP   UNSET                                           00328000
352  0050  5E08 1514              JP   PPIK1                                           00328100
353  0054  5F08 1566              JP   PPIK2                                           00328200
354  0058  5E08 15D0              JP   PPIK3                                           00328300
355  005C  5E08 15DE              JP   PPIK4                                           00328400
356  0060  5E08 15EA              JP   TCAL1                                           00328500
357  0064  5E08 160A              JP   TCAL2                                           00328600
358  0068  5E08 1614              JP   TCAL3                                           00328700
359  006C  9E08                   RET                 SUBROUTINE FOR RAM1 RAM LINK IN INTERRUPT PROGRAM  00328701
360  006E  8D07                   NOP                 UNUSED WORD FOR USE WITH RAM LINK                  00328702
361  0070  9E08                   RET                 SUBROUTINE FOR RAM2 RAM LINK IN INTERRUPT PROGRAM  00328703
362  0072  8D07                   NOP                 UNUSED WORD FOR USE WITH RAM LINK                  00328704
363  0074  9E08                   RET                 SUBROUTINE FOR RAM3 RAM LINK IN INTERRUPT CODE     00328705
364  0076  8D07                   NOP                 UNUSED WORD FOR USE WITH RAM LINK                  00328706
```

```
365*         EXT   RAM1                                                 00328707    00328708
366  0078    EXT   RAM2                                                             00328709
367  0078    EXT   RAM3                                                             00328710
368  0078
369*
370  0078    ENT   MASK                                                             00328720
371  0078    ENT   UP                                                               00328800
372  0078    ENT   JOYSC                                                            00328810
373  0078    ENT   JOYBC                                                            00328820
374  0078    ENT   JSFLG                                                            00328830
375*SP
376*
377************************************                                 00328719
378*** OUTPUT PORT ADDRESSES ***
379************************************
380  0088    STKTEND EQU  088H                                          00328900
381  010D    KEYOT   EQU  10DH                                          00329000
382  010B    KEYIN   EQU  10BH                                          00330000
383  0084    XIPRT   EQU  084H                                          00331000
384  0086    YIPRT   EQU  086H                                          00332000
385  0080    XOPRT   EQU  080H                                          00333000
386  0082    YOPRT   EQU  082H                                          00334000
387  0103    PENLF   EQU  103H                                          00335000
388  0105    LEDWD   EQU  105H                                          00336000
389  0101    STEPR   EQU  101H                                          00337000
390  0105    TURET   EQU  105H                                          00338000
391  010F    KEYHI   EQU  10FH                                          00339000
392  0107    JOYIN   EQU  107H                                          00340000
393  0059    RSPORT  EQU  59H                                           00341000
                                                                        00342000
                                                                        00343000
                                                                        00344000
                                                                        00345000
394*                                                                    00345100
395  0078    INSPD   ABS  0                                             00346000  INITIAL SPEED AND ACCELERATION
396  007A    0308            ABS  984                                             PARAMETERS
397  007C    0000            ABS  0                                     00347000
398  007E    0006            ABS  6                                     00348000
399  0080    0000            ABS  0                                     00349000
400  0082    004F            ABS  79                                    00350000
401  0084    0000            ABS  0                                     00351000
402  0086    0000            ABS  13                                    00352000
                                                                        00353000
                                                                        00354000
403*                                                                    00355000  PEN UP SPEED PARAMETERS
404  0088    0000    PUSPD   ABS  0                                     00356000
405  008A    0842            ABS  2114                                  00357000
406  008C    0000            ABS  0                                     00358000
407  008E    0013            ABS  19                                    00359000
408  0090    0000            ABS  0                                     00360000
409  0092    00CB            ABS  203                                   00361000
410  0094    0000            ABS  0                                     00362000
411  0096    000A            ABS  10                                    00363000
412*                                                                    00364000
413  0098    0000    MBWLM   ABS  0                                     00372000
```

```
414  009A                    ABS   3                                              00373000
415*
416*SP                                                                            00374000
417*                                                                              00380000
                                                                                  00386000
418  009C  5F00 0035   WAIT   CALL  RAM3                                          00386100
419  00A0  4D04 0023          TEST  CLRFG                                         00387000
420  00A4  E605               JR    NOPRB,Z                                       00388000
421  00A6  4C04 0190          TESTB NORST                                         00388100
422  00AA  EE02               JR    NOPKA,NZ    IF WE HAVE A RESET OR CLEAR       00388200
423  00AC  5F00 0024          CALL  GRCLR       FORGET MOVE                       00389000
424*
425  00B0  4D04 0016   NOPRB  TEST  MBRDY                                         00391000
426  00B4  EFF3               JR    WAIT,NZ                                       00392000
427  00B6  9E08               RET                                                 00393000
428*SP
429*                                                                              00393100
430  00B8  4D04 0142   PUSET  TEST  UP                                            00393000
431  00BC  9E0E               RET   NZ                                            00394000
432*                                                                              00395000
                                                                                  00396000
433  00BE  D012               CALR  WAIT                                          00397000
434  00C0  4D05 0142 FFFF     STRI  UP,=D-1                                       00397100
435  00C6  2100 0088          LD    =LPUSPD,R0                                    00398000
436  00CA  2101 0132          LD    =LOLSPD,R1                                    00399000
437  00CE  2102 0122          LD    =LCNST0,R2                                    00400000
438  00D2  BD38               LDK   8,R3                                          00401000
439  00D4  BB21               ABS   0BB21H       LDIR  R1,R2,R3                   00402000
440  00D6  0310               ABS   0310H        CNST0 TO CNST3 GO TO OLSPD       00403000
441  00D8  BD38               LDK   8,R3                                          00404000
442  00DA  2102 0122          LD    =LCNST0,R2                                    00406000
443  00DE  BB01               ABS   0BB01H       LDIR  R2,R0,R3                   00407000
444  00E0  0320               ABS   0320H        PUSPD GOES TO CNST0 TO CNST3     00408000
445*                                                                              00409000
                                                                                  00410000
446  00E2  4D05 0042 0001     STRI  CMTMP,=D1                                     00411000
447  00E8  4D05 0016 FFFF     STRI  MBRDY,=HFFFF                                  00412000
448  00EE  9E08               RET                                                 00413000
449*                                                                              00414000
450  00F0  4D04 0142   PDSET  TEST  UP                                            00415000
451  00F4  9E06               RET   Z                                             00416000
452*                                                                              00417000
453  00F6  D02E        CALR   CALR  WAIT                                          00417100
454  00F8  4D08 0142          CLR   UP                                            00418000
455  00FC  2101 0132          LD    =LOLSPD,R1                                    00419000
456  0100  2102 0122          LD    =LCNST0,R2                                    00420000
457  0104  BD38               LDK   8,R3                                          00421000
458  0106  BB11               ABS   0BB11H                                        00422000
459  0108  0320               ABS   0320H                                         00423000
460*                                                                              00424000
461  010A  4D05 0042 0002     STRI  CMTMP,=D2                                     00426000
462  0110  4D05 0016 FFFF     STRI  MBRDY,=HFFFF                                  00427000
```

| | | | | | | | |
|---|---|---|---|---|---|---|---|
| 463 | 0116 | 9E08 | | | RET | | 00428000 |
| 464* | | | | | | | |
| 465*SP | | | | | | | 00429000 |
| 466 | 0118 | 4C05 | 0190 | FFFF | XLSET | STRIB NORST,=HFF | 00429010 |
| 467 | 011E | 0042 | | | | CALR WAIT | 00430000 |
| 468 | 0120 | 5400 | 0106 | | | LDL TNLED,R0 | 00431000 |
| 469 | 0124 | 1200 | 0000 | FA64 | | SURL =D64100,R0 | 00432000 |
| 470 | 012A | 91F0 | | | | PUSHL R0,S | 00433000 |
| 471 | 012C | 51F0 | 007E | | | PUSHL XEND,S | 00434000 |
| 472 | 0130 | 5F00 | 01D0 | | | CALL MOVEA | 00435000 |
| 473 | 0134 | D04D | | | | CALR WAIT | 00436000 |
| 474 | 0136 | BD00 | | | | LDK 0,R0 | 00437000 |
| 475 | 0138 | 6F00 | 00BE | | | STR POINTER,R0 | 00438000 |
| 476 | 013C | 6F00 | 00C0 | | | STR OTHERPOINT,R0 | 00439000 |
| 477 | 0140 | 4D05 | 0042 | 0005 | | STRI CMTMP,=D5 | 00440000 |
| 478 | 0146 | 4D05 | 0016 | FFFF | | STRI MBRDY,=HFFFF | 00441000 |
| 479 | 014C | D059 | | | | CALR WAIT | 00442000 |
| 480* | | | | | | | 00442010 |
| 481 | 014E | 5404 | 0028 | | | LDL EUYHI,R4 | UPA=.7*EUYHI | 00442020 |
| 482 | 0152 | 9442 | | | | LDL R4,R2 | 00442030 |
| 483 | 0154 | 5400 | 001B | | | LDL CUPA,R0 | 00442040 |
| 484 | 0158 | 5F00 | 0036 | | | CALX MULTL | 00442050 |
| 485 | 015C | 9600 | | | | ADDL R0,R0 | 00442051 |
| 486 | 015E | 5D00 | 0192 | | | STRL UPA,R0 | 00442060 |
| 487* | | | | | | | 00442070 |
| 488 | 0162 | 5404 | 0027 | | | LDL EUYHI,R4 | UPB=.8*EUYHI | 00442080 |
| 489 | 0166 | 9442 | | | | LDL R4,R2 | 00442090 |
| 490 | 0168 | 5400 | 001C | | | LDL CUPB,R0 | 00442100 |
| 491 | 016C | 5F00 | 0036 | | | CALX MULTL | 00442101 |
| 492 | 0170 | 9600 | | | | ADDL R0,R0 | 00442110 |
| 493* | 0172 | 5D00 | 0196 | | | STRL UPB,R0 | |
| 494 | 0172 | 5404 | 0027 | | | LDL EUXHI,R4 | UPC=-.5*EUXHI | 00442120 |
| 495 | 0176 | 5402 | 0025 | | | LDL EUXLO,R2 | 00442130 |
| 496 | 017A | 5400 | 001D | | | LDL CUPC,R0 | 00442131 |
| 497 | 017E | 5F00 | 0036 | | | CALX MULTL | 00442150 |
| 498 | 0182 | 9600 | | | | ADDL R0,R0 | 00442160 |
| 499 | 0184 | 5D00 | 019A | | | STRL UPC,R0 | 00442161 |
| 500* | | | | | | | 00442170 |
| 501 | 0188 | 9442 | | | | LDL R4,R2 | UPD=.5*EUXHI | 00442180 |
| 502 | 018A | 5400 | 001E | | | LDL CUPD,R0 | 00442190 |
| 503 | 018E | 5F00 | 0036 | | | CALX MULTL | 00442200 |
| 504 | 0192 | 9600 | | | | ADDL R0,R0 | 00442210 |
| 505 | 0194 | 5D00 | 019E | | | STRL UPD,R0 | 00442211 |
| 506* | | | | | | | 00442220 |
| 507 | 0198 | 9442 | | | | LDL R4,R2 | UPE=.8*EUXHI | 00442230 |
| 508 | 019A | 5400 | 001F | | | LDL CUPE,R0 | 00442240 |
| 509 | 019E | 5F00 | 0036 | | | CALX MULTL | 00442250 |
| 510 | 01A2 | 9600 | | | | ADDL R0,R0 | 00442260 |
| 511 | 01A4 | 5D00 | 01A2 | | | STRL UPE,R0 | 00442261 |
| 512* | | | | | | | 00442270 |

COVER UP PAPER SENSOR WITH PEN CARRIAGE

```
513    01A8    4C08  0190                                               00442990
514    01AC    9E08                    RET                              00443000
515*
516    01AE    97F6            PASET   POP     R6,S                     00445000
517    01B0    95F0                    POPL    R0,S                     00446000
518    01B2    95F2                    POPL    R2,S                     00447000
519    01B4    8D00                    COM     R0                       00448000
520    01B6    8D10                    COM     R1                       00449000
521    01B8    8D20                    COM     R2                       00450000
522    01BA    8D30                    COM     R3                       00451000
523    01BC    1404  0000  0001        LDL     =D1,R4                   00452000
524    01C2    9640                    ADDL    R4,R0                    00453000
525    01C4    9642                    ADDL    R4,R2                    00454000
526    01C6    93F6                    PUSH    R6,S                     00455000
527    01C8    91F2                    PUSHL   R2,S                     00456000
528    01CA    91F0                    PUSHL   R0,S                     00457000
529    01CC    DFFF                    CALR    MOVEA                    00458000
530    01CE    9E08                    RET                              00459000
531*SP
532*                                                                    00460000
533    01D0    009B            MOVEA   CALR    WAIT                     00460100
534*            CODE TO PULL ARGUMENT OFF OF THE                        00462000
535*    LDL     2(S),R2        STACK FOR AN ALGOL CALLABLE SUBROUTINE   00463000
536*    POP     R4,S                                                    00464000
537*    INC     S,4                                                     00465000
538*    PUSH    R4,S                                                    00466000
539*                                                                    00467000
540    01DA    5404  007E              PUP     R4,S      XEND,R4        00468000
541    01DE    5406  0082              POPL    R0,S      YEND,R6        00469000
542    01E2    5D00  007E              POPL    R2,S      XEND,R0        00470000
543    01E6    5D02  0082              PUSH    R4,S      YEND,R2        00471000
544*
545    01DA    5404  007E              LDL     XEND,R4                  00468000
546    01DE    5406  0082              LDL     YEND,R6                  00469000
547    01E2    5D00  007E              STRL    XEND,R0                  00470000
548    01E6    5D02  0082              STRL    YEND,R2                  00471000
549    01EA    5D04  003A              STRL    XSTRT,R4                 00472000
550    01EE    5D06  003E              STRL    YSTRT,R6                 00473000
551    01F2    9240                    SUBL    R4,R0         END(OLD)=START(NEW)   00474000
552    01F4    9262                    SUBL    R6,R2         PARAMETERS=END(NEW)   00475000
553*                                                                    00476000
554    01F6    BD40                    LDK     0,R4          MOVE=END-START        00478000
555    01F8    8504                    OR      R0,R4                    00479000
556    01FA    8514                    OR      R1,R4                    00480000
557    01FC    8524                    OR      R2,R4         IF MOVE LENGTH IS ZERO, RETURN  00481000
558    01FE    8534                    OR      R3,R4                    00482000
559    0200    9E06                    RET     2                        00483000
560*                                                                    00484000
561    0202    91F2                    PUSHL   R2,S          PUSH MOVE COMPONENTS ON STACK   00488000
562    0204    91F0                    PUSHL   R0,S                     00489000
```

```
563*                                                          00491000
564   0206  91F2           PUSHL R2,S      FIND LINE LENGTH
565   0208  5F00 0037      CALX  LEN                          00493000
566*                                                          00493010
567   020C  5402 0018      LDL   NALIM,R2                     00493100
568   0210  5000 0019      CMPL  LENCK,R0                     00493200
569   0212           EA02  JR    LONGER,GT                    00493300
570   0214  5402 001A      LDL   NAMIN,R2                     00493400
571   021A  5D02 0110      STRL  BWLMT,R2                     00493500
572*                                                          00493600
573   021E  9402           LONGER LDI  R0,R2                  00494000
574   0220  BD00           LDK   0,R0                         00495000
575   0222  A101           LD    R0,R1                        00496000
576*                                                          00497000
577   0224  5002 0122      CMPL  CNST0,R2                     00498000
578   0228  E50F           JR    ALIMT,M                      00499000
579*                                                          00500000
580   022A  5202 0122      VLIMT SUBL CNST0,R2    FOR VELOCITY LIMITED MOVES: 00501000
581   022E  5A00 012A      DIVL  CNST2,R0                     00502000
582   0232  1602 0000 0001 ADDL  =D1,R2                       00503000
583   0238  5D02 0022      STRL  NSTMP,R2  NSTMP=(LENGTH-CNST0)/CNST2 +1 00504000
584   023C  5400 012E      LDL   CNST3,R0                     00505000
585   0240  5D00 001E      STRL  NATMP,R0  NATMP=CNST3        00506000
586   0244  E811           JR    ACALC                        00507000
587*                                                          00508000
588   0246  5A00 0126      ALIMT DIVL CNST1,R0   FOR ACCELERATION LIMITED MOVES: 00509000
589   024A  9420           LDL   R2,R0         NATMP=SQRT(LENGTH/CNST1)+1 00511000
590   024C  1600 0000 0001 ADDL  =D1,R0                       00511100
591   0252  5F00 0038      CALX  SQRT                         00512000
592   0256  1600 0000 0001 ADDL  =D1,R0                       00512100
593   025C  5D00 001E      STRL  NATMP,R0                     00513000
594   0260  BD20           LDK   0,R2                         00514000
595   0262  A123           LD    R2,R3                        00515000
596   0264  5D02 0022      STRL  NSTMP,R2                     00516000
597*                                                          00517000
598   0268  5000 0110      ACALC CMPL BWLMT,R0                00518000
599   026C  EA04           JR    NOLMT,GT                     00519000
600*                                                          00520000
601   026E  5400 0110      LDL   BWLMT,R0                     00521000
602   0272  5D00 001E      STRL  NATMP,R0                     00522000
603*                                                          00523000
604   0276  5D00 0026      NOLMT STRL NDTMP,R0                00524000
605   027A  4D08 0018      CLR   SWOOP                        00525000
606   027E  9602           ADDL  R0,R2                        00526000
607   0280  5F00 0036      CALX  MULTL                        00527000
608   0284  9424           LDL   R2,R4     NA*(NA+NS) GOES IN R4L 00528000
609   0286  A0C4           LDB   R12,R4                       00529000
610   0288  A05C           LDB   R5,R12                       00530000
611   028A  A0D5           LDB   R13,R5                       00531000
612   028C  A06D           LDB   R6,R13                       00532000
```

```
613  028E              LDKB    0,R13                                              00533000
614  *
615  0290  CD00  5F00 02B4    CALL    MUL31                                       00535000
616  0294        5D00 002A    STRL    XATMP,R0                                    00536000
617  0298        5D02 002E    STRL    XATMP+4,R2                                  00537000
618  029C        5F00 02B4    CALL    MUL31                                       00538000
619  02A0        5D00 0032    STRL    YATMP,R0                                    00539000
620  02A4        5D02 0036    STRL    YATMP+4,R2                                  00540000
621  *                                                                             00534000
622  02A8  4D08 0042         CLR     CMTMP                                        00542000
623  02AC  4D05 0016 FFFF    STRI    MBRDY,=HFFFF                                 00543000
624  02B2  9E08              RET                                                  00544000
625  *                                                                             00541000
626  02B4  97F2         MUL31 POP    R2,S                                         00546000
627  02B6  95F0              POPL    R0,S                                         00547000
628  02B8  93F2              PUSH    R2,S                                         00548000
629  02BA  BD20              LDK     0,R2                                         00549000
630  02BC  A123              LD      R2,R3                                        00550000
631  02BE  9A40              DIVL    R4,R0                                        00551000
632  02C0  B107              EXTSL   R0                                           00552000
633  02C2  A029              LDB     R2,R9                                        00553000
634  02C4  A0A2              LDB     R10,R2                                       00554000
635  02C6  A03A              LDB     R3,R10                                       00555000
636  02C8  A0B3              LDB     R11,R3                                       00556000
637  02CA  CB00              LDKB    0,R11                                        00557000
638  02CC  9E08              RET                                                  00558000
639  *SP
640  *                                                                             00558100
641  ************************                                                      00559000
642  *** POWER UP INITIALIZE ***                                                   00560000
643  ************************                                                      00561000
644  *                                                                             00562000
                                                                                   00563000
645  02CE  7C01         ASVINI DI                                                  00564000
646  02D0  3A06 0207         OUTB    R0,207H                                       00565000
647  02D4  BD00              LDK     0,R0                                          00566000
648  02D6  3A06 0205         OUTB    R0,205H                                       00567000
649  02DA  7C05              EI                                                    00568000
650  02DC  A101              LD      R0,R1                                         00569000
651  02DE  2102 2000         LD      R0,=H2000,R2                                  00570000
652  02E2  3B06 0080         OUT     R0,XOPRT    SUPPLY INITIAL CONDITION FOR ARMING 00571000
653  02E6  3B06 0082         OUT     R0,YOPRT    POWER UP CIRCUIT                  00572000
654  02EA  3B26 0088         OUT     R2,STRTEND                                    00573000
655  02EE  5D00 0076         STRL    XHAVE,R0                                      00574000
656  02F2  5D00 0060         STRL    XWANT,R0                                      00575000
657  02F6  5D00 0064         STRL    XWANT+4,R0                                    00576000
658  02FA  5D00 007A         STRL    YHAVE,R0                                      00577000
659  02FE  5D00 0068         STRL    YWANT,R0                                      00578000
660  0302  5D00 006C         STRL    YWANT+4,R0                                    00579000
661  0306  5D00 003A         STRL    XSTRT,R0                                      00580000
```

```
662   030A   5D00 003E           STRL  YSTRT,RO                                        00581000
663   030E   5D00 007E           STRL  XEND,RO                                         00582000
664   0312   5D00 0082           STRL  YEND,RO                                         00583000
665   0316   5D00 001A           STRL  NN,RO                                           00584000
666   031A   6F00 0003           STR   TURVA,RO                                        00586000
667   031E   6F00 0012           STR   PENTU,RO                                        00587000
668   0322   6F00 000E           STR   TYPE,RO                                         00588000
669   0326   6E00 0190           STRB  NORST,RO                                        00588100
670   032A   6E00 0187           STRB  JOYUP,RO                                        00588200
671   032E   5D00 00B6           STRL  XDESIREDV,RO                                    00589000
672   0332   5D00 00BA           STRL  YDESIREDV,RO                                    00590000
673   0336   5D00 00AE           STRL  XACCELERATE,RO                                  00591000
674   033A   5D00 00B2           STRL  YACCELERATE,RO                                  00592000
675   033E   5D00 00A6           STRL  XCURRENTV,RO                                    00593000
676   0342   5D00 00AA           STRL  YCURRENTV,RO                                    00594000
677   0346   6F00 00RE           STR   POINTER,RO                                      00595000
678   034A   6E00 000C           STRB  DEBNC,RO                                        00596000
679   034E   5D00 018C           STRL  LASTPRO,RO                                      00596100
680   0352   5D00 015E           STRL  XOFX,RO                                         00596110
681   0356   5D00 0160           STRL  XOFX+2,RO                                       00596120
682   035A   5D00 0176           STRL  YOFY,RO                                         00596130
683   035E   5D00 00A2           STRL  YOFY+2,RO                                       00596140
684   0362   5D00 0166           STRL  XOFY,RO                                         00596150
685   0366   5D00 0168           STRL  XOFY+2,RO                                       00596160
686   036A   5D00 016E           STRL  YOFX,RO                                         00596170
687   036E   5D00 0170           STRL  YOFX+2,RO                                       00596180
688   0372   6F00 0191           STR   IGERROR,RO                                      00596181
689*                                                                                   00596190
690   0376   4D05 0116 0064      STRI  TLFTLONG,=LATLFTLONG   SET UP PEN LIFT CONSTANTS IN     00596210
691   037C   4D05 0118 0003      STRI  TLFTSHRT,=LATLFTSHRT   RAM FOR ACESS BY UNDERWARE       00596230
692   0382   4D05 011A 0005      STRI  TDWNBOTH,=LATDWNBOTH                                    00596250
693   0388   4D05 011C 0082      STRI  HUNDRDLG,=LAHUNDRDLG                                    00596270
694   038E   4D05 011E 0073      STRI  HUNDRDSH,=LAHUNDRDSH                                    00596290
695   0394   4D05 0114 0005      STRI  PRELFT,=LAPRELFT                                        00596300
696   039A   4D05 0170 0005      STRI  TLFTHI,=LATLFTHI                                        00596310
697   03A0   4D05 FE58 03F2      STRI  THDULONG,=LATHDULONG                                    00596320
698   03A6   4D05 FE56 FA58      STRI  FSTFRCE,=LAFSTFRCE                                      00596330
699*                                                                                   00597000
700   03AC   5400 0098           LDL   MRWLM,RO           SET UP BAND WIDTH LIMIT CONSTANT     00611000
701   03B0   5D00 0110           STRL  BWLMT,RO                                                00612000
702*                                                                                   00612100
703   03B4   2101 0005           LD    =LASIZE,R1         LOAD TABLE OF CONSTANTS INTO RAM     00612200
704   03B8   2102 0004           LD    =LSIZE,R2                                               00612300
705   03BC   2103 0025           LD    =D37,R3                                                 00612400
706   03C0   BB11 0320           MVIR  R1,R2,R3,F                                              00612500
707*                                                                                   00612501
708   03C4   2101 0008           LD    =LAJMPTBL,R1       LOAD JUMP TABLE INTO RAM             00612510
709   03C8   2102 0032           LD    =LJPTBL,R2                                              00612520
710   03CC   2103 0038           LD    =D56,R3                                                 00612530
711   03D0   BB11 0320           MVIR  R1,R2,R3,F                                              00612540
                                                                                        00613000
```

| Line | Addr | Code | | | Label/Op | Operand | Comment | Seq |
|---|---|---|---|---|---|---|---|---|
| 712* | | | | | | | | 00614000 |
| 713 | 03D4 | 4C05 | 00F6 | E0E0 | STRIB | FORCE,=HE0 | SET INITIAL FORCE | 00615000 |
| 714* | | | | | | | | 00621000 |
| 715 | 03DA | 2100 | 0088 | | LD | =LPUSPD,R0 | SET UP INITIAL SPEED AND ACCELERATION | 00622000 |
| 716 | 03DE | 2101 | 0122 | | LD | =LCNST0,R1 | | 00623000 |
| 717 | 03E2 | BD28 | | | LDK | 8,R2 | | 00624000 |
| 718 | 03E4 | BB01 | | | ABS | 0BB01H | | 00625000 |
| 719 | 03E6 | 0210 | | | ABS | 0210H | | 00626000 |
| 720 | 03E8 | 2100 | 0078 | | LD | =LINSPD,R0 | LDIR R1,R0,R2 | 00627000 |
| 721 | 03EC | 2101 | 0132 | | LD | =LOLSPD,R1 | PUSPD GOES TO CNST0/CNST3 | 00628000 |
| 722 | 03F0 | BD28 | | | LDK | 8,R2 | | 00629000 |
| 723 | 03F2 | BB01 | | | ABS | 0BB01H | | 00630000 |
| 724 | 03F4 | 0210 | | | ABS | 0210H | LDIR R1,R0,R2 | |
| 725* | | | | | | | INSPD GOES TO OLSPD | 00631000 |
| 726 | 03F6 | 1400 | 0000 | 0000 | LDL | =D00,R0 | SET UP DEFAULT HARD CLIP LIMITS | 00632000 |
| 727 | 03FC | 5D00 | 0025 | | STRL | EUXLO,R0 | | 00633000 |
| 728 | 0400 | 1400 | FFFC | DF38 | LDL | =D-205000,R0 | | 00634000 |
| 729 | 0406 | 5D00 | 0026 | | STRL | EUYLO,R0 | | 00635000 |
| 730 | 040A | 1400 | 0000 | 0000 | LDL | =D0,R0 | | 00636000 |
| 731 | 0410 | 5D00 | 0027 | | STRL | EUXHI,R0 | | 00637000 |
| 732 | 0414 | 1400 | 0000 | 0000 | LDL | =D0,R0 | | 00638000 |
| 733 | 041A | 5D00 | 0028 | | STRL | EUYHI,R0 | | 00639000 |
| 734* | | | | | | | | 00640000 |
| 735 | 041E | 4D0B | 00C4 | | CLR | STATE | | 00641000 |
| 736 | 0422 | 1400 | 0000 | 0001 | LDL | =D1,R0 | | 00642000 |
| 737 | 0428 | 5D00 | 0086 | | STRL | AXDIF,R0 | | 00643000 |
| 738 | 042C | 5D00 | 008E | | STRL | AYDIF,R0 | | 00644000 |
| 739* | | | | | | | | 00647000 |
| 740 | 0430 | 3B04 | 0084 | | IN | R0,XIPRT | INITIALIZE DIFFERENTIATION | 00648000 |
| 741 | 0434 | B301 | 0004 | | SLL | R0,4 | VARIABLES | 00649000 |
| 742 | 0438 | 6F00 | 0072 | | STR | XVINP,R0 | | 00650000 |
| 743 | 043C | 3B04 | 0086 | | IN | R0,YIPRT | | 00651000 |
| 744 | 0440 | B301 | 0004 | | SLL | R0,4 | | 00652000 |
| 745 | 0444 | 6F00 | 0074 | | STR | YVINP,R0 | | 00653000 |
| 746* | | | | | | | | 00654000 |
| 747 | 0448 | C009 | | | LDB | =H09,R0 | APPLY HOLDING TORQUE TO STEPPER MOTOR | 00654100 |
| 748 | 044A | 3A06 | 0101 | | OUTB | R0,STEPR | | 00654200 |
| 749 | 044E | 6E00 | 00C8 | | STRB | MOTOR,R0 | | 00654300 |
| 750* | | | | | | | | 00654400 |
| 751 | 0452 | 2100 | 0000 | | LD | =LTABLE,R0 | RAISE PEN | 00655000 |
| 752 | 0456 | 6F00 | 0008 | | STR | PNTER,R0 | | 00656000 |
| 753 | 045A | 4C08 | 0186 | | CLRB | JSFLG | | 00657000 |
| 754 | 045E | 4D05 | 00FC | 05DC | STRI | TURTI,=D1500 | | 00658000 |
| 755 | 0464 | C000 | | | LDB | =H00,R0 | | 00659000 |
| 756 | 0466 | 6F00 | 00CA | | STRB | PENIO,R0 | | 00660000 |
| 757 | 046A | 3A06 | 0103 | | OUTB | R0,PENLF | | 00661000 |
| 758 | 046E | 4D05 | 00F4 | FFFF | STRI | TIME,=HFFFF | | 00661100 |
| 759 | 0474 | 4D05 | 0142 | FFFF | STFI | UP,=D-1 | | 00662000 |
| 760* | | | | | | | | 00663000 |
| 761 | 047A | 2100 | 04E6 | | LD | =LSERVO,R0 | LOAD INTERRUPT TABLE | 00664000 |

```
762   047E                        STRCTL R1,PSAP                          00665000
763   0480   7D15                 AND    =H2E,R1                          00666000
764   0484   0101 002E            LDKH   8,R2                             00667000
765   0486   C208          EIGHT  STR    (R1),R0                          00668000
766   0488   2F10                 INC    R1,2                             00669000
767   048A   A911                 DBJNZ EIGHT,R2                          00670000
         F203
768*                                                                      00671000
769   048C   7C01                 DI                                      00676320
770   048E   C0FF                 LDB    =HFF,R0                          00676330
771   0490   6E00 00C2            STRB   MASK,R0                          00676340
772   0494   3A06 0205            OUTB   R0,205H                          00676350

773*                                                            FIND ABSOLUTE  00677100
                                                                POSITION
774   0498   4D05 0042 0007       STRI   CMTMP,=D7                        00677200
775   049E   4D05 0016 FFFF       STRI   MBRDY,=HFFFF                     00677300
776   04A4   4C05 0190 FFFF       STRIB  NORST,=HFF                       00677301
777   04AA   7C05                 EI                                      00677310
778   04AC   DFEA                 CALR   KWAIT                            00677400
779   04AE   4D05 0042 000A       STRI   CMTMP,=D10                       00677500
780   04B4   4D05 0016 FFFF       STRI   MBRDY,=HFFFF                     00677600
781   04BA   DFF1                 CALR   KWAIT                            00677601
                                                            INITIALIZE JOY STICK
782   04BC   5F00 1B04            CALL   WHLDN                            00677602
783   04C0   5F00 1B16            CALL   WHLUP                            00677603
784   04C4   3A04 0105            INB    R0,LEDWD                         00677610
785   04C8   A603                 BITB   R0,3                             00677620
786   04CA   9E06                 RET    Z                                00677630
787   04CC   DFFA                 CALR   KWAIT                            00677640
                                                            INITIALIZE PEN TURRET
788   04CE   D8A0                 CALR   ITSET                            00677700
789   04D0   4D08 00FA            CLR    BUTON                            00677701
790   04D4   4C08 0190            CLRB   NORST                            00677710
791   04D8   9E08                 RET                                     00678000

792*
793*******************************************************************   00678010
794**  PROCEDURE TO ALLOW BACKGROUND IO CONTROL IN WAIT              **   00678020
795**  LOOP DURRING INITIALIZATION                                   **   00678030
                                                                          00678040
796   04DA   5F00 002E     KWAIT  CALL   KLUGE                            00678050
797   04DE   4D04 0016            TEST   MBRDY                            00678060
798   04E2   EEFB                 JR     KWAIT,NZ                         00678070
799   04E4   9E08                 RET                                     00678080
800*
801*SP
802*
803******************************************************************    00688000
804**    CALCULATE ERROR AND DO I/O                                **     00689000
805******************************************************************
806*
807*  CALCULATE THE CHANGE IN THE X AND Y COUNTERS
808*  SINCE THE LAST INTERRUPT
809*
810   04E6   3A06 0207     SERVO  OUTB   R0,0207H
811   04EA   5C09 000F 00D2       STRM   TEMPI,R0,16
```

| | | | | | | |
|---|---|---|---|---|---|---|
| 812 | 04F0 | C000 | | LDKB | 0,R0 | | 00690000 |
| 813 | 04F2 | 3A06 0205 | | OUTB | R0,205H | TEMPORARY | 00691000 |
| 814 | 04F6 | 7C05 | | EI | VI | TEMPERARY | 00692000 |
| 815 | 04F8 | 3A06 0203 | | OUTB | R0,203H | TEMPERARY | 00693000 |
| 816 | 04FC | 3B04 0084 | | IN | R0,XIPRT | TEMPERARY | 00694000 |
| 817 | 0500 | 8100 | | ADD | R0,R0 | READ THE X AND Y COUNTER | 00695000 |
| 818 | 0502 | 8100 | | ADD | R0,R0 | | 00696000 |
| 819 | 0504 | 8100 | | ADD | R0,R0 | | 00697000 |
| 820 | 0506 | 8100 | | ADD | R0,R0 | | 00698000 |
| 821 | 0508 | 6103 0072 | | LD | XVINP,R3 | | 00699000 |
| 822 | 050C | 6F00 0072 | | STR | XVINP,R0 | UPDATE XVINP AND YVINP | 00700000 |
| 823 | 0510 | 8303 | | SUB | R0,R3 | XDIF=XVINP-(XIPRT) | 00701000 |
| 824 | 0512 | B339 FFFC | | SRA | R3,4 | | 00702000 |
| 825 | 0516 | 3A14 0086 | | IN | R1,YIPRT | | 00703000 |
| 826 | 051A | 8111 | | ADD | R1,R1 | | 00704000 |
| 827 | 051C | 8111 | | ADD | R1,R1 | | 00705000 |
| 828 | 051E | 8111 | | ADD | R1,R1 | | 00706000 |
| 829 | 0520 | 8111 | | ADD | R1,R1 | | 00707000 |
| 830 | 0522 | 6105 0074 | | LD | YVINP,R5 | | 00708000 |
| 831 | 0526 | 6F01 0074 | | STR | YVINP,R1 | | 00709000 |
| 832 | 052A | 8315 | | SUB | R1,R5 | | 00710000 |
| 833 | 052C | B359 FFFC | | SRA | R5,4 | | 00711000 |
| 834* | | | | | | YDIF=YVINP-(YIPRT) | 00712000 |
| 835 | 0530 | 2107 03E8 | | LD | =D1000,R7 | TEST FOR EXCESSIVE VELOSITY | 00713000 |
| 836 | 0534 | 2108 FC18 | | LD | =D-1000,R8 | | 00714000 |
| 837 | 0538 | 8B83 | | CMP | R8,R3 | | 00715000 |
| 838 | 053A | 5E01 11CE | | JP | TRAP25,LT | TRAP TO TRAP5 FOR X AXIS | 00716000 |
| 839 | 053E | 8B73 | | CMP | R7,R3 | TRAP TO TRAP6 FOR YAXIS | 00717000 |
| 840 | 0540 | 5E0A 11CE | | JP | TRAP25,GT | | 00718000 |
| 841 | 0544 | 8B85 | | CMP | R8,R5 | | 00719000 |
| 842 | 0546 | 5E01 11D2 | | JP | TRAP26,LT | | 00720000 |
| 843 | 054A | 8B75 | | CMP | R7,R5 | | 00721000 |
| 844 | 054C | 5E0A 11D2 | | JP | TRAP26,GT | | 00722000 |
| 845* | | | | | | (XHAVE AND YHAVE ARE NEGATIVE) | 00723000 |
| 846 | 0550 | B12A | | EXTS | R2 | | 00724000 |
| 847 | 0552 | B14A | | EXTS | R4 | | 00725000 |
| 848* | | | | | | | 00726000 |
| 849 | 0554 | 5602 0076 | | ADDL | XHAVE,R2 | XHAVE=XHAVE+XDIF | 00727000 |
| 850 | 0558 | 5604 007A | | ADDL | YHAVE,R4 | YHAVE=YHAVE+YDIF | 00728000 |
| 851 | 055C | 5D02 0076 | | STRL | XHAVE,R2 | | 00729000 |
| 852 | 0560 | 5D04 007A | | STRL | YHAVE,R4 | | 00730000 |
| 853* | | | | | | | 00731000 |
| 854 | 0564 | 5602 0060 | | ADDL | XWANT,R2 | ERROR=WANT-HAVE (SUMMING JCTN) | 00732000 |
| 855 | 0568 | 5204 0068 | | SUBL | YWANT,R4 | | 00733000 |
| 856* | | | | | | | 00734000 |
| 857 | 056C | 1406 0000 03E8 | | LDL | =D1000,R6 | TEST FOR EXCESSIVE DRIVE FORCE | 00735000 |
| 858 | 0572 | 1408 FFFF FC18 | | LDL | =D-1000,R8 | | 00736000 |
| 859 | 0578 | 9082 | | CMPL | R8,R2 | TRAP TO TRAP7 ON X AXIS | 00737000 |
| 860 | 057A | 5E01 11D6 | | JP | TRAP27,LT | TRAP TO TRAP8 ON Y AXIS | 00738000 |

| | | | | | | |
|---|---|---|---|---|---|---|
| 861 | 057E | 9062 | | CMPL | R6,R2 | 00739000 |
| 862 | 0580 | 5E0A 11D6 | | JP | TRAP27,GT | 00740000 |
| 863 | 0584 | 9084 | | CMPL | R8,R4 | 00741000 |
| 864 | 0586 | 5F01 11FE | | JP | TRAP28,LT | 00742000 |
| 865 | 058A | 9064 | | CMPL | R6,R4 | 00743000 |
| 866 | 058C | 5E0A 11FE | | JP | TRAP28,GT | 00744000 |
| 867* | | | | | | |
| 868 | 0590 | B339 FFFF | | SRA | R3,1 | 00745000 |
| 869 | 0594 | B359 FFFF | | SRA | R5,1 | |
| 870* | | | OK | | | 00747000 |
| 871 | 0598 | 6100 00D0 | | LD | ENDPT,R0 | 00749000 |
| 872 | 059C | 3B06 0088 | | OUT | R0,STRTEND | 00750000 |
| 873 | 05A0 | 3B36 0080 | | OUT | R3,XOPRT | 00751000 |
| 874 | 05A4 | 3B56 0082 | | OUT | R5,YOPRT | 00752000 OUTPUT ERROR SIGNAL |
| 875* | | | | | | 00753000 |
| 876* | | | | | | 00753100 |
| 877 | 05A8 | 5F00 0033 | | CALL | RAM1 | RAM LINK FOR PROG MODIFICATION 00753200 |
| 878* | | | | | | 00753300 |
| 879 | 05AC | 5400 001A | | LDL | NN,R0 | IF THIS IS THE FIRST INT OF A VECTOR 00754000 |
| 880 | 05B0 | 9C08 | | TESTL | R0 | GO TO NEXT; 00755000 |
| 881 | 05B2 | 5E0E 06DA | | JP | PARSR,NZ | ELSE GO TO PARSR 00756000 |
| 882* | READ PARAMETERS FROM BUFFER | | | | | |
| 883* | IF NN IS ZERO AND INITIALIZE | | | | | 00757000 |
| 884* | | | | | | 00758000 |
| 885* | | | | | | 00759000 |
| 886 | 05B6 | 4D04 0016 | NEXT | TEST | MBRDY | HAS BUFFER BEEN LOADED? 00760000 |
| 887 | 05BA | EE1A | | JR | PARS1,NZ | IF SO READ BUFFER 00761000 |
| 888* | | | | | | 00762000 |
| 889 | 05BC | 5400 00CC | | LDL | LASTMOVE,R0 | INCREMENT COUNTER 00763000 |
| 890 | 05C0 | 1000 0001 86A0 | | CMPL | =D100000,R0 | USED WHEN NOTHING 00764000 |
| 891* | | JP PENAWAY,EQ | | | | IS BEING DONE 00765000 |
| 892 | 05C6 | 5E0A 08D0 | | JP | RETURN,GT | 00766000 |
| 893 | 05CA | 1600 0000 0001 | | ADDL | =D1,R0 | 00767000 |
| 894 | 05D0 | 5D00 00CC | | STRL | LASTMOVE,R0 | 00768000 |
| 895* | | | | | | 00769000 |
| 896 | 05D4 | 5000 0030 | | CMPL | PTIME,R0 | IF NOTHING FOR 1 MIN, PUT PEN AWAY 00770000 |
| 897 | 05D8 | 5E06 1AAC | | JP | PENAWAY,EQ | 00771000 |
| 898* | | | | | | 00772000 |
| 899 | 05DC | 1000 0000 0005 | | CMPL | =D5,R0 | IF NOTHING FOR 5 MS REDUCE BANDWIDTH 00773000 |
| 900 | 05E2 | 5E0E 08D0 | | JP | RETURN,NE | 00774000 |
| 901* | | | | | | 00775000 |
| 902 | 05E6 | 4D05 00D0 E000 | | STRI | ENDPT,=HE000 | 00776000 |
| 903 | 05EC | 5E08 08D0 | | JP | RETURN | 00777000 |
| 904* | | | | | | 00779000 |
| 905 | 05F0 | 5D00 00CC | PARS1 | STRL | LASTMOVE,R0 | 00779100 |
| 906 | 05F4 | 610C 0042 | | LD | CMTMP,R12 | 00780000 |
| 907 | 05F8 | 6F0C 0070 | | STR | CMAND,R12 | COMAND NUM 00781000 |
| 908 | 05FC | ABC0 | | DEC | R12,1 | 00782000 |
| 909 | 05FE | E519 | | JR | PAINT,M | 0 00783000 |
| 910 | 0600 | 5E06 0A46 | | JP | LFTPEN,Z | 1 00784000 |

| Line | Addr | Hex | | | Label | Op | Operand | Comment | Seq |
|---|---|---|---|---|---|---|---|---|---|
| 911 | 0604 | ABC1 | 0AD8 | | | DEC | R12,2 | | 00785000 |
| 912 | 0606 | 5E05 | 0B3C | | | JP | LWRPEN,M | | 00786000 |
| 913 | 060A | 5E06 | | | | JP | CLINT,Z | | 00787000 |
| 914 | 060E | ABC1 | | | | DEC | R12,2 | | 00788000 |
| 915 | 0610 | 5E05 | 0B8E | | | JP | CHINT,M | | 00789000 |
| 916 | 0614 | 5F06 | 0D96 | | | JP | LIMITFND,Z | | 00790000 |
| 917 | 0618 | ABC1 | | | | DEC | R12,2 | | 00791000 |
| 918 | 061A | 5E05 | 12A0 | | | JP | SELPN,M | | 00792000 |
| 919 | 061E | 5F06 | 0C34 | | | JP | INITL,Z | | 00793000 |
| 920 | 0622 | ABC1 | | | | DEC | R12,2 | | 00794000 |
| 921 | 0624 | 5E05 | 1700 | | | JP | JOYST,M | | 00795000 |
| 922 | 0628 | 5E06 | 08D0 | | | JP | RETURN,Z | | 00796000 |
| 923 | 062C | ABC1 | | | | DEC | R12,2 | | 00797000 |
| 924 | 062E | 5E08 | 1B42 | | | JP | CHKPAPER | | 00798000 |
| 925* | | | | | | | | | 00799000 |
| 926 | 0632 | 5402 | 001E | | PAINT | LDL | NATMP,R2 | | 00800000 |
| 927 | 0636 | 5D02 | 0044 | | | STRL | NA,R2 | | 00801000 |
| 928 | 063A | 5408 | 0022 | | | LDL | NSTMP,R8 | | 00802000 |
| 929 | 063E | 5D08 | 0048 | | | STRL | NS,R8 | | 00803000 |
| 930 | 0642 | 5408 | 0026 | | | LDL | NDTMP,R8 | | 00804000 |
| 931 | 0646 | 5D08 | 004C | | | STRL | ND,R8 | | 00805000 |
| 932 | 064A | 4D05 | 00D0 | 2000 | | STRI | ENDPT,=H2000 | | 00806000 |
| 933 | 0650 | 5408 | 003A | | | LDL | XSTRT,R8 | | 00807000 |
| 934 | 0654 | 5D08 | 0060 | | | STRL | XWANT,R8 | | 00808000 |
| 935 | 0658 | 5D00 | 0064 | | | STRL | XWANT+4,R0 | | 00809000 |
| 936 | 065C | 5408 | 003E | | | LDL | YSTRT,R8 | | 00810000 |
| 937 | 0660 | 5D08 | 0068 | | | STRL | YWANT,R8 | | 00811000 |
| 938 | 0664 | 5D00 | 006C | | | STRL | YWANT+4,R0 | | 00812000 |
| 939 | 0668 | 5404 | 002A | | | LDL | XATMP,R4 | | 00813000 |
| 940 | 066C | 5D04 | 0050 | | | STRL | XACCL,R4 | | 00814000 |
| 941 | 0670 | 5406 | 002E | | | LDL | XATMP+4,R6 | | 00815000 |
| 942 | 0674 | 5D06 | 0054 | | | STRL | XACCL+4,R6 | | 00816000 |
| 943 | 0678 | 5408 | 0032 | | | LDL | YATMP,R8 | | 00817000 |
| 944 | 067C | 5D08 | 0058 | | | STRL | YACCL,R8 | | 00818000 |
| 945 | 0680 | 540A | 0036 | | | LDL | YATMP+4,R10 | | 00819000 |
| 946 | 0684 | 5D0A | 005C | | | STRL | YACCL+4,R10 | | 00820000 |
| 947 | 0688 | 4D08 | 0016 | | | CLR | MBRDY | | 00821000 |
| 948* | | | | | | | | | 00822000 |
| 949 | 068C | 4D04 | 0018 | | | TEST | SWOOP | | 00823000 |
| 950 | 0690 | EE50 | | | | JR | ACLRT,NZ | | 00824000 |
| 951 | 0692 | BDC0 | | | | LDK | 0,R12 | | 00825000 |
| 952 | 0694 | 8D40 | | | | COM | R4 | | 00826000 |
| 953 | 0696 | 8D50 | | | | COM | R5 | | 00827000 |
| 954 | 0698 | 8D60 | | | | COM | R6 | | 00828000 |
| 955 | 069A | 8D70 | | | | COM | R7 | | 00829000 |
| 956 | 069C | 1606 | 0000 | 0001 | | ADDL | =D1,R6 | | 00830000 |
| 957 | 06A2 | B5C5 | | | | ADC | R12,R5 | | 00831000 |
| 958 | 06A4 | B5C4 | | | | ADC | R12,R4 | | 00832000 |
| 959 | 06A6 | B34D | FFFF | | | SRAL | R4,1 | | 00833000 |

Comments column (right side annotations):
- Line 927: NA,R2 ;2
- Line 929: NS,R8 ;3
- Line 931: ND,R8 ;4
- Line 932: ENDPT,=H2000 ;5
- Line 934: XWANT,R8 ;6
- Line 935: XWANT+4,R0 ;7
- Line 937: YWANT,R8 ;8
- Line 938: YWANT+4,R0 ;9
- Line 940: XACCL,R4 ;10

PAINT ; READ IN NEW PARAMETERS

| Line | Addr | Bytes | | Label | Op | Operand | Comment | Seq |
|---|---|---|---|---|---|---|---|---|
| 960 | 06AA | B36C | | | RRC | R6,1 | | 00835000 |
| 961 | 06AC | B37C | | | RRC | R7,1 | | 00836000 |
| 962 | 06AE | 8D80 | | | COM | R8 | | 00837000 |
| 963 | 06B0 | 8D90 | | | COM | R9 | | 00838000 |
| 964 | 06B2 | 8DA0 | | | COM | R10 | | 00839000 |
| 965 | 06B4 | 8DB0 | | | COM | R11 | | 00840000 |
| 966 | 06B6 | 160A 0000 0001 | | | ADDL | =D1,R10 | | 00841000 |
| 967 | 06BC | B5C9 | | | ADC | R12,R9 | | 00842000 |
| 968 | 06BE | B5C8 | | | ADC | R12,R8 | | 00843000 |
| 969 | 06C0 | B38D FFFF | | | SRAL | R8,1 | | 00844000 |
| 970 | 06C4 | B3AC | | | RRC | R10,1 | | 00845000 |
| 971 | 06C6 | B3BC | | | RRC | R11,1 | | 00846000 |
| 972 | 06C8 | 5D04 0086 | | | STRL | AXDIF,R4 | | 00847000 |
| 973 | 06CC | 5D06 008A | | | STRL | AXDIF+4,R6 | | 00848000 |
| 974 | 06D0 | 5D08 008E | | | STRL | AYDIF,R8 | | 00849000 |
| 975 | 06D4 | 5D0A 0092 | | | STRL | AYDIF+4,R10 | | 00850000 |
| 976 | 06D8 | E81C | | | JR | PLOTT | | 00851000 |
| 977* | | | | | | | | 00852000 |
| 978* | | | | | | | | 00853000 |
| 979 | 06DA | 610C 0070 | | PARSR | LD | CMAND,R12 | | 00854000 |
| 980 | 06DE | ABC0 | | | DEC | R12,1 | | 00855000 |
| 981 | 06E0 | E51B | | | JP | PLOTT,M | COMAND NUM | 00856000 |
| 982 | 06E2 | 5E06 0A46 | | | JP | LFTPEN,Z | 0 | 00857000 |
| 983 | 06E6 | ABC1 | | | DEC | R12,2 | 1 | 00858000 |
| 984 | 06E8 | 5E05 0A0H | | | JP | LWRPEN,M | | 00859000 |
| 985 | 06EC | 5F06 0B4E | | | JP | LFTGT,Z | 2 | 00860000 |
| 986 | 06F0 | ABC1 | | | DEC | R12,2 | 3 | 00861000 |
| 987 | 06F2 | 5E05 0BA0 | | | JP | LWRGT,M | 4 | 00862000 |
| 988 | 06F6 | 5E06 0D96 | | | JP | LIMITFND,Z | 5 | 00863000 |
| 989 | 06FA | ABC1 | | | DEC | R12,2 | | 00864000 |
| 990 | 06FC | 5E05 12A0 | | | JP | SELPN,M | 6 | 00865000 |
| 991 | 0700 | 5E06 0C34 | | | JP | INITL,Z | 7 | 00866000 |
| 992 | 0704 | ABC1 | | | DEC | R12,2 | | 00867000 |
| 993 | 0706 | 5E05 1700 | | | JP | JOYST,M | | 00868000 |
| 994 | 070A | 5E06 1A3E | | | JP | SAFTY,Z | 9 | 00869000 |
| 995 | 070E | 5E08 1B42 | | | JP | CHKPAPER | 10 | 00870000 |
| 996* | | | | *********************************** | | | | 00871000 |
| 997* | | | | ** CALCULATION OF TRAJECTORY FUNCTION ** | | | | 00872000 |
| 998* | | | | *********************************** | | | | 00873000 |
| 999* | | | | | | | | 00874000 |
| 1000* | | | | | | | | 00875000 |
| 1001* | | | | | | | | 00876000 |
| 1002 | 0712 | 5402 0044 | | PLOTT | LDL | NA,R2 | | 00877000 |
| 1003 | 0716 | 9002 | | | CMPL | R0,R2 | | 00878000 |
| 1004 | 0718 | EA0C | | | JR | ACLRT,GT | | 00879000 |
| 1005 | 071A | E646 | | | JR | PRESL,EQ | | 00880000 |
| 1006 | 071C | 5602 0048 | | | ADDL | NS,R2 | | 00881000 |
| 1007 | 0720 | 9002 | | | CMPL | R0,R2 | | 00882000 |
| 1008 | 0722 | EA6D | | | JR | SLEW,GT | | 00883000 |
| 1009 | 0724 | 5602 004C | | | ADDL | ND,R2 | | 00884000 |

```
1010   0728   9002           CMPL  R0,R2                              00885000
1011   072A   5E0A 0848      JP    DECEL,GT                           00886000
1012   072E   5E08 08BC      JP    LASTI                              00887000
1014*  IF THIS IS THE ACCELERATING                                    00888000
1015*  PART OF A MOVE, TWORD=NN**2                                    00889000
1016*                                                                 00890000
                                                                      00891000
1017   0732   1600 0000 0001 ACLRT ADDL  =D1,R0                       00892000
1018   0738   5D00 001A            STRL  NN,R0                        00893000
1019   073C   5400 0086            LDL   AXDIF,R0                     00894000
1020   0740   5400 008A            LDL   AXDIF+4,R2                   00895000
1021   0744   5404 0050            LDL   XACCL,R4                     00896000
1022   0748   5406 0054            LDL   XACCL+4,R6                   00897000
1023   074C   9662                 ADDL  R6,R2                        00898000
1024   074E   B551                 ADC   R5,R1                        00899000
1025   0750   B540                 ADC   R4,R0                        00900000
1026   0752   5D00 0086            STRL  AXDIF,R0        AXDIF=AXDIF+XACCL   00901000
1027   0756   5D02 008A            STRL  AXDIF+4,R2                   00902000
1028*                                                                 00903000
1029   075A   5404 0060            LDL   XWANT,R4                     00904000
1030   075E   5406 0064            LDL   XWANT+4,R6                   00905000
1031   0762   9662                 ADDL  R6,R2                        00906000
1032   0764   B551                 ADC   R5,R1                        00907000
1033   0766   B540                 ADC   R4,R0                        00908000
1034   0768   5D00 0060            STRL  XWANT,R0        XWANT=XWANT+AXDIF  00909000
1035   076C   5D02 0064            STRL  XWANT+4,R2                   00910000
1036*                                                                 00911000
1037   0770   5400 008E            LDL   AYDIF,R0                     00912000
1038   0774   5402 0092            LDL   AYDIF+4,R2                   00913000
1039   0778   5404 0058            LDL   YACCL,R4                     00914000
1040   077C   5406 005C            LDL   YACCL+4,R6                   00915000
1041   0780   9662                 ADDL  R6,R2                        00916000
1042   0782   B551                 ADC   R5,R1                        00917000
1043   0784   B540                 ADC   R4,R0                        00918000
1044   0786   5D00 008E            STRL  AYDIF,R0        AYDIF=AYDIF+YACCL  00919000
1045   078A   5D02 0092            STRL  AYDIF+4,R2                   00920000
1046*                                                                 00921000
1047   078E   5400 0068            LDL   YWANT,R4                     00922000
1048   0792   5406 006C            LDL   YWANT+4,R6                   00923000
1049   0796   9662                 ADDL  R6,R2                        00924000
1050   0798   B551                 ADC   R5,R1                        00925000
1051   079A   B540                 ADC   R4,R0                        00926000
1052   079C   5D00 0068            STRL  YWANT,R0        YWANT=YWANT+AYDIF  00927000
1053   07A0   5D02 006C            STRL  YWANT+4,R2                   00928000
1054*                                                                 00929000
1055   07A4   5E08 08D0            JP    RETURN                       00930000
1056*                                                                 00931000
1057*  IF THIS IS THE SLEWING PART OF A                               00932000
1058*  MOVE, TWORD=2NA*NN-NA**2                                       00933000
1059*                                                                 00934000
```

```
1060  07A8                  PRESL TESTL NS                         00935000
1061  07AC  5C08 0048             JR    DECEL,Z                    00936000
1062  07AE  E64D                  LDL   XACCL,R0                   00937000
1063  07B2  5400 0050             LDL   XACCL+4,R2                 00938000
1064  07B6  5402 0054             LDL   AXDIF,R4                   00939000
1065  07BA  5404 0086             LDL   AXDIF+4,R6                 00940000
1066  07BE  5406 008A             SRAL  R0,1                       00941000
1067  07C2  B30D FFFF             RRC   R2,1                       00942000
1068  07C4  B32C                  RRC   R3,1                       00943000
1069  07C6  B33C                  ADDL  R2,R6                      00944000
1070  07C8  9626                  ADC   R1,R5                      00945000
1071  07CA  B515                  ADC   R0,R4                      00946000
1072  07CC  B504                  STRL  VXMAX,R4                   00947000
1073  07CE  5D04 0096             STRL  VXMAX+4,R6                 00948000
1074* 07D0  5D06 009A
                                                                   00949000
1075  07D4  5400 0058             LDL   YACCL,R0                   00950000
1076  07D8  5402 005C             LDL   YACCL+4,R2                 00951000
1077  07DC  5404 008E             LDL   AYDIF,R4                   00952000
1078  07E0  5406 0092             LDL   AYDIF+4,R6                 00953000
1079  07E4  B30D FFFF             SRAL  R0,1                       00954000
1080  07E8  B32C                  RRC   R2,1                       00955000
1081  07EA  B33C                  RRC   R3,1                       00956000
1082  07EC  9626                  ADDL  R2,R6                      00957000
1083  07EE  B515                  ADC   R1,R5                      00958000
1084  07F0  B504                  ADC   R0,R4                      00959000
1085  07F2  5D04 009E             STRL  VYMAX,R4                   00960000
1086  07F6  5D06 00A2             STRL  VYMAX+4,R6                 00961000
1087  07FA  5400 001A             LDL   NN,R0                      00962000
1088*
                                                                   00963000
1089  07FE  1600 0000 0001  SLEW  ADDL  =D1,R0                     00964000
1090  0804  5D00 001A             STRL  NN,R0                      00965000
1091  0808  5400 0060             LDL   XWANT,R0                   00966000
1092  080C  5402 0064             LDL   XWANT+4,R2                 00967000
1093  0810  5404 0096             LDL   VXMAX,R4                   00968000
1094  0814  5406 009A             LDL   VXMAX+4,R6                 00969000
1095  0818  9662                  ADDL  R6,R2                      00970000
1096  081A  B551                  ADC   R5,R1                      00971000
1097  081C  B540                  ADC   R4,R0                      00972000
1098  081E  5D00 0060             STRL  XWANT,R0                   00973000
1099  0822  5D02 0064             STRL  XWANT+4,R2                 00974000
1100*
                                                                   00975000
1101  0826  5400 0068             LDL   YWANT,R0                   00976000
1102  082A  5402 006C             LDL   YWANT+4,R2                 00977000
1103  082E  5404 009E             LDL   VYMAX,R4                   00978000
1104  0832  5406 00A2             LDL   VYMAX+4,R6                 00979000
1105  0836  9662                  ADDL  R6,R2                      00980000
1106  0838  B551                  ADC   R5,R1                      00981000
1107  083A  B540                  ADC   R4,R0                      00982000
1108  083C  5D00 0068             STRL  YWANT,R0                   00983000
1109  0840  5D02 006C             STRL  YWANT+4,R2                 00984000
```

XWANT=XWANT+VXMAX

YWANT=YWANT+VYMAX

```
1110*
1111    0844    5E0B 0BD0                               JP      RETURN                                                          00985000
1112*                                                                                                                           00986000
1113*   IF THIS IS THE DECELERATING PART OF                                                                                     00987000
1114*   A MOVE TWORD=2NA*NN-NA**2-(NN-NA-NS)**2                                                                                 00988000
1115*       .                                                                                                                   00989000
1116    0848    1600 0000 0001   DECEL    ADDL   =D1,R0                                                                         00990000
1117    084E    5D00 001A                               STRL    NN,R0                                                           00991000
1118    0852    5404 0086                               LDL     AXDIF,R4                                                        00992000
1119    0856    5406 008A                               LDL     AXDIF+4,R6                                                      00993000
1120    085A    5400 0060                               LDL     XWANT,R0                                                        00994000
1121    085E    5402 0064                               LDL     XWANT+4,R2                                                      00995000
1122    0862    9662                                    ADDL    R6,R2                                                           00996000
1123    0864    B551                                    ADC     R5,R1                                                           00997000
1124    0866    B540                                    ADC     R4,R0                                                           00998000
1125    0868    5D00 0060                               STRL    XWANT,R0             XWANT=XWANT+AXDIF                          00999000
1126    086C    5D02 0064                               STRL    XWANT+4,R2                                                      01000000
1127*                                                                                                                           01001000
1128    0870    5400 0050                               LDL     XACCL,R0                                                        01002000
1129    0874    5402 0054                               LDL     XACCL+4,R2                                                      01003000
1130    0878    9226                                    SUBL    R2,R6                                                           01004000
1131    087C    B715                                    SBC     R1,R5                                                           01005000
1132    087E    B704                                    SBC     R0,R4                                                           01006000
1133    0880    5D04 0086                               STRL    AXDIF,R4             AXDIF=AXDIF+XACCL                          01007000
1134    0882    5D06 008A                               STRL    AXDIF+4,R6                                                      01008000
1135*                                                                                                                           01009000
1136    0886    5404 008E                               LDL     AYDIF,R4                                                        01010000
1137    088A    5406 0092                               LDL     AYDIF+4,R6                                                      01011000
1138    088E    5400 0068                               LDL     YWANT,R0                                                        01012000
1139    0892    5402 006C                               LDL     YWANT+4,R2                                                      01013000
1140    0896    9662                                    ADDL    R6,R2                                                           01014000
1141    0898    B551                                    ADC     R5,R1                                                           01015000
1142    089A    B540                                    ADC     R4,R0                                                           01016000
1143    089C    5D00 0068                               STRL    YWANT,R0             YWANT=YWANT+AYDIF                          01017000
1144    08A0    5D02 006C                               STRL    YWANT+4,R2                                                      01018000
1145*                                                                                                                           01019000
1146    08A4    5400 0058                               LDL     YACCL,R0                                                        01020000
1147    08A8    5402 005C                               LDL     YACCL+4,R2                                                      01021000
1148    08AC    9226                                    SUBL    R2,R6                                                           01022000
1149    08AE    B715                                    SBC     R1,R5                                                           01023000
1150    08B0    B704                                    SBC     R0,R4                                                           01024000
1151    08B2    5D04 008E                               STRL    AYDIF,R4             AYDIF=AYDIF+XACCL                          01025000
1152    08B6    5D06 0092                               STRL    AYDIF+4,R6                                                      01026000
1153*                                                                                                                           01027000
1154    08BA    E80A                                    JR      RETURN                                                          01028000
1155*                                                                                                                           01029000
1156*   IF THIS IS THE LAST MOVE OF A                                                                                           01030000
1157*   VECTOR, SET UP THE NEXT COMMAND                                                                                         01031000
1158*                                                                                                                           01032000
1159    08BC    HD00            LASTI    LDK    0,R0               RESET NN AND CHECK TO SEE                                    01033000
1160    08BE    A101                     LD     R0,R1              IF ANOTHER MOVE HAS BEEN SET UP                              01034000
                                                                                                                                01035000
```

```
1161  08C0              STRI  NN,R0                                                     01036000
1162  08C4  5F00 001A   INB   R2,LEDWD    CHECK SAFTY SWITCH                             01036100
1163  08C8  3A24 0105   BITB  R2,7                                                       01036200
1164  08CA  A627        JR    STOP,Z                                                     01036300
1165  08CC  E624        JP    NEXT                                                       01037000
1166*       5E08 05B6
1167*SP                                                                                  01038000
1168  08D0              RETURN CALL RAM2  RAM LINK FOR PROGRAM MODIFICATION              01038100
1169  08D4  5F00 0034   INB   R0,LEDWD    CHECK TO SEE IF TURET IS PRESENT               01038200
1170  08D8  3A04 0105   BITB  R0,3                                                       01039000
1171  08DA  A603        JR    TOUT,Z                                                     01040000
1172*       E60E                                                                         01041000
1173  08DC  4D04 0012   TEST  PENTU       COME HERE IF THERE IS A TURET PRESENT          01042000
1174  08E0  EE14        JR    OSHA,NZ     IF THE TURET IS INITED CHECK FRONT PANEL       01043000
1175*                                                                                    01044000
1176  08E2  6B00 00FC   DEC   TURTI,1     IF NOT TIME TO INIT CHECK FP                   01045000
1177  08E6  EA11        JR    OSHA,GT                                                    01046000
1178*                                                                                    01047000
1179  08E8  4D01 00FA 0004  INTUR CMPI BUTON,=D4  BUTON MUST NOT BE OVERLAYED            01048000
1180  08EE  E678        JR    IGNOR,EQ                                                   01048100
1181*                                                                                    01048200
1182  08F0  4D05 00FA 0001        STRI  BUTON,=D1  INSTRUCTION TO INIT TURRET AND        01048300
1183  08F6  E874                  JR    IGNOR      IGNORE THE FP UNTIL IT IS DONE        01049000
1184*                                                                                    01050000
1185  08F8  4D08 0003   TOUT  CLR   TURVA          IF NO TURRET CLEAR FLAG AND CHECK FP  01051000
1186  08FC  4D08 0012         CLR   PENTU                                                01052000
1187  0900  4D08 0031         CLR   LASTG                                                01053000
1188  0904  4D05 00FC 03E8    STRI  TURTI,=D1000                                         01053100
1189*                                                                                    01054000
1190  090A  A607        OSHA  BITB  R0,7                                                 01055000
1191  090C  EE0A        JR    FTPNL,NZ                                                   01056000
1192*                                                                                    01057000
1193  090E  5C08 001A   TESTL NN                                                         01058000
1194  0912  EE66        JR    IGNOR,NZ                                                   01059000
1195*                                                                                    01060000
1196  0914  4D05 001C 0001  STRI  NN+2,=D1                                               01061000
1197  091A  4D05 0070 0009  STRI  CMAND,=D9                                              01062000
1198  0920  E85F              JR    IGNOR                                                01063000
1199*                                                                                    01064000
1200  0922  4D01 00FA 0001  FTPNL CMPI BUTON,=D1   DO NOT OVERLAY BUTON=1                01065000
1201  0928  E65B              JR    IGNOR,EQ                                             01066000
1202  092A  4C04 0186         TESTB JSFLG          DO NOT CHECK FRONT PANEL OR MODIFY    01067000
1203  092E  E558              JR    IGNOR,M        JOYSTICK HARDWARE IN JOYSTICK MODE    01068000
1204  0930  C000              LDKB  0,R0                                                 01069000
1205  0932  6101 0021         LD    LEDST,R1                                             01070000
1206  0936  8D10              COM   R1                                                   01071000
1207  0938  3A06 010D         OUTB  R0,KEYOT                                             01072000
1208  093C  3A04 010B         INB   R0,KEYIN                                             01073000
1209  0940  3A96 010D         OUTB  R9,KEYOT                                             01074000
1210  0944  4A00 00F8         CMPB  LASTK,R0                                             01075000
                                                                                         01076000
```

| | | | | | |
|---|---|---|---|---|---|
| 1211 | 0948 | EF04 | | JR | GLITCH,NE | 01077000 |
| 1212 | 094A | 4C05 000C 0505 | | STRB | DEBNC,=D5 | 01078000 |
| 1213 | 0950 | E81A | | JR | JOYCK | 01079000 |
| 1214* | | | | | | 01080000 |
| 1215 | 0952 | 6A00 000C | | DECB | DEBNC,1 | 01081000 |
| 1216 | 0956 | EA17 | | JR | JOYCK,GT | 01082000 |
| 1217 | 0958 | 6F00 00F8 | | STRB | LASTK,R0 | 01083000 |
| 1218 | 095C | 8C04 | | TESTB | R0 | 01084000 |
| 1219 | 095E | E613 | | JR | JOYCK,Z | 01085000 |
| 1220* | | | | | | 01086000 |
| 1221* | | | | | | 01087000 |
| 1222 | 0960 | 2100 FF7F | KEY | LD | =HFF7F,R0 | 01088000 |
| 1223 | 0964 | B300 | LOOPY | RL | R0,1 | 01089000 |
| 1224 | 0966 | EF3C | | JR | IGNOR,NC | 01090000 |
| 1225 | 0968 | 3A06 010D | | OUTB | R0,KEYOT | 01091000 |
| 1226 | 096C | 3A14 010B | | INB | R1,KEYIN | 01092000 |
| 1227 | 0970 | 8C14 | | TESTB | R1 | 01093000 |
| 1228 | 0972 | E6F8 | | JR | LOOPY,Z | 01094000 |
| 1229* | | | | | | 01095000 |
| 1230 | 0974 | BC00 | | COMB | R0 | 01096000 |
| 1231 | 0976 | A009 | | LDB | R0,R9 | 01097000 |
| 1232 | 0978 | 0B01 0810 | | CMP | =H0810,R1 | 01097100 |
| 1233 | 097C | 5E06 11DE | | JP | TRAP30,EQ | 01097200 |
| 1234 | 0980 | 6F01 00FA | | STR | BUTON,R1 | 01098000 |
| 1235 | 0984 | E6F8 | | JR | IGNOR | 01099000 |
| 1236* | | | | | | 01100000 | TRAP IF SAFTY SWITCH IS BROKEN |
| 1237 | 0986 | 6100 0021 | JOYCK | LD | LEDST,R0 | 01101000 |
| 1238 | 098A | 8D00 | | COM | R0 | 01102000 |
| 1239 | 098C | 3A86 010D | | OUTB | R8,KEYOT | 01103000 |
| 1240* | | | | | | |
| 1241 | 0990 | 6100 0021 | | LD | LEDST,R0 | 01107000 |
| 1242 | 0994 | A686 | | BITB | R8,6 | 01108000 |
| 1243 | 0996 | EE20 | | JR | CHOSE,NZ | 01109000 |
| 1244* | | | | | | 01110000 |
| 1245 | 0998 | 0008 4040 | | ADDB | =H40,R8 | 01111000 |
| 1246 | 099C | 6F00 0021 | | STR | LEDST,R0 | 01112000 |
| 1247 | 09A0 | 3A94 0107 | | INB | R9,JOYIN | 01113000 |
| 1248 | 09A4 | 3A06 0107 | | OUTB | R0,JOYIN | 01114000 |
| 1249* | | | | | | 01115000 |
| 1250 | 09A8 | 8C84 | | TESTB | R8 | 01116000 |
| 1251 | 09AA | ED03 | | JR | PJOY,P | 01117000 |
| 1252* | | | | | | 01118000 |
| 1253 | 09AC | 6008 00C6 | MJOY | LDB | MCNTR,R8 | 01119000 |
| 1254 | 09B0 | E802 | | JR | JYMIN | 01120000 |
| 1255* | | | | | | 01121000 |
| 1256 | 09B2 | 6008 00C7 | PJOY | LDB | PCNTR,R8 | 01122000 |
| 1257* | | | | | | 01123000 |
| 1258 | 09B6 | C000 | JYMIN | LDKB | 0,R0 | 01124000 |
| 1259 | 09B8 | A001 | | LDB | R0,R1 | 01125000 |
| 1260 | 09BA | 8310 | | SUB | R1,R0 | 01126000 |

| | | | | | |
|---|---|---|---|---|---|
| 1261 | 09BC | 0B00 0020 | | CP | =D32,R0 | 01127000 |
| 1262 | 09C0 | EA04 | | JR | DOJOY,GT | 01128000 |
| 1263 | 09C2 | 0B00 FFE0 | | CP | =D-32,R0 | 01129000 |
| 1264 | 09C6 | E101 | | JR | DOJOY,LT | 01130000 |
| 1265 | 09C8 | E80B | | JR | IGNOR | 01131000 |
| 1266* | | | | | | 01132000 |
| 1267 | 09CA | 4D05 00FA 0004 | DOJOY | STRI | BUTON,=D4 | 01133000 |
| 1268 | 09D0 | 4C05 0186 FFFF | | STRIB | JSFLG,=D-1 | 01134000 |
| 1269 | 09D6 | E804 | | JR | IGNOR | 01135000 |
| 1270* | | | | | | 01136000 |
| 1271 | 09D8 | 0008 4040 | CHOSE | ADDB | =H40,R8 | 01137000 |
| 1272 | 09DC | 6F00 0021 | | STR | LEDST,R0 | 01138000 |
| 1273* | | | | | | 01139000 |
| 1274 | 09E0 | 4D04 00F4 | IGNOR | TEST | TIME | 01140000 |
| 1275 | 09E4 | E503 | | JR | FIXFLA,M | 01141000 |
| 1276 | 09E6 | 6B00 00F4 | | DEC | TIME,1 | 01141100 |
| 1277 | 09EA | E620 | | JR | HILFT,Z | 01141200 |
| 1278* | | | | | | 01142000 |
| 1279 | 09EC | 6100 0021 | FIXFLA | LD | LEDST,R0 | 01143000 |
| 1280 | 09F0 | 6A00 000D | | DECB | FLASH,1 | 01144000 |
| 1281 | 09F4 | EE04 | | JR | NOFLA,NZ | 01145000 |
| 1282 | 09F6 | 4900 0022 | | XOR | LEDFL,R0 | 01146000 |
| 1283 | 09FA | 6F00 0021 | | STR | LEDST,R0 | 01147000 |
| 1284* | | | | | | 01148000 |
| 1285 | 09FE | 8D00 | NOFLA | COM | R0 | 01149000 |
| 1286 | 0A00 | 3AB6 010D | | OUTB | R8,KEYOT | 01150000 |
| 1287 | 0A04 | 3A06 010F | | OUTB | R0,KEYHI | 01151000 |
| 1288 | 0A08 | 670F 002C | INHET | BIT | DEL,15 | 01151100 |
| 1289 | 0A0C | E603 | | JR | DEL,15 | 01151200 |
| 1290 | 0A0E | 6900 002C | | INC | END,2 | 01151300 |
| 1291 | 0A12 | E612 | | JR | DFL,1 | 01151400 |
| 1292 | 0A14 | 7C01 | END | DI | ENTX,Z | 01152000 |
| 1293 | 0A16 | C0FF | | LDB | VI | 01153000 |
| 1294 | 0A18 | 3A06 0203 | | OUTB | =HFF,R0 | 01154000 |
| 1295 | 0A1C | 6000 0UC2 | | LDB | R0,203H | 01155000 |
| 1296 | 0A20 | 3A06 0205 | | OUTB | MASK,R0 | 01156000 |
| 1297 | 0A24 | 5C01 000F 00D2 | | LDM | R0,205H | 01157000 |
| 1298 | 0A2A | 7B00 | | IRET | TEMPI,R0,16 | 01158000 |
| 1299* | | | | | | 01159000 |
| 1300 | 0A2C | C000 | HILFT | LDB | =D0,PENLF | 01160000 |
| 1301 | 0A2E | 3A06 0103 | | OUTB | R0,PENLF | 01161000 |
| 1302 | 0A32 | 6F00 00CA | | STRB | PENIO,R0 | 01162000 |
| 1303 | 0A36 | E8DA | | JR | FIXFLA | 01163000 |
| 1304* | | | | | | 01168000 |
| 1305 | 0A38 | 6400 002D | ENTX | SETB | CMD,0 | 01168100 |
| 1306 | 0A3C | 6000 002D | | LDB | CMD,R0 | 01168200 |
| 1307 | 0A40 | 3A06 0059 | | OUTB | R0,RSPORT | 01168300 |
| 1308 | 0A44 | E8E7 | | JR | END | 01168400 |
| 1309* | | | | | | 01168500 |

```
1310*SP
1311************************************                                    01168600
1312****INTERRUPT PEN LIFT CODE ********                                    01169000
1313************************************                                    01171100
1314*                                                                       01171200
1315      0005            APRELFT   EQU   5                                 01171300
1316      0005            ATLFTHI   EQU   5                                 01171400
1317      0064            ATLFTLONG EQU   100                               01171500
1318      0003            ATLFTSHRT EQU   3                                 01171600
1319      001E            TDWNLONG  EQU   30                                01171700
1320      000F            TDWNSHORT EQU   15                                01171800
1321      0005            ATDWNROTH EQU   5                                 01171900
1322      000A            FIRSTLEG  EQU   10                                01172000
1323      0082            AHUNDRDLG EQU   100+TDWNLONG                      01172010
1324      0073            AHUNDRDSH EQU   100+TDWNSHORT                     01172100
1325      03F2            ATHOULONG EQU   1000+FIRSTLEG                     01172210
1326*                                                               01172220
1327      F858            AFSTFRCE  EQU   0F858H    AFSTFRCE AND ASECFRCE VALUES FOR RAM
1328*                                                                       01172300
1329      0114            BEFOR     EQU   PRELFT                            01172400
1330      011E            TSHORT    EQU   HUNDRDSH  FIVE LETTER LABLES FOR EXTERNAL
1331      011C            TLONG     EQU   HUNDRDLG  DECLARATION FOR UNDERWARE
1332      0116            DEFLT     EQU   TLFTLONG                          01172600
1333      0118            TLOW      EQU   TLFTSHRT                          01172700
1334      011A            TDOWN     EQU   TDWNBOTH                          01172800
1335*                                                                       01172900
1336      FE58            THOULONG  EQU   0FE58H    EXTRA RAM LOCATION FOR PENLIFT PATCH
1337      FE56            FSTFRCE   EQU   0FE56H    ANOTHER EXTRA RAM LOCATION 01173020
1338      FE57            SECFRCE   EQU   0FE57H    ANOTHER EXTRA RAM LOCATION 01173030
1339*                                                               01173100
1340 0A46 6900 001A       LFTPEN    INC   NN,1                              01173200
1341 0A4A 4D01 001A 0001            CMPI  NN,=D1    IF THIS IS THE FIRST INTERRUPT OF
1342 0A50 EE09                      JR    LIFTEDQ,NE A PENLIFT, GO TO STRTLFT, OTHERWISE
1343*                                                               GO TO LIFTED?
1344 0A52 6000 00CA       STRTLFT   LDB   PENIO,R0  CHECK TO SEE IF THE PEN IS DOWN BEFORE
1345 0A56 0600 0F0F                 ANDB  =H0F,R0   LIFTING PEN; IF NOT DOWN DONT PUT UP
1346 0A5A 0A00 0909                 CPB   =H09,R0                           01179000
1347 0A5E 4D08 0016                 CLR   MBRDY                             01179100
1348 0A62 EE35                      JR    PENQUIT,NE                        01180000
1349*                                                               01180100
1350 0A64 6100 0114       LIFTEDQ   LD    PRELFT,R0                         01180200
1351 0A68 4B00 001A                 CMP   NN,R0                             01180300
1352 0A6C 5E0A 08D0                 JP    RETURN,GT                         01180400
1353*                                                               01181000
1354*                                                               01184001
1355 0A70 5402 0068       LDL       YWANT,R2       CHECK FOR PAPER AREA WHICH REQUIRES
1356 0A74 9244            SURL      R4,R4          HIGH LIFT AT ALL TIMES
1357 0A76 9C28            TESTL     R2                                      01184020
1358 0A78 ED02                      JR    NEG1,P                            01184030
1359 0A7A 9224            SURL      R2,R4          HIGH LIFT AREA IS SYMETRIC AROUND
                                                   X AXIS
```

```
1360  0A7C  9442                        LDI   R4,R2         !X! GOES IN R2              01184060
1361*                                                                                    01184070
1362  0A7E  5404 0060   NEG1            LDI   XWANT,R4                                   01184071
1363  0A82  5007 0192                   CMPL  UPA,R2        THIS CODE CHECKS TO SEE IF PEN UP    01184080
1364  0A86  EA0B                        JR    EDGE,GT       IS IN FORBIDEN AREA AND IF THE SLOWER 01184090
1365  0A88  5004 01A2                   CMPL  UPE,R4        HIGH LIFT MUST BE USED, RATHER THAN  01184100
1366  0A8C  E111                        JR    LOWL,LT       THE SLOWER HIGH LIFT                 01184110
1367*                                                                                    01184120
1368  0A8E  C100        HIGHL           LDKB  0,R1          THIS CODE OUTPUTS THE BITS FOR THE   01184130
1369  0A90  6F01 00CA                   SIRB  PENIU,R1      HIGH LIFT AND WAITS THE LONGER MOVE  01184140
1370  0A94  3A16 0103                   OUTB  R1,PENLF                                   01184150
1371*                                                                                    01184160
1372  0A98  4100 0120                   ADD   TLFTHI,R0     TIM FOR THE LIFT             01184170
1373  0A9C  E810                        JR    CONTINUE                                   01184180
1374*                                                                                    01184190
1375  0A9E  5004 019A   EDGE            CMPL  UPC,R4                                     01184200
1376  0AA2  E106                        JR    LOWL,LT                                    01184210
1377  0AA4  5004 019E                   CMPL  UPD,R4                                     01184220
1378  0AA8  EAF2                        JR    HIGHL,GT      MORE CHECKS FOR CRITICAL AREA 01184230
1379  0AAA  5002 0196                   CMPL  UPB,R2        (IT IS A FUNNY SHAPE)        01184240
1380  0AAE  EAEF                        JR    HIGHL,GT                                   01184250
1381*                                                                                    01186000
1382  0AB0  C106        LOWL            LDB   =H06,R1                                    01186010
1383  0AB2  6E01 00CA                   STRB  PENIO,R1      OUTPUT BITS TO START A SHORT LIFT    01186020
1384  0AB6  3A16 0103                   OUTB  R1,PENLF                                   01186030
1385  0ABA  4100 0118                   ADD   TLFTSHRT,R0                                01186100
1386*                                                                                    01186110
1387  0ABE  4B00 001A   CONTINUE        CMP   NN,R0         CHECK TO SEE IF LIFT COMPLETE, 01187000
1388  0AC2  5E0A 08D0                   JP    RETURN,GT     IF SO QUIT                   01188000
1389*                                                                                    01189000
1390  0AC6  6100 0116   PENQUIT         LD    TLFTLONG,R0                                01189010
1391  0ACA  6F00 00F4                   STR   TIME,R0       FINISH OFF LIFT OR LOWER OF PEN 01189100
1392  0ACE  9200                        SUBL  R0,R0                                      01190000
1393  0AD0  5D00 001A                   STRL  NN,R0                                      01191000
1394  0AD4  5E08 08D0                   JP    RETURN                                     01192000
1395*SP                                                                                  01192100
1396*****************************************************                                01193000
1397*                                                                                    01194000
1398*****************************************************                                01195000
1399*                                                                                    01196000
1400*         INTERRUPT SECTION TO LOWER THE PEN, PROVIDED                               01197000
1401*         THAT IT IS UP                                                              01198000
1402*                                                                                    01199000
1403*****************************************************                                01200000
1404*                                                                                    01201000
1405  0AD8  AB00        LWRPEN          DEC   R0,1          COUNT DOWN THE TIME IN THE VARIOUS 01202000
1406  0ADA  ED12                        JR    SORT,P        PHASES OF LOWERING THE PEN   01203000
1407*                                                                                    01204000
1408  0ADC  4D08 0016   FIRST           CLR   MRDY          CLOSE BUFFER                 01205000
1409  0AE0  4D05 00F4 FFFF              STRI  TIME,=D-1     RESET LONG LIFT TIMER        01206000
```

| Line | Addr | Code | | Label | Op | Operands | Comment | Seq |
|---|---|---|---|---|---|---|---|---|
| 1410 | 0AE6 | 6001 | 00CA | | LDB | PENIO,R1 | | 01207000 |
| 1411 | 0AEA | 8C14 | | | TESTB | R1 | CHECK TO SEE IF THIS IS A LONG OR A | 01208000 |
| 1412 | 0AEC | E604 | | | JR | STARTLONG,Z | SHORT LIFT | 01209000 |
| 1413* | | | | | | | | 01210000 |
| 1414 | 0AEE | 6100 | 011E | STARTSHORT | LD | HUNDRDSH,R0 | START SHORT DROP | 01211000 |
| 1415 | 0AF2 | C158 | | | LDB | =H58,R1 | | 01212000 |
| 1416 | 0AF4 | E815 | | | JR | UPYORS | | 01213000 |
| 1417* | | | | | | | | 01214000 |
| 1418 | 0AF6 | 6100 | FE58 | STARTLONG | LD | THOULONG,R0 | START LONG DROP | 01215000 |
| 1419 | 0AFA | 6001 | FE56 | | LDB | FSTFRCE,R1 | | 01216000 |
| 1420 | 0AFE | E810 | | | JR | UPYORS | | 01217000 |
| 1421* | | | | | | | | 01218000 |
| 1422 | 0B00 | 6F00 | 001A | SORT | STR | NN,R0 | | 01219000 |
| 1423 | 0B04 | 0B00 | 03E8 | | CMP | =D1000,R0 | | 01220000 |
| 1424 | 0B08 | EA05 | | | JR | PENRETN,GT | | 01221000 |
| 1425 | 0B0A | E606 | | | JR | STRTSECLEG,Z | | 01222000 |
| 1426* | | | | | | | | 01223000 |
| 1427 | 0B0C | 0B00 | 0064 | | CMP | =D100,R0 | CHECK TO SEE WHAT'S GOING ON | 01224000 |
| 1428 | 0B10 | EA01 | | | JR | PENRETN,GT | | 01225000 |
| 1429 | 0B12 | E60D | | | JR | BEGINDOWN,Z | | 01226000 |
| 1430* | | | | | | | | 01227000 |
| 1431 | 0B14 | 5E08 | 08D0 | PENRETN | JP | RETURN | | 01228000 |
| 1432*SP | | | | | | | | 01229000 |
| 1433 | 0B18 | 6001 | FE57 | STRTSECLEG | LDB | SECFRCE,R1 | CODE TO START SECOND LEG OF LONG | 01230000 |
| 1434 | 0B1C | 6100 | 011C | | LD | HUNDRDLG,R0 | DROP | 01231000 |
| 1435 | 0B20 | 6F00 | 001A | UPYORS | STR | NN,R0 | | 01232000 |
| 1436 | 0B24 | 6E01 | 00CA | | STRB | PENIO,R1 | | 01233000 |
| 1437 | 0B28 | 3A16 | 0103 | | OUTB | R1,PENLF | | 01233010 |
| 1438 | 0B2C | EBF3 | | | JR | PENRETN | | 01233020 |
| 1439* | | | | | | | | 01233030 |
| 1440 | 0B2E | 6001 | 00F6 | BEGINDOWN | LDB | FORCE,R1 | | 01233040 |
| 1441 | 0B32 | 0401 | 1919 | | ORB | =H19,R1 | | 01233050 |
| 1442 | 0B36 | 6100 | 011A | | LD | TDWNBOTH,R0 | | 01233060 |
| 1443 | 0B3A | EBF2 | | | JR | UPYORS | | 01233070 |
| 1444*SP | | | | | | | | |
| 1445* | | | | | | | | |
| 1446* | | | | | | | | |
| 1447*******INTERRUPT PINCH WHEEL CONTROL CODE** | | | | | | | | |
| 1449********************************************* | | | | | | | | |
| 1450* | | | | | | | | |
| 1451 | 0B3C | 4D08 | 0016 | CLINT | CLR | MBRDY | | 01251000 |
| 1452 | 0B40 | 6002 | 00C8 | | LDB | MOTOR,R2 | | 01252000 |
| 1453 | 0B44 | A425 | | | SRITB | R2,5 | | 01253000 |
| 1454 | 0B46 | 6F02 | 00C8 | | STRB | MOTOR,R2 | | 01254000 |
| 1455 | 0B4A | 3A26 | 0101 | | OUTB | R2,STEPR | | 01255000 |
| 1456* | | | | | | | | 01261000 |
| 1457 | 0B4E | 1600 | 0000 0001 | LFTGT | ADDL | =D1,R0 | | 01262000 |
| 1458 | 0B54 | 5D00 | 001A | | STRL | NN,R0 | | 01263000 |
| 1459 | 0B58 | 6000 | 00C8 | | LDB | MOTOR,R0 | | 01264000 |

```
1460  0B5C  3A06 0101         OUTB  R0,STEPR        01265000
1461  0B60  3A24 0105         INB   R2,TURET        01266000
1462  0B64  A626              BITB  R2,6            01267000
1463  0B66  EE36              JR    SWCHK,NZ        01268000
1464  0B68  BD00              LDK   0,R0            01269000
1465  0B6A  A101              LD    R0,R1           01270000
1466  0B6C  5D00 001A         STRL  NN,R0           01271000
1467  0B70  5400 0060         LDL   XWANT,R0        01272000
1468  0B74  5D00 0027         STRL  EUXHI,R0        01273000
1469  0B78  5D00 0025         STRL  EUXLO,R0        01274000
1470  0B7C  6000 00C8         LDB   MOTOR,R0        01275000
1471  0B80  A205              RBITB R0,5            01276000
1472  0B82  6E00 00C8         STRB  MOTOR,R0        01277000
1473  0B86  3A06 0101         OUTB  R0,STEPR        01278000
1474  0B8A  5E08 08D0         JP    RETURN          01279000
1475*                                                01280000  01280000
1476  0B8E  4D08 0016   CHINT CLR   MBRDY           01281000
1477  0B92  6002 00C8         LDB   MOTOR,R2        01281100
1478  0B96  A425              SBITB R2,5            01282000
1479  0B98  6E02 00C8         STRB  MOTOR,R2        01283000
1480  0B9C  3A26 0101         OUTB  R2,STEPR        01284000
1481*                                                01285000  01285000
1482  0BA0  1600 0000 0001 LWRGT ADDL  =D1,R0       01286000
1483  0BA6  5D00 001A         STRL  NN,R0           01287000
1484  0BAA  6000 00C8         LDB   MOTOR,R0        01288000
1485  0BAE  3A06 0101         OUTB  R0,STEPR        01289000
1486  0BB2  3A24 0105         INB   R2,TURET        01290000
1487  0BB6  A626              BITB  R2,6            01291000
1488  0BB8  E60D              JR    SWCHK,Z         01292000
1489  0BBA  4D08 001A         CLR   NN              01293000
1490  0BBE  4D08 001C         CLR   NN+2            01294000
1491  0BC2  6000 00C8         LDB   MOTOR,R0        01295000
1492  0BC6  A205              RBITB R0,5            01296000
1493  0BC8  6E00 00C8         STRB  MOTOR,R0        01297000
1494  0BCC  3A06 0101         OUTB  R0,STEPR        01298000
1495  0BD0  5E08 08D0         JP    RETURN          01299000
1496*                                                01300000  01300000
1497  0BD4  4D01 001C 2710 SWCHK CMPI NN+2,=D10000  01301000
1498  0BDA  5F0A 11CA         JP    TRAP24,GT       01302000
1499  0BDE  5E08 08D0         JP    RETURN          01303000
1500*SP                                              01303100
1501*************************************************01304000
1502*************************************************01305000
1503*************************************************01306000
1504*    SUBROUTINE TO DEVELOP A VELOCITY PROFILE    01307000
1505*    BASED ON DESIRED X AND Y VELOCITY AND MAXIMUM 01308000
1506*    X AND Y ACCELERATIONS                        01309000
1507*************************************************01310000
1508*************************************************01311000
1509*************************************************01312000
```

```
1510 *****************************************************
1511 *
1512 0BE2 5400 00A6  SEEK    LDL   XDESIREDV,R0
1513 0BE6 5402 00A6          LDL   XCURRENTV,R2
1514 0BEA 5404 00AE          LDL   XACCELERATE,R4
1515 0BEE DFE8            ,  CALR  MOVE
1516 0BF0 5D02 00A6          STRL  XCURRENTV,R2
1517 *
1518 0BF4 5400 00BA          LDL   YDESIREDV,R0
1519 0BF8 5402 00AA          LDL   YCURRENTV,R2
1520 0BFC 5404 00B2          LDL   YACCELERATE,R4
1521 0C00 DFF1               CALR  MOVE
1522 0C02 5D02 00AA          STRL  YCURRENTV,R2
1523 *                                                        XWANT=XWANT+XCURRENTV
1524 0C06 5400 00A6          LDL   XCURRENTV,R0
1525 0C0A 5600 0060          ADDL  XWANT,R0
1526 0C0E 5D00 0060          STRL  XWANT,R0
1527 0C12 5400 00AA          LDL   YCURRENTV,R0
1528 0C16 5600 0068          ADDL  YWANT,R0                   YWANT=YWANT+YCURRENTV
1529 0C1A 5D00 0068          STRL  YWANT,R0
1530 *
1531 0C1E 9E08               RET
1532 *
1533 * SUBROUTINE TO FIGURE OUT A MOVE INCREMENT FROM
1534 * A DESIRED SPEED AND ACCELERATION
1535 *
1536 0C20 9220      MOVE     SUBL  R2,R0
1537 0C22 E104               JR    SMALLER,LT                 IF DESIRED VELOSITY IS GREATER
1538 *                                                        THAN CURRENT VELOCITY, GO TO
1539 *                       BIGGER,IF NOT GO TO SMALLER
1540 0C24 9040      BIGGER   CMPL  R4,R0                      IF DESIRED-CURRENT IS GREATER
1541 0C26 9E01               RET   LT                         THAN ACCELERATION CURRENT=
1542 0C28 9642               ADDL  R4,R2                      CURRENT+ACCELERATION
1543 0C2A 9E08               RET
1544 *
1545 0C2C 9004      SMALLER  CMPL  R0,R4                      IF CURRENT-DESIRED IS GREATER
1546 0C2E 9E01               RET   LT                         IS THAN ACCELERATION,
1547 0C30 9242               SUBL  R4,R2                      CURRENT=CURRENT-ACCELERATION
1548 0C32 9E08               RET
1549 *SP
1550 *****************************************************
1551 *****************************************************
1552 *
1553 * SUBROUTINE TO FIND GET AN ABSOLUTE REFERENCE
1554 * AND TO FIND THE CENTER VALUES OF THE JOYSTICK
1555 *
1556 *
1557 *****************************************************
1558 *****************************************************
1559 *
1560 0C34 1600 0000 0001 INITL  ADDL  =D1,R0
```

| | | | | | | | |
|---|---|---|---|---|---|---|---|
| 1561 | 0C3A | 5D00 001A | | STRL | NN,R0 | | 01363000 |
| 1562 | 0C3E | DFFD | | CALR | ABSREF | CALL ABSOLUTE REFERENCE ROUTINE | 01364000 |
| 1563 | 0C40 | D030 | | CALR | SEEK | AND CALL SEEK ROUTINE | 01365000 |
| 1564 | 0C42 | 5E08 0A08 | | JP | INRET | | 01366000 |
| 1565* | | | | | | 01367000 | 01368000 |
| 1566 | 0C46 | 6102 00BE | ABSREF | LD | POINTER,R2 | USE POINTER TO FIGURE OUT WHICH | 01369000 |
| 1567 | 0C4A | 8122 | | ADD | R2,R2 | PHASE OF THE REFERENCE FINDING | 01370000 |
| 1568 | 0C4C | 6123 0C5A | | LD | INLBL(R2),R3 | ROUTINE WE ARE IN | 01371000 |
| 1569 | 0C50 | 0B02 0008 | | CP | =D8,R2 | | 01372000 |
| 1570 | 0C54 | 5E0A 11FA | | JP | TRAP38,GT | | 01373000 |
| 1571 | 0C58 | 1E38 | | JP | (R3) | | |
| 1572* | | | | | | 01374000 | |
| 1573 | 0C5A | 0C64 | INLBL | DEF | ARM | 0 | 01375000 |
| 1574 | 0C5C | 0CC0 | | DEF | GETOUT | 1 | 01376000 |
| 1575 | 0C5E | 0CE6 | | DEF | FIND1 | 2 | 01377000 |
| 1576 | 0C60 | 0D06 | | DEF | FINDLOC | 3 | 01378000 |
| 1577 | 0C62 | 0D3A | | DEF | FIND2 | 4 | 01379000 |
| 1578* | | | | | | | 01380000 |
| 1579 | 0C64 | 4D05 00D0 2000 | ARM | STRI | ENDPT,=H2000 | BANDWIDTH UP FOR MOVE | 01381000 |
| 1580 | 0C6A | 1000 0000 0014 | | CMPL | =D20,R0 | WAIT 20 MS TO SEND ARMING PULSE | 01382000 |
| 1581 | 0C70 | 9E01 | | RET | LT | | 01383000 |
| 1582 | 0C72 | EE0D | | JR | ARMED,NE | | 01384000 |
| 1583* | | | | | | | 01385000 |
| 1584 | 0C74 | BD20 | | LDK | 0,R2 | SEND ARMING PULSE | 01386000 |
| 1585 | 0C76 | 2103 2000 | | LD | =H2000,R3 | | 01387000 |
| 1586 | 0C7A | 3B36 0088 | | OUT | R3,STRTEND | | 01388000 |
| 1587 | 0C7E | 3B26 0088 | | OUT | R2,STRTEND | | 01389000 |
| 1588 | 0C82 | 3B26 0088 | | OUT | R2,STRTEND | | 01390000 |
| 1589 | 0C86 | 3B26 0088 | | OUT | R2,STRTEND | | 01391000 |
| 1590 | 0C8A | 3B36 0088 | | OUT | R3,STRTEND | | 01392000 |
| 1591* | | | | | | | 01393000 |
| 1592 | 0C8E | 1000 0000 0064 | ARMED | CMPL | =D100,R0 | WAIT 80 MS BEFORE MOVING | 01394000 |
| 1593 | 0C94 | 9E01 | | RET | LT | | 01395000 |
| 1594* | | | | | | | 01396000 |
| 1595 | 0C96 | 3A04 0105 | | INB | R0,LEDWD | IF LID IS UP SET BIT IN OST | 01397000 |
| 1596 | 0C9A | A607 | | BITB | R0,7 | AND WAIT; OTHERWISE | 01398000 |
| 1597 | 0C9C | 6506 002B | | SBIT | OST,6 | RESET BIT AND GO ON | 01399000 |
| 1598 | 0CA0 | 9E08 | | RET | Z | | 01400000 |
| 1599 | 0CA2 | 6306 002B | | RBIT | OST,6 | | 01401000 |
| 1600* | | | | | | | 01402000 |
| 1601 | 0CA6 | 6900 00BE | | INC | POINTER,1 | BEGIN MOVE TO GET OUT OF THE | 01403000 |
| 1602 | 0CAA | 1400 0000 00BE | | LDL | =D3,R0 | TURRET AND CLEAR OF THE INIT | 01404000 |
| 1603 | 0CB0 | 5D00 00B2 | | STRL | YACCELERATE,R0 | LED | 01405000 |
| 1604 | 0CB4 | 1400 FFFF FFB0 | | LDL | =D-80,R0 | | 01406000 |
| 1605 | 0CBA | 5D00 00AA | | STRL | YDESIREDV,R0 | | 01407000 |
| 1606 | 0CBE | 9F08 | | RET | | | 01408000 |
| 1607* | | | | | | | 01409000 |
| 1608 | 0CC0 | 5400 0068 | GETOUT | LDI | YWANT,R0 | MOVE BACK 2.5 INCHES AND | 01410000 |

```
1609   0CC4   1000 FFFF ADF8         CMPL    =D-21000,R0                                01411000
1610   0CCA   9E0A                   RET     GT                                         01412000
1611*                                                        CHECK INIT SENSOR          01413000
1612   0CCC   3A04 0105              INR     R0,LEDWD                                   01414000
1613   0CD0   A601                   BITB    R0,1                                       01415000
1614   0CD2   5F0E 11BE              JP      TRAP21,NZ                                  01416000
1615   0CD6   6900 00BE              INC     POINTER,1                                  01417000
1616*                                                        BEGIN MOVING TOWARD THE INIT  01418000
1617   0CDA   1400 0000 0050         LDL     =D80,R0                                    01419000
1618   0CE0   5D00 00BA              STRL    YDESIREDV,R0                               01420000
1619   0CE4   9E08                   RET                     SENSOR                     01421000
1620*                                                        CHECK INIT SENSOR, IF IT IS  01422000
1621   0CE6   3A04 0105       FIND1  INB     R0,LEDWD        BLOCKED GO TO NEXT PHASE;  01423000
1622   0CEA   A601                   BITB    R0,1            OTHERWISE KEEP GOING       01424000
1623   0CEC   9E06                   RET     Z                                          01425000
1624*                                                        TURN ARROUND AND SLOW DOWN 01426000
1625   0CEE   6900 00BE              INC     POINTER,1                                  01427000
1626   0CF2   5400 0068              LDL     YWANT,R0                                   01428000
1627   0CF6   5D00 0148              STRL    D1,R0                                      01429000
1628   0CFA   1400 FFFF FFF6         LDL     =D-10,R0                                   01430000
1629   0D00   5D00 00BA              STRL    YDESIREDV,R0                               01431000
1630   0D04   9E08                   RET                     SAVE LOCATION OF FIRST EDGE 01432000
1631*                                                        IN D1                      01433000
1632   0D06   5400 0068       FINDLOC LDL    YWANT,R0                                   01434000
1633   0D0A   5200 0148              SUBL    D1,R0                                      01435000
1634   0D0E   1000 0000 0014         CMPL    =D20,R0                                    01436000
1635   0D14   9E0A                   RET     GT              MOVE UP CLOSE TO D1 POSITION 01437000
1636*                                                                                   01438000
1637   0D16   1400 FFFF FFFF         LDL     =D-1,R0                                    01439000
1638   0D1C   6F00 00BA              STR     YDESIREDV,R0                               01440000
1639   0D20   1400 0000 0001         LDL     =D1,R0                                     01441000
1640   0D26   5D00 00B2              STRL    YACCELERATE,R0                             01442000
1641   0D2A   3A04 0105              INB     R0,LEDWD        AFTER GETING CLOSE START INCHING 01443000
1642   0D2E   A601                   BITB    R0,1            IN SLOW                    01444000
1643   0D30   5E06 11BE              JP      TRAP21,Z                                   01445000
1644   0D34   6900 00BE              INC     POINTER,1                                  01446000
1645   0D38   9E08                   RET                     CHECK INIT SENSOR AGAIN    01447000
1646*                                                                                   01448000
1647   0D3A   3A04 0105       FIND2  INB     R0,LEDWD                                   01449000
1648   0D3E   A601                   BITB    R0,1                                       01450000
1649   0D40   9E0F                   RET     NZ              KEEP INCHING UNTIL INIT LED 01451000
1650*                                                        IS UNCOVERED               01452000
1651   0D42   BD00            GOTIT  LDK     0,R0                                       01453000
1652   0D44   A101                   LD      R0,R1                                      01454000
1653   0D46   6F00 0016              STR     MBRDY,R0                                   01455000
1654   0D4A   5D00 003A              STRL    XSTRT,R0                                   01456000
1655   0D4E   5D00 003E              STRL    YSTRT,R0                                   01457000
1656   0D52   5D00 007E              STRL    XEND,R0                                    01458000
1657   0D56   5D00 0082              STRL    YEND,R0                                    01459000
1658   0D5A   5D00 0076              STRL    XHAVE,R0                                   01460000
```

```
1659  0D5E  5D00 007A              STRL    YHAVE,R0
1660  0D62  5D00 0060              STRL    XWANT,R0
1661  0D66  5D00 0064              STRL    XWANT+4,R0
1662  0D6A  5D00 0068              STRL    YWANT,R0
1663  0D6E  5D00 006C              STRL    YWANT+4,R0
1664  0D72  5D00 001A              STRL    NN,R0
1665  0D76  5D00 0106              STRL    INLED,R0
1666  0D7A  5600 0016              STRL    MHVPE,R0
1667  0D7E  5D00 00FE              STRL    HVPEN,R0
1668  0D82  5D00 0017              ADDL    MSTRL,R0
1669  0D86  5D00 0102              STRL    STBLE,R0
1670  0D8A  4D05 00C4 0006         STRI    STATE,=D6
1671  0D90  4D0H 00HE              CLR     POINTER
1672  0D94  9E08                   RET

1673 *SP
1674 *************************************************
1675 *************************************************
1676 *
1677 *     SUBROUTINE TO FIND THE EDGES OF A PIECE OF
1678 *     PAPER AND SET THE ORIGIN OF THE COORDINATE
1679 *     SYSTEM IN THE MIDDLE
1680 *
1681 *************************************************
1682 *************************************************
1683 *
1684 *
1685  0D96  1600 0000 0001   LIMITFND  ADDL  =D1,R0        NN=NN+1
1686  0D9C  5D00 001A                  STRL  NN,R0
1687  0DA0  DFFC                       CALR  XLIMIT        FIND X HARD CLIP LIMITS
1688  0DA2  DF14                       CALR  YLIMIT
1689  0DA4  D0E2                       CALR  SEEK          MOVE THE PEN
1690  0DA6  5E08 08D0                  JP    RETURN
1691 *
1692 *************************************************
1693 *     SUBROUTINE TO FIND THE X HARD CLIP LIMITS
1694 *     AND SET THE ORIGIN IN THE MIDDLE OF THE PAPER
1695 *************************************************
1696 *
1697 *
1698 *
1699  0DAA  6102 0DBE        XLIMIT    LD    POINTER,R2
1700  0DAE  8122                       ADD   R2,R2
1701  0DB0  6123 0DBE                  LD    XLLBL(R2),R3
1702  0DB4  0B02 000E                  CP    =D14,R2
1703  0DB8  5E0A 11FA                  JP    TRAP38,GT
1704  0DBC  1E38                       JP    (R3)
```

```
1705*
1706  0DBE  0DCE       XLLBL    DEF   FRONTLED                                              01509000
1707  0DC0  0E04                DEF   BTM1ST                                                01510000
1708  0DC2  0E3A                DEF   BTMNEAR                                               01511000
1709  0DC4  0E6C                DEF   BTM2ND                                                01512000
1710  0DC6  0FB2                DEF   TOP1ST                                                01513000
1711  0DC8  0EDA                DEF   TOPNEAR                                               01514000
1712  0DCA  0F12                DEF   TOP2ND                                                01515000
1713  0DCC  0F7A                DEF   XDONE                                                 01516000
1714*                                                                      01517000
1715  0DCE  4D05 00D0 2000  FRONTLED STRI ENDPT,=H2000 TURN ON HIGH BANDWIDTH FOR MOVE      01508000
1716*                                                                      01519000
1717  0DD4  6000 00C8           LDR   MOTOR,R0       SWITCH SENSOR CIRCUIT TO FRONT LED     01520000
1718  0DD8  A406                SBITB R0,6           FOR SENSING BOTTEM EDGE FIRST          01521000
1719  0DDA  3A06 0101           OUTB  R0,STEPR                                              01522000
1720*                                                                      01523000
1721  0DDE  BD00                LDK   0,R0           SET BEGINNING POSITION TO 0 ON THE     01524000
1722  0DE0  A101                LD    R0,R1          X AXIS                                 01525000
1723  0DE2  5D00 0060           STRL  XWANT,R0                                              01526000
1724  0DE6  5D00 0076           STRL  XHAVE,R0                                              01527000
1725*                                                                      01528000
1726  0DEA  6900 00RE           INC   POINTER,1      BEGIN LOOKING FOR THE EDGE OF THE      01529000
1727  0DEE  1400 FFFF FFB0      LDL   =D-80,R0       PAPER                                  01530000
1728  0DF4  5D00 00R6           STRL  XDESIREDV,R0                                          01531000
1729  0DF8  1400 0000 0003      LDL   =D3,R0                                                01532000
1731  0DFE  5D00 00AE           STRL  XACCELERATE,R0                                        01534000
1731  0E02  9E08                RET                                                         01535000
1732*                                                                      01535000
1733  0E04  5402 0060           BTM1ST LDL XWANT,R2                        GO IN NEGATIVE X DIRECTION UNTIL  01536000
1734  0E08  1002 FFFA 328C           CPL   =D-380276,R2  THE EDGE IS REACHED OR PLOTTER HAS 01537000
1735  0E0E  E10F                     JR    TOOBIG,LT     GUNE 46.85 INCHES                  01538000
1736  0E10  3A04 0105                INB   R0,LEDWD                                         01539000
1737  0E14  A604                     BITB  R0,4                                             01540000
1738  0E16  9E06                     RET   Z                                                01541000
1739*                                                                      01542000
1740  0E18  5D02 0150                STRL  LOCATE,R2    SAVE FIRST APPROXIMATION TO EDGE    01543000
1741  0E1C  4D01 0000 000A           LDL   =D10,R0                                          01544000
1742  0E22  5D00 00B6                STRL  XDESIREDV,R0 SLOW DOWN AND TURN ARROUND FOR      01545000
1743  0E26  6900 00BE                INC   POINTER,1    SECOND APPROXIMATION .              01546000
1744  0E2A  9E08                     RET                                                    01547000
1745*                                                                      01548000
1746  0E2C  6900 00BE         TOOBIG  INC   POINTER,3                                       01549000
1747  0E30  4D01 00BE 0004           CMPI  POINTER,=D4  IF PAPER SIZE IS TOO BIG DEFAULT IT 01550000
1748  0E36  E62A                     JR    SETEND,EQ                                        01551000
1749  0E38  E877                     JR    SETLIM                                           01552000
1750*                                                                      01553000
1751  0E3A  5400 0150         BTMNEAR LDL  LOCATE,R0     GO UP AT A MEDIUM SPEED UNTIL WITHIN 01554000
1752  0E3E  5200 0060                 SUBL XWANT,R0      30 EU OF 1ST APPROXIMATION OF THE   01555000
1753  0E42  1000 0000 001E            CPL  =D30,R0       EDGE                                01556000
1754  0E48  9E0A                      RET  GT                                                01557000
1755*                                                                      01558000
```

| | | | | | | |
|---|---|---|---|---|---|---|
| 1756 | 0E4A | 6900 00BE | | INC | POINTER,1 | MOVE IN SLOWLY, AND TRAP IF THE EDGE |
| 1757 | 0E4E | 3A04 0105 | | INB | R0,LEDWD | SENSOR IS BROKEN |
| 1758 | 0E52 | A604 | | BITB | R0,4 | |
| 1759 | 0E54 | 5E06 11C2 | | JP | TRAP22,Z | |
| 1760 | 0E58 | 1400 0000 0001 | | LDL | =D1,R0 | |
| 1761 | 0E5E | 5D00 00B6 | | STRL | XDESIREDV,R0 | |
| 1762 | 0E62 | 5D00 00AE | | STRL | XACCELERATE,R0 | |
| 1763 | 0E66 | 5D00 001A | | STRL | NN,R0 | |
| 1764 | 0E6A | 9E08 | | RET | | |
| 1765* | | | | | | 01567000 |
| 1766 | 0E6C | 1000 0000 07D0 | BTM2ND | CMPL | =D2000,R0 | IF CANNOT FIND EDGE IN 2 SEC, PAPER |
| 1767 | 0E72 | 5E0A 11C2 | | JP | TRAP22,GT | HAS BEEN DROPED |
| 1768* | | | | | | 01567300 |
| 1769 | 0E76 | 3A04 0105 | | INB | R0,LEDWD | INCH IN SLOWELY UNTIL SENSOR IS TRIPED |
| 1770 | 0E7A | A604 | | BITB | R0,4 | |
| 1771 | 0E7C | 9E0E | | RET | NZ | |
| 1772* | | | | | | 01571000 |
| 1773 | 0E7E | 6000 00C8 | | LDB | MOTOR,R0 | SWITCH CIRCUIT TO THE BACK SENSOR |
| 1774 | 0E82 | A206 | | RBITB | R0,6 | |
| 1775 | 0E84 | 3A06 0101 | | OUTB | R0,STEPR | |
| 1776 | 0E88 | 6900 00BE | | INC | POINTER,1 | |
| 1777* | | | | | | 01576000 |
| 1778 | 0E8C | BD00 | SETEND | LDK | 0,R0 | |
| 1779 | 0E8E | A101 | | LD | R0,R1 | |
| 1780 | 0E90 | 5D00 0060 | | STRL | XWANT,R0 | |
| 1781 | 0E94 | 5D00 0064 | | STRL | XWANT+4,R0 | |
| 1782 | 0E98 | 5D00 0076 | | STRL | XHAVE,R0 | |
| 1783 | 0E9C | 1400 0000 00B6 | | LDL | =D80,R0 | SET BOTTOM EDGE OF THE PAPER TO 0 |
| 1784 | 0EA2 | 5D00 00B6 | | STRL | XDESIREDV,R0 | AND HEAD FOR THE TOP EDGE |
| 1785 | 0EA6 | 1400 0000 0003 | | LDL | =D3,R0 | |
| 1786 | 0EAC | 5D00 00AE | | STRL | XACCELERATE,R0 | |
| 1787 | 0EB0 | 9E08 | | RET | | |
| 1788* | | | | | | 01587000 |
| 1789 | 0EB2 | 5402 0060 | TOP1ST | LDL | XWANT,R2 | SEARCH FOR THE TOP EDGE UNTIL IT IS |
| 1790 | 0EB6 | 1002 0005 CD74 | | CPL | =D380276,R2 | FOUND OR UNTIL 46.85 INCHES IS TRAVELED |
| 1791 | 0EBC | EAB7 | | JR | TOOBIG,GT | |
| 1792* | | | | | | 01591000 |
| 1793 | 0EBE | 3A04 0105 | | INB | R0,LEDWD | |
| 1794 | 0EC2 | A604 | | BITB | R0,4 | |
| 1795 | 0EC4 | 9E06 | | RET | Z | |
| 1796* | | | | | | 01595000 |
| 1797 | 0EC6 | 5D02 0150 | | STRL | LOCATE,R2 | STORE FIRST APPROXIMATION OF TOP |
| 1798 | 0ECA | 1400 FFFF FFF6 | | LDL | =D-10,R0 | EDGE AND SLOW DOWN AND TURN ARROUND |
| 1799 | 0ED0 | 5D00 00B6 | | STRL | XDESIREDV,R0 | FOR SECOND TRY AT IT |
| 1800 | 0ED4 | 6900 00BE | | INC | POINTER,1 | |
| 1801 | 0ED8 | 9E08 | | RET | | |
| 1802* | | | | | | 01601000 |
| 1803 | 0EDA | 5400 0060 | TOPNEAR | LDL | XWANT,R0 | TRAVEL AT MEDIUN SPEED UNTIL WITHIN |
| 1804 | 0EDE | 5200 0150 | | SUBL | LOCATE,R0 | 30 EU OF 1ST APPROXIMATION OF TOP |
| 1805 | 0EE2 | 1000 0000 001E | | CPL | =D30,R0 | EDGE OF THE PAPER |

```
1806  0EE8  9E0A         RET    GT                                              01605000
1807*                                                                           01606000
1808  0EEA  3A04 0105           INB    R0,LEDWD    CHECK BACK PAPER SENSOR AND CRASH  01607000
1809  0EEE  A604                BITB   R0,4        IF NOT WORKING               01608000
1810  0EF0  5E06 11C6           JP     TRAP23,Z                                 01609000
1811  0EF4  1400 FFFF FFFF      LDI    =D-1,R0                                  01610000
1812  0EFA  5D00 00B6           STRL   XDESIREDV,R0                             01611000
1813  0EFE  1400 0000 0001      LDI    =D1,R0                                   01612000
1814  0F04  5D00 00AE           STRL   XACCELERATE,R0                           01613000
1815  0F08  6900 00BE           INC    POINTER,1                                01614000
1816  0F0C  5D00 001A           STRL   NN,R0                                    01615000
1817  0F10  9E08                RET                                             01616000
1818*                                                                           01616100
1819  0F12  1000 0000 07D0 TOP2ND CMPL =D2000,R0   IF CANNOT FIND EDGE IN 2 SEC, PAPER 01616200
1820  0F18  5E0A 11C6           JP     TRAP23,GT   HAS BEEN DROPED              01616300
1821*                                                                           01617000
1822  0F1C  3A04 0105           INB    R0,LEDWD    INCH TOWARD THE EDGE UNTIL IT IS 01618000
1823  0F20  A604                BITB   R0,4        FOUND                        01619000
1824  0F22  9E0E                RET    NZ                                       01620000
1825  0F24  6900 00BE           INC    POINTER,1                                01621000
1826*                                                                           01621100
1827* ************************************************************************ 01621200
1828*SP                                                                         01621300
1829* ************************************************************************ 01621400
1830* ************************************************************************ 01621500
1831*                                                                           01621600
1832*        CODE TO SET X AXIS HARD CLIP LIMITS                                01621700
1833*                                                                           01621800
1834* ************************************************************************ 01621900
1835* ************************************************************************ 01622000
1836*                                                                           01622100
1837*        SHORT DISCRIPTION OF MACHINE CONSTANTS                             01622200
1838*                                                                           01622300
1839*        SENSOR SEPERATION                                                  01622400
1840*                                                                           01622500
1841*            X DISTANCE BETWEEN THE PAPER SENSORS                           01622600
1842*                55.26MM OR 17659EU                                         01622700
1843*                                                                           01622800
1844*        BORDER                                                             01622900
1845*                                                                           01623000
1846*            BORDER TO BE LEFT BETWEEN WRITING AND PAPER EDGE               01623100
1847*                5MM   OR  1598EU IN EXPAND MODE                            01623200
1848*                15MM  OR  4793EU IN NORMAL MODE                            01623300
1849*                                                                           01623400
1850*        NO MANS LAND                                                       01623500
1851*                                                                           01623600
1852*            SPACE LEFT AT LEFT MARGIN OR PLOTTING SPACE FOR                01623700
1853*                THE GRIT WHEELS TO HOLD ON TO                              01623800
1854*                24MM OR 7670EU
```

```
1855*          PEN TO SENSOR                                                                        01623900
1856*                                                                                               01624000
1857*              X DISTANCE BETWEEN BACK SENSOR AND PEN TIP                                       01624100
1858*              44.31MM OR 14160EU                                                               01624200
1859*                                                                                               01624300
1860*          D                                                                                    01624400
1861*                                                                                               01624500
1862*              X DISTANCE BETWEEN POINT WHERE FRONT PAPER SENSOR                                01624600
1863*              SENSES PAPER EDGE AND WHERE BACK PAPER SENSOR                                    01624700
1864*              SENSES PAPER EDGE                                                                01624800
1865*                                                                                               01624900
1866*          XWANT IN EU                                                                          01625000
1867*                                                                                               01625100
1868*              CURRENT X POSITION IN EU                                                         01625200
1869*                                                                                               01625300
1870*          EUXHI AND EUXLO                                                                      01625400
1871*                                                                                               01625500
1872*              HARD CLIP LIMITS IN EU                                                           01625600
1873*                                                                                               01625700
1874*          XNOW                                                                                 01625800
1875*                                                                                               01625900
1876*              CURRENT X POSITION IN EU                                                         01626000
1877*                                                                                               01626100
1878*                                                                                               01626200
1879*          EUXHI=.5*(D + SENSOR SEPERATION - NO MANS LAND - 2*BORDER                            01626300
1880*                                                                                               01626400
1881*              =.5(D + 17659 - 7670 - 2*BORDER)                                                 01626500
1882*                                                                                               01626600
1883*              =.5(D + 9990) - BORDER                                                           01626700
1884*                                                                                               01626800
1885*                                                                                               01626900
1886*          EUXLO=-EUXHI                                                                         01627000
1887*                                                                                               01627100
1888*                                                                                               01627200
1889*          XNOW=EUXHI+BORDER+NO MANS LAND-PEN TO SENSOR                                         01627300
1890*                                                                                               01627400
1891*              =EUXHI + BORDER + 7670 - 14160                                                   01627500
1892*                                                                                               01627510
1893*              =EUXHI + BORDER - 6490                                                           01627520
1894*                                                                                               01627600
1895*                                                                                               01627700
1896  0F28  1404 0000 12B9  SETLIM    LDL    =D4793,R4                                              01627800
1897  0F2E  4C04 0020                 TESTB  EXFLG                                                  01627900
1898  0F32  E603                      JR     NOTEXP,Z                                               01628000
1899  0F34  1404 0000 063E            LDL    =D1598,R4   5MM BORDER IF NORMAL                       01628100
1900*                                                    15MM BORDER IN EXPAND                      01628200
1901  0F3A  5400 0060       NOTEXP    LDL    XWANT,R0    BORDER IN R4                               01628300
1902  0F3E  1600 0000 2706            ADDL   =D9990,R0   EUXHI=.5*(D+9990)-BORDER                   01628400
1903  0F44  B30D FFFF                 SRAL   R0,1                                                   01628500
```

```
1904  0F48  9240                SUBL  R4,R0                              01628510
1905  0F4A  5D00 0027            STRL  EUXHI,R0                           01628600
1906*                                                                     01628700
1907  0F4E  9222                SUBL  R2,R2                              01628800
1908  0F50  9202                SUBL  R0,R2                              01628900
1909  0F52  5D02 0025            STRL  EUXLO,R2      EUXLO=-EUXHI         01629000
1910*                                                                     01629100
1911  0F56  9640                ADDL  R4,R0                              01629200
1912  0F58  1200 0000 195A       SUBL  =D6490,R0     XNOW=EUXHI+BORDER-6490 01629300
1913  0F5E  5D00 0060            STRL  XWANT,R0                           01629400
1914  0F62  5D00 007E            STRL  XEND,R0       XWANT=XNOW           01629500
1915  0F66  5D00 003A            STRL  XSTRT,R0      XEND=XNOW            01629600
1916  0F6A  9222                SUBL  R2,R2         XSTRT=XNOW           01629700
1917  0F6C  9202                SUBL  R0,R2                              01629800
1918  0F6E  5D02 0076            STRL  XHAVE,R2                           01629900
1919  0F72  9200                SUBL  R0,R0         XHAVE=-XNOW          01630000
1920  0F74  5D00 00B6            STRL  XDESIREDV,R0  STOP X MOTION        01630100
1921  0F78  9E08                RET                                      01630200
1922*                                                                     01630300
1923*                                                                     01649000
1924  0F7A  9E08         XDONE  RET                                      
1925*************************************************************        01650000
1926*                                                                     01651000
1927* SUBROUTINE TO FIND PINCH WHEEL'S MAGNET                             01652000
1928* USING OUR REED SWITCH                                               01653000
1929*                                                                     01654000
1930*                                                                     01655000
1931*************************************************************        01656000
1932*                                                                     01657000
                                                                          01658000
1933  0F7C  6102 00C0    YLIMIT LD    OTHERPOINT,R2                       
1934  0F80  8122                ADD   R2,R2                              01659000
1935  0F82  6123 0F90           LD    Y1LRL(R2),R3  FIGURE OUT WHICH PHASE OF THE PINCH 01660000
1936  0F86  0B02 0014           CP    =D20,R2       WHEEL FINDING SECTION THIS IS 01661000
1937  0F8A  5E0A 11FA           JP    TRAP38,GT                          01662000
1938  0F8E  1E38                JP    (R3)                               01663000
1939*                                                                     01664000
                                                                          01665000
1940  0F90  0FA6         YLLRL  DEF   FYINIT   0                          
1941  0F92  0FE8                DEF   D1FST    1                         01666000
1942  0F94  1012                DEF   GETBAK1  2                         01667000
1943  0F96  1034                DEF   D2FST    3                         01668000
1944  0F98  1054                DEF   GETBAK2  4                         01669000
1945  0F9A  1076                DEF   SECD1    5                         01670000
1946  0F9C  10A2                DEF   LASTD1   6                         01671000
1947  0F9E  10CC                DEF   GETBAK3  7                         01672000
1948  0FA0  10EE                DEF   D2SEC    8                         01673000
1949  0FA2  1112                DEF   LASTD2   9                         01674000
1950  0FA4  1196                DEF   YDONE    10                        01675000
                                                                          01676000
                                                                          01677000
1951*                                                                     
1952  0FA6  BD00         FYINIT LDK   0,R0                               01678000
1953  0FA8  A101                LD    R0,R1                              01679000
```

```
1954  0FAA  5D00 00AA                    STRL  YDESIREDV,R0
1955  0FAE  4D01 00BE 0004                CMPI  POINTER,=D4      WAIT UNTIL FRONT EDGE OF PAPER
1956  0FB4  9E01                          RET   LT                  IS FOUND
1957*                                                                            01683000
1958  0FB6  1400 FFFF FFB0                LDL   =D-80,R0
1959  0FBC  5D00 00BA                     STRL  YDESIREDV,R0
1960  0FC0  1400 0000 0003                LDL   =D3,R0
1961  0FC6  5D00 00B2                     STRL  YACCELERATE,R0
1962  0FCA  5400 007A                     LDL   YHAVE,R0         START DOWN THE ARM LOOKING FOR THE
1963  0FCE  5200 0106                     SUBL  INLED,R0            PINCH WHEEL
1964  0FD2  5D00 007A                     STRL  YHAVE,R0            YHAVE=YHAVE-INLED
1965  0FD6  1400 FFFF 059C                LDL   =D-64100,R0      SET INLED TO BE THE Y AXIX ORIGIN
1966  0FDC  5D00 0068                     STRL  YWANT,R0
1967  0FE0  6900 00C0                     INC   OTHERPOINT,1
1968*                                                                            01694000
1969  0FE4  DF1A                          CALR  REEDCHK          IF SWITCH IS CLOSED IT IS BROKEN
1970  0FE6  9E08                          RET
1971*                                                                            01697000
1972  0FE8  5402 0068                     LDL   YWANT,R2         IF Y LOCATION IS LESS THAN -200000
1973  0FEC  1002 FFFC F2C0                CPL   =D-200000,R2        SOMETHING IS WRONG
1974  0FF2  5E01 11DA                     JP    TRAP29,LT
1975*                                                                            01701000
1976  0FF6  3A04 0105                     INB   R0,LEDWD
1977  0FFA  A605                          BITB  R0,5             IF PINCH WHEEL NOT LOCATED KEEP GOING
1978  0FFC  9E06                          RET   Z
1979*                                                                            01705000
1980  0FFE  1002 FFFE D338                CPL   =D-77000,R2      IF PINCH WHEEL LOCATED LOWER THAN
1981  1004  5E0A 11DA                     JP    TRAP29,GT           BOTTOM END OF GRIT TUBE, SOMETHING
1982  1008  5D02 0148                     STRL  D1,R2               IS WRONG; IF NOT SAVE LOCATION AS
1983  100C  6900 00C0                     INC   OTHERPOINT,1        D1
1984  1010  9E08                          RET
1985*                                                                            01711000
1986  1012  5400 0148                     LDL   D1,R0            GO AN 1.5 INCH PAST D1 TO CLEAR THE
1987  1016  5200 0068                     SUBL  YWANT,R0            MAGNETIC FIELD
1988  101A  1000 0000 2EE0                CPL   =D12000,R0
1989  1020  9E01                          RET   LT
1990*                                                                            01716000
1991  1022  DF39                          CALR  REEDCHK
1992  1024  6900 00C0                     INC   OTHERPOINT,1
1993  1028  1400 0000 0050                LDL   =D80,R0          TURN ARROUND TO FIND D2
1994  102E  5D00 00BA                     STRL  YDESIREDV,R0
1995  1032  9E08                          RET
1996*                                                                            01722000
1997  1034  5400 0068                     LDL   YWANT,R0         IF PINCH WHEEL IS NOT FOUND BY THE
1998  1038  1000 FFFE D338                CPL   =D-77000,R0         END OF THE GRIT TUBE, SOMETHING IS
1999  103E  5E0A 11DA                     JP    TRAP29,GT           WRONG
2000  1042  3A24                          INB   R2,LEDWD
2001  1046  A625                          BITB  R2,5
2002  1048  9E06                          RET   Z
2003*                                                                            01729000
```

```
2008  1054  5400 0068            GETBAK2  LDL   YWANT,R0              GO ON FOR 1.5 INCHES TO GET CLEAR    01734000
2009  1058  5200 014C                     SUBL  D2,R0                 OF THE MAGNETIC FIELD                01735000
2010  105C  1000 0000 2EE0                CPL   =D12000,R0                                                 01736000
2011  1062  9E01                          RET                                                              01737000
2012*                                                                 01738000
2013  1064  1400 FFFF FFF6                LDL   =D-10,R0              COME IN CLOSE TO D1 MORE SLOWLY      01739000
2014  106A  5D00 00BA                     STRL  YDESIREDV,R0                                               01740000
2015  106E  DF5F                          CALR  REEDCHK               IF REED SWITCH IS CLOSED IT IS BROKEN 01741000
2016  1070  6900 00C0                     INC   OTHERPOINT,1                                               01742000
2017  1074  9E08                          RET                                                              01743000
2018*                                                                 01744000
2019  1076  5400 0068            SECD1    LDL   YWANT,R0              APPROACH D1 UNTIL NEAR THEN GO TO    01745000
2020  107A  5200 014B                     SUBL  D1,R0                 NEXT PHASE                           01746000
2021  107E  1000 0000 01F4                CMPL  =D500,R0                                                   01747000
2022  1084  9E0A                          RET   GT                                                         01748000
2023*                                                                 01749000
2024  1086  6900 00C0                     INC   OTHERPOINT,1                                               01750000
2025  108A  1400 FFFF FFFF                LDL   =D-1,R0               BEGIN SLOW MOVE TO FIND EXACT D1     01751000
2026  1090  5D00 00BA                     STRL  YDESIREDV,R0                                               01752000
2027  1094  1400 0000 0001                LDL   =D1,R0                                                     01753000
2028  109A  5D00 00B2                     STRL  YACCELERATE,R0                                             01754000
2029  109E  DF77                          CALR  REEDCHK               IF SWITCH IS CLOSED IT IS BROKEN     01755000
2030  10A0  9E08                          RET                                                              01756000
2031*                                                                 01757000
2032  10A2  3A04 0105            LASTD1   INB   R0,LEDWD                                                   01758000
2033  10A6  A605                          BITB  R0,5                  LOOK FOR SWITCH CLOSING              01759000
2034  10A8  9E06                          RET   Z                                                          01760000
2035*                                                                 01761000
2036  10AA  5400 0068                     LDL   YWANT,R0              FOUND IT! NOW SAVE AS D1 AND HEAD    01762000
2037  10AE  5D00 014B                     STRL  D1,R0                 BACK THE OTHER WAY                   01763000
2038  10B2  6900 00C0                     INC   OTHERPOINT,1                                               01764000
2039  10B6  1400 0000 0003                LDL   =D3,R0                                                     01765000
2040  10BC  5D00 00B2                     STRL  YACCELERATE,R0                                             01766000
2041  10C0  1400 FFFF FFB0                LDL   =D-80,R0                                                   01767000
2042  10C6  5D00 00BA                     STRL  YDESIREDV,R0                                               01768000
2043  10CA  9E08                          RET                                                              01769000
2044*                                                                 01770000
2045  10CC  5400 014B            GETBAK3  LDL   D1,R0                 GET CLEAR OF MAGNETIC FIELD FOR      01771000
2046  10D0  5200 0068                     SUBL  YWANT,R0              LOOKING FOR D2                       01772000
2047  10D4  1000 0000 2EE0                CMPL  =D12000,R0                                                 01773000
2048  10DA  9E01                          RET   LT                                                         01774000
2049*                                                                 01775000
2050  10DC  DF96                          CALR  REEDCHK               IF SWITCH IS CLOSED SOMETHING IS     01776000
2051  10DE  1400 0000 000A                LDL   =D10,R0               REAL WRONG                           01777000
2052  10E4  5D00 00BA                     STRL  YDESIREDV,R0                                               01778000
2053  10E8  6900 00C0                     INC   OTHERPOINT,1                                               01779000
2054  10EC  9E08                          RET                                                              01780000
2055*                                                                 01781000
2056  10EE  5400 014C            D2SEC    LDL   D2,R0                 SLOW DOWN AND GET CLOSE TO D2        01782000
2057  10F2  5200 0068                     SUBL  YWANT,R0                                                   01783000
```

```
2058  10F6           1UFC                           CMPL     =D500,R0                                                            01784000
2059  1UFC           9E0A                           RET      GT                                                                  01785000
2060*SP                                                                                                                          01786000
2061  10FE  1400 0000 0001                          LDL      =D1,R0
2062  1104  5D00 00B2                               STRL     YACCELERATE,R0                                                      01787000
2063  1108  5D00 00BA                               STRL     YDESIREDV,R0 START SNEEKING UP ON D2                                 01788000
2064  110C  6900 00C0                               INC      OTHERPOINT,1                                                        01789000
2065  1110  9F0R                                   RET                                                                           01790000
2066*SP                                                                                                                          01791000
2067*
2068*    THE FOLLOWING SECTION SETS UP THE Y AXIS HARD CLIP LIMITS                                                                01791001
2069*    THE CENTER OF THE COORDINATE SYSTEM, AND REPOSITIONS                                                                     01791010
2070*    THE LOGICAL POSITION OF THE INIT SENSOR, THE HP POSITION                                                                 01791020
2071*    AND THE PEN STABLE POSITION TO CORRESPOND WITH THE REAL                                                                  01791030
2072*    POSITION.                                                                                                                01791040
2073*                                                                                                                             01791050
2074*                                                                                                                             01791060
2075*  BORDER:                                                                                                                    01791070
2076*                                                                                                                             01791080
2077*        IN NORMAL MODE THE BORDER IS 15MM OR 4793EU WIDE                                                                     01791090
2078*                                                                                                                             01791100
2079*        IN EXPAND MODE THE BORDER IS 5MM OR 1598EU WIDE                                                                      01791110
2080*                                                                                                                             01791120
2081*                                                                                                                             01791130
2082*  DIMENSIONS:                                                                                                                01791140
2083*                                                                                                                             01791150
2084*    REEDSWITCH                                                                                                               01791160
2085*        61.65MM OR 19701EU FROM PEN TIP TO REED SWITCH                                                                       01791170
2086*                                                                                                                             01791180
2087*    MOBILEDGE                                                                                                                01791190
2088*        12.53MM OR 4004EU FROM MAGNET CENTER TO VARIABLE                                                                     01791200
2089*    PAPER EDGE                                                                                                               01791210
2090*                                                                                                                             01791220
2091*    PAPEREDGE                                                                                                                01791230
2092*        58.62MM OR 18733EU FROM INIT SENSOR TO FIXED                                                                         01791240
2093*    PAPER EDGE                                                                                                               01791250
2094*                                                                                                                             01791260
2095*    TUTIP                                                                                                                    01791270
2096*        7.3MM OR 2333EU FROM INIT FLAG EDGE TO PEN                                                                           01791280
2097*        TIP ON PEN HOLDER                                                                                                    01791290
2098*                                                                                                                             01791360
2099*    COMPENSATE                                                                                                               01791370
2100*        INTERMEDIATE CONSTANT, COMPENSATE= PAPEREDGE-                                                                        01791380
2101*        REEDSWITCH-MOBILEDGE-TOTIP                                                                                           01791390
2102*        18733-19701-4004-2333=-7305                                                                                          01791400
2103*                                                                                                                             01791410
2104*                                                                                                                             01791420
2105*                                                                                                                             01791421
                                                                                                                                  01791430
                                                                                                                                  01792000
2106  1112  3A04 0105                       LASTD2  INR      R0,LEDWD         KEEP SNEEKING UNTIL SWITCH IS FOUND                 01793000
2107  1116  A605                                    BITB     R0,5                                                                 01794000
2108  1118  9E06                                    RET      Z                                                                   01795000
```

| | | | | | | |
|---|---|---|---|---|---|---|
| 2109* | | | | | | 01812000 |
| 2110 | 111A | 1404 0000 12B9 | | LDL | =D4793,R4 | IF EXPAND SWITCH IS ON, USE 5MM | 01813000 |
| 2111 | 1120 | 4C04 0020 | | TESTB | EXFLG | BORDER. OTHERWISE USE 15MM BORDER | 01814000 |
| 2112 | 1124 | E603 | | JR | NOEXP,Z | | 01815000 |
| 2113 | 1126 | 1404 0000 063E | | LDL | =D1598,R4 | | 01816000 |
| 2114* | | | | | | | 01817000 |
| 2115 | 112C | 5404 0148 | NOEXP | LDL | D1,R0 | PUT HALF PAPER WIDTH IN R0. | 01818000 |
| 2116 | 1130 | 5600 0068 | | ADDL | YWANT,R0 | HALF PAPER WIDTH =.5((D1+D2)/2+ | 01819000 |
| 2117 | 1134 | B30D FFFF | | SRAL | R0,1 | COMPENSATE) | 01819100 |
| 2118 | 1138 | 1600 FFFF E377 | | ADDL | =D-7305,R0 | | 01820000 |
| 2119 | 113E | B30D FFFF | | SRAL | R0,1 | | 01821000 |
| 2120* | | | | | | | 01822000 |
| 2121 | 1142 | 9604 | | ADDL | R0,R4 | EUYLO=HALFWIDTH+BORDER | 01823000 |
| 2122 | 1144 | 5D04 0026 | | STRL | EUYLO,R4 | | 01824000 |
| 2123* | | | | | | | 01825000 |
| 2124 | 1148 | 9222 | | SUBL | R2,R2 | EUYHI=-EUYLO | 01826000 |
| 2125 | 114A | 9242 | | SUBL | R4,R2 | | 01827000 |
| 2126 | 114C | 5D02 0028 | | STRL | EUYHI,R2 | | 01828000 |
| 2127* | | | | | | | 01829000 |
| 2128 | 1150 | 1200 0000 4010 | | SUBL | =D16400,R0 | INLED=-(HALFWIDTH-PAPEREDGE+TOTIP) | 01830000 |
| 2129 | 1156 | 9222 | | SUBL | R2,R2 | =-(HALFWIDTH-18733+2333) | 01830100 |
| 2130 | 1158 | 9202 | | SUBL | R0,R2 | =-(HALFWIDTH-16400) | 01830200 |
| 2131 | 115A | 5D02 0106 | | STRL | INLED,R2 | | 01831000 |
| 2132 | 115E | 9420 | | LDL | R2,R0 | | 01832000 |
| 2133 | 1160 | 9424 | | LDL | R2,R4 | | 01833000 |
| 2134* | | | | | | | 01834000 |
| 2135 | 1162 | 5600 0016 | | ADDL | MHVPE,R0 | HVPEN=MHVPE+INLED | 01835000 |
| 2136 | 1166 | 5D00 00FE | | STRL | HVPEN,R0 | | 01836000 |
| 2137* | | | | | | | 01837000 |
| 2138 | 116A | 5600 0017 | | ADDL | MSTBL,R0 | STBLE=MSTBL+HVPEN | 01838000 |
| 2139 | 116E | 5D00 0102 | | STRL | STBLE,R0 | | 01839000 |
| 2140* | | | | | | | 01840000 |
| 2141 | 1172 | 5602 007A | | ADDL | YHAVE,R2 | YHAVE=INLED+YHAVE | 01840100 |
| 2142 | 1176 | 5D02 007A | | STRL | YHAVE,R2 | | 01840200 |
| 2143* | | | | | | | 01840300 |
| 2144 | 117A | 5604 0068 | | ADDL | YWANT,R4 | YWANT=INLED+YWANT | 01840400 |
| 2145 | 117E | 5D04 0068 | | STRL | YWANT,R4 | | 01840500 |
| 2146 | 1182 | 5D04 0082 | | STRL | YEND,R4 | | 01840700 |
| 2147 | 1186 | 5D04 003E | | STRL | YSTRT,R4 | YWANT=YEND=YSTRT | 01840800 |
| 2148* | | | | | | | 01840900 |
| 2149 | 118A | 6900 00C0 | | INC | OTHERPOINT,1 | | 01841000 |
| 2150 | 118E | 9200 | | SUBL | R0,R0 | | 01842000 |
| 2151 | 1190 | 5D00 00BA | | STRL | YDESIREDV,R0 | | 01844000 |
| 2152 | 1194 | 9E08 | | RET | | | 01845000 |
| 2153* | | | | | | | 01846000 |
| 2154 | 1196 | 4D01 00BE 0007 | YDONE | CMPI | POINTER,=D7 | SEE IF X AXIS IS DONE YET | 01847000 |
| 2155 | 119C | 9E0E | | RET | NE | F NOT, WAIT | 01848000 |
| 2156* | | | | | | | 01849000 |
| 2157 | 119E | BD00 | | LDK | 0,R0 | | 01850000 |
| 2158 | 11A0 | A101 | | LD | R0,R1 | | 01851000 |

| | | | | | | |
|---|---|---|---|---|---|---|
| 2159 | 11A2 | 6F00 0016 | | STR | MBRDY,R0 | 01852000 |
| 2160 | 11A6 | 5D00 001A | | STRL | NN,R0 | 01853000 |
| 2161 | 11AA | 4D05 00C4 | | STRI | STATE,=D6 | 01854000 |
| 2162 | 11B0 | 9E08 | QUIT | RET | | 01855000 |
| 2163* | | | | | | |
| 2164 | 11B2 | 3A04 0105 | REEDCHK | INB | R0,LEDWD | 01856000 01857000 |
| 2165 | 11B6 | A605 | | BITB | R0,5 | 01858000 |
| 2166 | 11B8 | 5E0E 11DA | | JP | TRAP29,NZ | 01859000 |
| 2167 | 11BC | 9E08 | | RET | | 01860000 |
| 2168*SP | | | | | | 01860100 |
| 2169* | | | | | | 01861000 |
| 2170* | | | | | | 01862000 |
| 2171**************************** | | | | | | 01863000 |
| 2172** TRAP LOCATIONS ** | | | | | | 01864000 |
| 2173**************************** | | | | | | 01865000 |
| 2174* | | | | | | 01875000 |
| 2175 | 11BE | C021 | TRAP21 | LDB | =H21,R0 | 01876100 |
| 2176 | 11C0 | E83C | | JR | OUT0 | 01876200 |
| 2177 | 11C2 | C022 | TRAP22 | LDB | =H22,R0 | 01876300 |
| 2178 | 11C4 | E83A | | JR | OUT0 | 01876400 |
| 2179 | 11C6 | C023 | TRAP23 | LDB | =H23,R0 | 01876500 |
| 2180 | 11C8 | E838 | | JR | OUT0 | 01876600 |
| 2181 | 11CA | C024 | TRAP24 | LDB | =H24,R0 | 01876700 |
| 2182 | 11CC | E836 | | JR | OUT0 | 01876800 |
| 2183 | 11CE | C025 | TRAP25 | LDB | =H25,R0 | 01876900 |
| 2184 | 11D0 | E834 | | JR | OUT0 | 01877000 |
| 2185 | 11D2 | C026 | TRAP26 | LDB | =H26,R0 | 01877100 |
| 2186 | 11D4 | E832 | | JR | OUT0 | 01877200 |
| 2187 | 11D6 | C027 | TRAP27 | LDB | =H27,R0 | 01877300 |
| 2188 | 11D8 | E830 | | JR | OUT0 | 01877400 |
| 2189 | 11DA | C031 | TRAP29 | LDB | =H31,R0 | 01877900 |
| 2190 | 11DC | E82E | | JR | OUT0 | 01878000 |
| 2191 | 11DE | C030 | TRAP30 | LDB | =H30,R0 | 01878010 |
| 2192 | 11E0 | E82C | | JR | OUT0 | 01878020 |
| 2193 | 11E2 | C032 | TRAP32 | LDB | =H32,R0 | 01878100 |
| 2194 | 11E4 | E82A | | JR | OUT0 | 01878200 |
| 2195 | 11E6 | C033 | TRAP33 | LDB | =H33,R0 | 01878300 |
| 2196 | 11E8 | E828 | | JR | OUT0 | 01878400 |
| 2197 | 11EA | C034 | TRAP34 | LDB | =H34,R0 | 01878500 |
| 2198 | 11EC | E826 | | JR | OUT0 | 01878600 |
| 2199 | 11EE | C035 | TRAP35 | LDB | =H35,R0 | 01878700 |
| 2200 | 11F0 | E824 | | JR | OUT0 | 01878800 |
| 2201 | 11F2 | C036 | TRAP36 | LDB | =H36,R0 | 01878900 |
| 2202 | 11F4 | E822 | | JR | OUT0 | 01879000 |
| 2203 | 11F6 | C037 | TRAP37 | LDB | =H37,R0 | 01879100 |
| 2204 | 11F8 | E820 | | JR | OUT0 | 01879200 |
| 2205 | 11FA | C038 | TRAP38 | LDB | =H38,R0 | 01879300 |
| 2206 | 11FC | E81E | | JR | OUT0 | 01879400 |
| 2207* | | | | | | 01879500 |
| 2208 | 11FE | 4C04 0191 | TRAP28 | TESTB | IGERROR | 01879600 |

```
2209  1202  EE11                    JR    ERRO,NZ                                           01879700
2210  1204  4D01 0070 0007          CMPI  CMAND,=D7                                         01890000
2211  120A  EE16                    JR    KILLIT,NE                                         01891000
2212  120C  4D01 00HE 0001          CMPI  POINTER,=D1                                       01892000
2213  1212  EA12                    JR    KILLIT,GT                                         01893000
2214  1214  5400 0068               LDL   YWANT,R0                                          01894000
2215  1218  5D00 007A               STRL  YHAVE,R0                                          01895000
2216  121C  1400 0000 0050          LDL   =D80,R0                                           01896000
2217  1222  5D00 00RA               STRL  YDESIREDV,R0                                      01897000
2218  1226  BD30                    LDK   0,R3                                              01898000
2219  1228  A134                    LD    R3,R4                                             01899000
2220  122A  A135                    LD    R3,R5                                             01900000
2221  122C  5D04 0UAA               STRL  YCURRENTV,R4                                      01901000
2222  1230  6900 00BE               INC   POINTER,1                                         01902000
2223  1234  5E08 0598               JP    OK                                                01903000
2224*                         ERRO                                                          01904000
2225  1238  C028            KILLIT  LDK   =H28,R0                                           01905000
2226  123A  BD20            OUTO    LDK   0,R2                                              01906000
2227  123C  7C01                    DI    VI                                                01906100
2228  123E  3A26 0205               OUTH  R2,205H                                           01906200
2229  1242  3A26 0207               OUTB  R2,207H                                           01906300
2230  1246  3H26 00R0               OUT   R2,XOPRT                                          01907000
2231  124A  3H26 0U82               OUT   R2,YOPRT                                          01908000
2232  124E  3A26 0101               OUTB  R2,STEPR                                          01909000
2233  1252  3A26 0103               OUTB  R2,PENLF                                          01909100
2234  1256  5E08 002F               JP    URERR                                             01910000
2235*SP
2236*
2237*****************************************************
2238*****************************************************
2239*****************************************************
2240*      CODE TO ROTATE TURRET FOR PEN PICK AND INITIALIZATION
2241*****************************************************
2242*****************************************************
2243*****************************************************
2244*****************************************************
2245*
2246*      BACKGROUND CODE TO SET UP ROTATE
2247*
2248*
2249*
2250  125A  5F00 009C       ROTAT   CALL  WAIT                                              01911000
2251  125E  6F00 0014               STR   FINAL,R0                                          01914000
2252  1262  6B01 0014               DEC   FINAL,2                                           01915000
2253  1266  4300 0000               SUB   PDSTN,R0                                          01916000
2254  126A  9E06                    RET   Z                                                 01917000
2255  126C  4D08 0002               CLR   SNTMP                                             01918000
2256  1270  ED06                    JR    NONEG,P                                           01919000
2257  1272  8D02                    NEG   R0                FIGURE OUT WHICH DIRECTION TO BE 01920000
2258  1274  4D05 0002 0001          STRI  SNTMP,=D1         TURNED, AND SET UP LENGTH OF TURN 01921000
                                                            AND DIRECTION                    01922000
```

| | | | | | | | |
|---|---|---|---|---|---|---|---|
| 2259 | 127A | 6903 0014 | | INC | FINAL,4 | | 01937000 |
| 2260 | 127E | 0B00 0004 | | CMP | =D4,R0 | | 01938000 |
| 2261 | 1282 | 9E02 | | RET | LE | IF MOVE IS TOO SHORT | 01939000 |
| 2262* | | | NONEG | | | | 01940000 |
| 2263 | 1284 | 4D05 0006 000D | | STRI | ENDS,=D13 | INITIALIZE VARIABLES FOR ROTATE | 01941000 |
| 2264 | 128A | 4D08 0004 | | CLR | ACCUM | | 01942000 |
| 2265 | 128E | 4D05 0042 0006 | | STRI | CMTMP,=D6 | | 01943000 |
| 2266 | 1294 | 4D08 0010 | | CLR | INIT | | 01944000 |
| 2267 | 1298 | 4D05 0016 FFFF | | STRI | MRRDY,=HFFFF | | 01945000 |
| 2268 | 129E | 9E08 | | RET | | | 01946000 |
| 2269* | | | | | | | 01947000 |
| 2270* | | | ;************* | INTERRUPT TURRET RUTATING CODE | | | 01948000 |
| 2271* | | | | | | | 01949000 |
| 2272* | | | | | | | 01950000 |
| 2273* | | | | | | | 01951000 |
| 2274* | | | ;************************************************************* | | | | 01952000 |
| 2275* | | | | | | | 01953000 |
| 2276 | 12A0 | 6900 001A | SELPN | INC | NN,1 | | 01954000 |
| 2277 | 12A4 | 4D04 0006 | | TEST | ENDS | | 01955000 |
| 2278 | 12A8 | ED15 | | JR | ATEND,P | | 01956000 |
| 2279* | | | | | | | 01957000 |
| 2280 | 12AA | 6102 0004 | MIDDLE | LD | ACCUM,R2 | CODE TO DO SLEWING PART OR TURRET | 01958000 |
| 2281 | 12AE | 0102 32C8 | | ADD | =D13000,R2 | ROTATION | 01959000 |
| 2282 | 12B2 | 6F02 0004 | | STR | ACCUM,R2 | | 01959100 |
| 2283 | 12B6 | 5E0C 08D0 | | JP | RETURN,NOV | ACCUMULATE UNTIL WORD OVERFLOWS,THEN | 01960000 |
| 2284 | 12BA | 6102 0014 | | LD | FINAL,R2 | STEP; IF WE ARE NEAR THE END OF THE | 01960100 |
| 2285 | 12BE | 4R02 0000 | | CMP | POSTN,R2 | ROTATE, GO TO END CODE TO SLOW DOWN | 01960200 |
| 2286 | 12C2 | E603 | | JR | NEAREND,EQ | IF NOT STEP AND GO ON | 01960300 |
| 2287 | 12C4 | DFD1 | | CALR | STEP | | 01960400 |
| 2288 | 12C6 | 5F08 08D0 | | JP | RETURN | | 01960500 |
| 2289* | | | | | | | 01960600 |
| 2290 | 12CA | 4D05 0006 000D | NEAREND | STRI | ENDS,=D13 | CODE TO BEGIN OR END A MOVE | 01961000 |
| 2291 | 12D0 | 5E08 08D0 | | JP | RETURN | | 01962000 |
| 2292* | | | | | | | 01963000 |
| 2293 | 12D4 | 6R00 0006 | ATEND | DEC | ENDS,1 | CODE TO DU WAIT AT BEGIN OR END OF | 01964000 |
| 2294 | 12D8 | EE1D | | JR | ENDENDS,NZ | A MOVE; STFP IF THIS IS FIRST INT | 01965000 |
| 2295 | 12DA | DFDC | | CALR | STEP | OF A MOVE | 01966000 |
| 2296 | 12DC | 4D04 0004 | | TEST | ACCUM | FIGURE OUT IF THIS IS BEGIN OR END | 01967000 |
| 2297 | 12E0 | 5F06 08D0 | | JP | RETURN,Z | IF ACCUM IS 0 THIS IS BEGINING | 01968000 |
| 2298* | | | | | | | 01969000 |
| 2299 | 12E4 | 6000 00C8 | | LDB | MOTOR,R0 | IF THIS IS END OF MOVE REDUCE STEPPER | 01970000 |
| 2300 | 12E8 | A204 | | RBITB | R0,4 | HOLDING FORCE | 01971000 |
| 2301 | 12EA | 6F00 00C8 | | STRB | MOTOR,R0 | | 01972000 |
| 2302 | 12EE | 3A06 0101 | | OUTB | R0,STEPR | | 01973000 |
| 2303* | | | | | | | 01974000 |
| 2304 | 12F2 | 4D04 0010 | | TEST | INIT | IF THIS IS A TURRET INITIALIZATION | 01975000 |
| 2305 | 12F6 | E607 | | JR | SKINT,Z | CORRECT PENMAP | 01976000 |
| 2306* | | | | | | | 01983000 |
| 2307 | 12F8 | 6100 0000 | | LD | POSTN,R0 | IF THIS IS AN INITIALIZATION AND | 01984000 |
| 2308 | 12FC | 4B00 000E | | CMP | FULLTURN,R0 | POSTN<FULLTURN IT WAS UNSUCCESSFUL, | 01985000 |

```
2309   1300   E902              JR    SKINT,GE         TURVA MUST BE CLEARED              01986000
2310   1302   4D08 0003          CLR   TURVA                                              01987000
2311*                                                                                     
2312   1306   9200        SKINT SUBL  R0,R0                                               01989000
2313   1308   5D00 001A         STRL  NN,R0                                               01990000
2314   130C   6F00 0016         STR   MBRDY,R0                                            01991000
2315   1310   5E08 08D0         JP    RETURN                                              01992000
2316*                                                   01988000                          
                                                        THIS CODE TERMINATES TURRET ROTATE
2317   1314   4D01 0006 000C ENDENDS CMPI ENDS,=D12                                       01994000
2318   131A   5E0E 08D0         JP    RETURN,NE                                           01995000
2319   131E   DFFE              CALR  STEP                                                01996000
2320   1320   5E08 08D0         JP    RETURN                                              01997000
2321*                                                   01993000                          
                                                        IF THIS IS THE FIRST INT OF SPEEDING
2322*                                                   UP OR SLOWING, STEP; IF NOT JUST WAIT
2323   1324   4D04 0010   STEP  TEST  INIT                                                02042000
2324   1328   E602              JR    NORML,Z                                             02043000
2325   132A   5F00 13DA         CALL  INITT                                               02044000
2326   132E   4D04 0002         TEST  SNTMP                                               02045000
2327   1332   EE11              JR    NEG,NZ                                              02046000
2328*                                                                                     
2329   1334   6100 0008   POS   LD    PNTER,R0                                            02048000
2330   1338   0R00 0007         CMP   =LTABLE+7,R0                                        02049000
2331   133C   E905              JR    GOBAK,GE                                            02050000
2332   133E   6900 0008         INC   PNTER,1                                             02051000
2333   1342   6900 0000         INC   POSTN,1                                             02052000
2334   1346   E817              JR    OUT                                                 02053000
2335*                                                   02047000  GO TO EITHER THE FORWARD
                                                                  OR BACKWARD STEP SECTION
2336   1348   2100 0000   GOBAK LD    =LTABLE,R0                                          02055000
2337   134C   6F00 0008         STR   PNTER,R0                                            02056000
2338   1350   6900 0000         INC   POSTN,1                                             02057000
2339   1354   E810              JR    OUT                                                 02058000
2340*                                                   02054000  LOAD BEGINNING OF TABLE INTO
                                                                  PNTER
2341   1356   6100 0008   NEG   LD    PNTER,R0                                            02060000
2342   135A   0R00 0000         CMP   =LTABLE,R0                                          02061000
2343   135E   E205              JR    GOFWD,LE                                            02062000
2344   1360   6H00 0008         DEC   PNTER,1                                             02063000
2345   1364   6H00 0000         DEC   POSTN,1                                             02064000
2346   1368   ER06              JR    OUT                                                 02065000
2347*                                                   02059000  ARE WE AT START OF TABLE?
                                                                  IF SO GO BACK TO THE END
2348   136A   2100 0007   GOFWD LD    =LTABLE+7,R0                                        02067000
2349   136E   6F00 0008         STR   PNTER,R0                                            02068000
2350   1372   6B00 0000         DEC   POSTN,1                                             02069000
2351*                                                   02066000  LOAD END OF TABLE INTO PNTER
2352   1376   6101 0008   OUT   LD    PNTEH,R1                                            02071000
2353   137A   2010              LDB   (R1),R0                                             02072000
2354   137C   6001 00C8         LDB   MOTOR,R1                                            02073000
```

```
2355  13A0       0601 F0F0           ANDB  =HF0,R1                            02074000
2356  13A4       8A10                ORB   R1,R0                              02075000
2357  13A6       6F00 00CB           STRB  MOTOH,R0                           02076000
2358  13A8       3A06 0101           OUTB  R0,STEPR                           02077000
2359  13AE       9E08                RET                                      02078000
2360*                                                                         02079000
2361******************************************                                02080000
2362**** TURRET INITIALIZATION CODE ******                                    02081000
2363******************************************                                02082000
2364*                                                                         02083000
2365  1390       5F00 15C2     ITSET CALL  OTSET                              02084000
2366  1394       4D08 0002           CLR   SNTMP                              02085000
2367  1398       4D08 0001           CLR   PENMA                              02086000
2368  139C       4D08 000E           CLR   TYPE                               02086100
2369  13A0       4D05 0042 0006      STRI  CMTMP,=D6                          02087000
2370  13A6       4D05 0010 0001      STRI  INIT,=D1                           02088000
2371  13AC       4D08 0000           CLR   POSTN                              02089000
2372  13B0       4D05 0014 03E8      STRI  FINAL,=D1000                       02090000
2373  13B6       4D05 0003 FFFF      STRI  TURVA,=D-1                         02091000
2374  13BC       4D05 0012 FFFF      STRI  PENTU,=D-1                         02092000
2375  13C2       4D08 0004           CLR   ACCUM                              02093000
2376  13C6       4D05 0006 000D      STRI  ENDS,=D13                          02094000
2377  13CC       4D05 00FC 05DC      STRI  TURTI,=D1500                       02094100
2378  13D2       4D05 0016 FFFF      STRI  MBRDY,=HFFFF                       02095000
2379  13D8       9E08                RET                                      02095100
2380*                                                                         02096000
2381  13DA       3A14 0105     INITT INB   R1,TURET                           02097000
2382  13DE       6100 0000           LD    POSTN,R0                           02098000
2383*                                                                         02099000
2384  13E2       4B00 000E           CMP   FULLTURN,R0                        02101000
2385  13E6       E105                JR    NOTDUN,LT                          02102000
2386*                                                                         02103000
2387  13E8       EA04                JR    NOTDUN,GT                          02103100
2388  13EA       6F00 0014           STR   FINAL,R0                           02104000
2389  13EE       6909 0014           INC   FINAL,10                           02104100
2390*                                                                         02105000
2391  13F2       5F00 1428     NOTDUN CALL MAPEN                              02106000
2392*                                                                         02107000
2393  13F6       A610                BITB  R1,0                               02108000
2394*                                                                         02109000
2395  13F8       E60F          ON    JR    OFF,Z                              02110000
2396  13FA       4B00 0004           CMP   SIZE,R0                            02111000
2397  13FE       E901                JR    FOUND,GE                           02112000
2398  1400       9E08                RET                                      02113000
2399*                                                                         02114000
2400  1402       0H00 018B     FOUND CMP   =D395,R0                           02114100
2401  1406       9E09                RET   GE                                 02114200
2402  1408       2101 0015           LD    =LTTYP7,R1                         02115000
2403  140C       BD28                LDK   8,R2                               02116000
2404  140E       BB1C 020A           CPDR  R1,R0,R2,GT                        02117000
2405  1412       6F02 000E           STR   TYPE,R2                            02118000
```

```
2406   1416   9E08                              RET                              02119000
2407*
2408*
2409   1418        4R00 0004               OFF  CMP   SIZE,R0                    02145000
2410   141C        9E0A                         RET   GT                         02146000
2411   141E        4D08 0000                    CLR   POSTN                      02147000
2412   1422        6B00 0014                    DEC   FINAL,1                    02147100
2413   1426        9E08                         RET                              02148000
2414*                                                                            02149000
2415*                                                                            02150000
2416   1428        2102 000D               MAPEN LD   =1,PEN8,R2   COMPARE ADDRESS WITH LIST OF PEN   02151000
2417   142C        BD39                          LDK  9,R3         ADDRESSES IF NOT ON LIST DON'T     02152000
2418   142E        BB2C 0306                     CPDR R2,R0,R3,EQ  UPDATE PEN MAP                     02153000
2419   1432        9E04                          RET  OV           V MEANS NOT ON LIST                02154000
2420*                                                                            02155000
2421   1434        6102 0001                     LD   PENMA,R2     IF PEN PRESENT SET APROPRIATE      02155000
2422   1438        A612                          BITB R1,2         IN PENMAP, IF NOT RESET IT         02156000
2423   143A        EE05                          JR   GOTONE,NZ                                       02157000
2424*                                                                            02158000
2425   143C        2303 0200                     RBITD R3,R2       IF NO PEN IN TURET AT PEN ADDRESS  02159000
2426   1440        6F02 0001                     STR   PENMA,R2    RESET BIT IN PENMAP                02160000
2427   1444        9E08                          RET                             02161000
2428*                                                                            02162000
2429   1446        2503 0200               GOTONE SBITD R3,R2      IF PEN PRESETN IN TURET AT PEN     02162010
2430   144A        6F02 0001                      STR   PENMA,R2   ADDRESS SET BIT IN PENMAP          02162020
2431   144E        9E08                           RET                            02162030
2432*SP                                                                          02162040
2433*
2434*
2435*
2436************* GET PEN CODE **********
2437*********************************
2438*********************************
2439*
2440   1450   4C05 0190 FFFF           SPSET   STRIB NORST,=HFF                  02162050
2441   1456   DFA2                             CALR  PENNO                       02162100
2442*                                                                            02163000
2443   1458   DF7A                             CALR  HPGO          GO TO HAVE PEN POSITION            02164000
2444*                                                                            02165000
2445   145A   A601                             BITB  R0,1                        02166000
2446   145C   5F0E 11E2                        JP    TRAP32,NZ                   02167000
2447   1460   A602                             BITB  R0,2                        02168000
2448   1462   5E06 11E6                        JP    TRAP33,Z                    02174100
2449   1466   DFB6                             CALR  NOPOWER       CRASH IF STABLE IS EMPTY           02175000
2450*                                                             APPLY FULL TORQUE TO STEPPER        02193000
2451   1468   DFDF                             CALR  SLODN         SLOW DOWN FOR PEN PICK             02194000
2452*                                                                            02199000
2453   146A   DF9F                             CALR  STBGO                       02201000
2454*                                                                            02202000
2455   146C   DF84                             CALR  HPGO          GO TO HAVE PEN POSITION            02203000
2456*                                                                            02204000
```

| | | | | | | | |
|---|---|---|---|---|---|---|---|
| 2457 | 146E | DFB3 | | | CALR | RESTORP | | 02220100 |
| 2458 | 1470 | A602 | | | BITB | R0,2 | IN THE STABLE | 02222000 |
| 2459 | 1472 | 5E0E 11EA | | | JP | TRAP34,NZ | | 02223000 |
| 2460* | | | | | | | | |
| 2461 | 1476 | DFC8 | | | CALR | SPDUP | | 02225000 |
| 2462 | 1478 | 4C08 0190 | | | CLRB | NORST | RETURN TO ORIGINAL SPEED | 02225100 |
| 2463* | | | | | | | | |
| 2464 | 147C | 9E08 | | | RET | | | 02227000 |
| 2465* | | | | | | | | |
| 2467* | | | | | | | | |
| 2468 | 147E | 4C05 0190 FFFF | PPSET | STRIB | NORST,=HFF | | 02247100 |
| 2469 | 1484 | DFB9 | | | CALR | PENNO | | 02248000 |
| 2470* | | | | | | | | |
| 2471 | 1486 | DF91 | | | CALR | HPGO | GO TO HAVE PEN POSITION | 02265000 |
| 2472* | | | | | | | | |
| 2473 | 1488 | A602 | | | BITB | R0,2 | TRAP IF THERE IS A PEN IN THE | 02272000 |
| 2474 | 148A | 5E0E 11EE | | | JP | TRAP35,NZ | STABLE | 02273000 |
| 2475 | 148E | A601 | | | BITB | R0,1 | | 02274000 |
| 2476 | 1490 | 5E06 11F2 | | | JP | TRAP36,Z | CRASH IF HOLDER IS EMPTY | 02275000 |
| 2477 | 1494 | DFCD | | | CALR | NOPOWER | | 02275100 |
| 2478* | | | | | | | | |
| 2479 | 1496 | DFF6 | | | CALR | SLODN | SLOW DOWN FOR PEN INSERTION | 02277000 |
| 2480* | | | | | | | | |
| 2481 | 1498 | DFB6 | | | CALR | STBGO | | 02279000 |
| 2482* | | | | | | | | |
| 2483 | 149A | DF9B | | | CALR | HPGO | GO TO HAVE PEN POSITION | 02285000 |
| 2484* | | | | | | | | |
| 2485 | 149C | DFCA | | | CALR | RESTORP | APPLY HALF POWER TO STEPPER | 02290100 |
| 2486 | 149E | A601 | | | BITB | R0,1 | | 02292000 |
| 2487 | 14A0 | 5E0E 11F6 | | | JP | TRAP37,NZ | | 02293000 |
| 2488* | | | | | | | | |
| 2489 | 14A4 | DFDF | | | CALR | SPDUP | RETURN TO ORIGINAL SPEED | 02295000 |
| 2490 | 14A6 | 4C08 0190 | | | CLRB | NORST | | 02295100 |
| 2491* | | | | | | | | |
| 2492 | 14AA | 9E08 | | | RET | | | 02297000 |
| 2494*SP | | | | | | | | |
| 2495 | 14AC | 97F2 | | SLODN | POP | R2,S | SAVE RETURN ADDRESS | 02299000 |
| 2496 | 14AE | 51F0 0122 | | | PUSHL | CNST0,S | SAVE OLD ACCERLERATION AND VELOSITY | 02300000 |
| 2497 | 14B2 | 51F0 0126 | | | PUSHL | CNST1,S | CONSTANTS | 02301000 |
| 2498 | 14B6 | 51F0 012A | | | PUSHL | CNST2,S | | 02302000 |
| 2499 | 14BA | 51F0 012E | | | PUSHL | CNST3,S | | 02303000 |
| 2500* | | | | | | | | 02304000 |
| 2501 | 14BE | 1400 0000 01F1 | | | LDL | =H1F1,R0 | SET NEW SPEED TO BE 7 IPS | 02305000 |
| 2502 | 14C4 | 5D00 0122 | | | STRL | CNST0,R0 | | 02306000 |
| 2503 | 14C8 | 1400 0000 0006 | | | LDL | =H6,R0 | AND THE ACCELERATION TO BE 2G | 02307000 |
| 2504 | 14CE | 5D00 0126 | | | STRL | CNST1,R0 | | 02308000 |
| 2505 | 14D2 | 1400 0000 0039 | | | LDL | =H39,R0 | | 02309000 |
| 2506 | 14D8 | 5D00 012A | | | STRL | CNST2,R0 | | 02309100 |
| 2507 | 14DC | 1400 0000 0009 | | | LDL | =H9,R0 | | 02309110 |

| | | | | | | |
|---|---|---|---|---|---|---|
| 2508 | 14E2 | 5D00 012E | | STRL | CNST3,R0 | | 02309120 |
| 2509* | | | | | | | |
| 2510 | 14E6 | 1E28 | | JP | (R2) | RETURN | 02309130 |
| 2511* | | | | | | | 02309140 |
| 2512 | 14E8 | 97F2 | SPDUP | POP | R2,S | SAVE RETURN ADDRESS | 02309150 |
| 2513 | 14EA | 55F0 012E | | POPL | CNST3,S | RETURN ACCELERATION TO THE | 02309160 |
| 2514 | 14EE | 55F0 012A | | POPL | CNST2,S | WHAT IT WAS BEFORE | 02309170 |
| 2515 | 14F2 | 55F0 0126 | | POPL | CNST1,S | | 02309180 |
| 2516 | 14F6 | 55F0 0122 | | POPL | CNST0,S | | 02309190 |
| 2517 | 14FA | 1E28 | | JP | (R2) | RETURN | 02309200 |
| 2518* | | | | | | | 02309210 |
| 2519 | 14FC | 6001 00C8 | NOPOWER | LDB | MOTOR,R1 | | 02309220 |
| 2520 | 1500 | 0601 E0E0 | | ANDB | =HE0,R1 | TURN STEPPER MOTOR OFF | 02309230 |
| 2521 | 1504 | 3A16 0101 | | OUTB | R1,STEPR | | 02309240 |
| 2522 | 1508 | 9E08 | | RET | | | 02309250 |
| 2523* | | | | | | | 02309260 |
| 2524 | 150A | 6001 00C8 | RESTORP | LDB | MOTOR,R1 | TURN POWER BACK ON AFTER PEN | 02309270 |
| 2525 | 150E | 3A16 0101 | | OUTB | R1,STEPR | PICK OR PUT | 02309280 |
| 2526 | 1512 | 9E08 | | RET | | | 02309290 |
| 2527* | | | | | | | 02309300 |
| 2528 | 1514 | 5F00 00B8 | PENNO | CALL | PUSET | | 02309331 |
| 2529 | 1518 | DFFC | | CALR | PENADD | | 02309332 |
| 2530 | 151A | DFEF | | CALR | MINIM | | 02309333 |
| 2531 | 151C | D162 | | CALR | ROTAT | | 02309334 |
| 2532 | 151E | DFAF | | CALR | OTSET | | 02309335 |
| 2533 | 1520 | 9E08 | | RET | | | 02309337 |
| 2534* | | | | | | | 02309338 |
| 2535 | 1522 | A101 | PENADD | LD | R0,R1 | | 02309340 |
| 2536 | 1524 | AB10 | | DEC | R1,1 | | 02309350 |
| 2537 | 1526 | 8111 | | ADD | R1,R1 | | 02309360 |
| 2538 | 1528 | 6110 0006 | | LD | PEN1(R1),R0 | | 02309370 |
| 2539 | 152C | 9E08 | | RET | | | 02309380 |
| 2540* | | | | | | | 02309390 |
| 2541 | 152E | 51F0 0102 | STBGO | PUSHL | STBLE,S | RUN PEN INTO STABLE POSITION | 02309400 |
| 2542 | 1532 | 51F0 007E | | PUSHL | XEND,S | | 02309410 |
| 2543 | 1536 | 5F00 01D0 | | CALL | MOVEA | | 02309420 |
| 2544 | 153A | DFBD | | CALR | OTSET | | 02309430 |
| 2545 | 153C | 9E08 | | RET | | | 02309440 |
| 254b* | | | | | | | 02309450 |
| 2547 | 153E | A102 | MINIM | LD | R0,R2 | | 02309451 |
| 2548 | 1540 | 6101 0000 | | LD | POSTN,R1 | | 02309460 |
| 2549 | 1544 | 8312 | | SUB | R1,R2 | | 02309470 |
| 2550 | 1546 | 0B02 00C8 | | CMP | =D200,R2 | | 02309480 |
| 2551 | 154A | E205 | | JR | MINI,LE | | 02309490 |
| 2552* | | | | | | | 02309500 |
| 2553 | 154C | 0101 0190 | | ADD | =D400,R1 | | 02309510 |
| 2554 | 1550 | 6F01 0000 | | STR | POSTN,R1 | | 02309520 |
| 2555 | 1554 | E8F4 | | JR | MINIM | | 02309530 |
| 2556* | | | | | | | 02309540 |
| 2557 | 1556 | 0B02 FF38 | MINI | CMP | =D-200,R2 | | 02309550 |
| | | | | | | | 02309560 |

| | | | | | |
|---|---|---|---|---|---|
| 2558 | 155A | 9E09 | | RET GE | 02309570 |
| 2559* | | | | | 02309580 |
| 2560 | 155C | 0301 0190 | | SUB =D400,R1 | 02309590 |
| 2561 | 1560 | 6F01 0000 | | STR POSTN,R1 | 02309600 |
| 2562 | 1564 | E8EC | | JR MINIM | 02309610 |
| 2563* | | | | END OF MINIM SUB | 02309620 |
| 2564* | | | | | 02310000 |
| 2565 | 1566 | 5F00 00B8 | HPGO | CALL PUSET | 02311000 |
| 2566 | 156A | 51F0 00FE | | PUSHL HVPEN,S | 02312000 |
| 2567 | 156E | 51F0 007E | | PUSHL XEND,S | 02313000 |
| 2568* | | | | | 02314000 |
| 2569 | 1572 | 5F00 01D0 | | CALL MOVEA | 02315000 |
| 2570* | | | | | 02316000 |
| 2571 | 1576 | DFDB | | CALR OTSET | 02317000 |
| 2572 | 1578 | 5F00 00B8 | | CALL PUSET | 02318000 |
| 2573* | | | | | 02319000 |
| 2574 | 157C | 3A04 0105 | | INB R0,LEDWD | 02319100 |
| 2575 | 1580 | 9E08 | | RET | 02319400 |
| 2576* | | | | | 02320000 |
| 2578 | 1582 | 4C05 0190 FFFF | HPSET | STPIB NORST,=HFF | 02320010 |
| 2579 | 15B8 | 5F00 00B8 | | CALL PUSET | 02320100 |
| 2580 | 158C | 51F0 00FE | | PUSHL HVPEN,S | 02321000 |
| 2581 | 1590 | 51F0 007E | | PUSHL XEND,S | 02322000 |
| 2582* | | | | | 02323000 |
| 2583 | 1594 | 5F00 01D0 | | CALL MOVEA | 02324000 |
| 2584* | | | | | 02325000 |
| 2585 | 1598 | DFEC | | CALR OTSET | 02326000 |
| 2586 | 159A | 5F00 00B8 | | CALL PUSET | 02327000 |
| 2587* | | | | | 02328000 |
| 2588 | 159E | 3A04 0105 | | INB R0,LEDWD | 02331000 |
| 2589 | 15A2 | A601 | | BITB R0,1 | 02332000 |
| 2590 | 15A4 | EE05 | | JR FULL,NZ | 02333000 |
| 2591* | | | | | 02334000 |
| 2592 | 15A6 | 4D08 0002 | | CLR ACPEN | 02335000 |
| 2593 | 15AA | 4C08 0190 | | CLRB NORST | 02336000 |
| 2594 | 15AE | 9E08 | | RET | 02336100 |
| 2595* | | | | | 02337000 |
| 2596 | 15B0 | 4D04 0002 | FULL | TEST ACPEN | 02338000 |
| 2597 | 15B4 | 9E0E | | RET NZ | 02339000 |
| 2598 | 15B6 | 4D05 0002 0080 | | STRI ACPEN,=H0080 | 02340000 |
| 2599 | 15BC | 4C0B 0190 | | CLRB NORST | 02341000 |
| 2600 | 15C0 | 9E08 | | RET | 02341100 |
| 2601* | | | | | 02342000 |
| 2602 | 15C2 | 4D04 0016 | OTSET | TEST MBRDY | 02343000 |
| 2603 | 15C6 | EEFD | | JR OTSET,NZ | 02344000 |
| 2604 | 15C8 | 5C08 001A | | TESTL NN | 02345000 |
| 2605 | 15CC | EEFA | | JR OTSET,NZ | 02346000 |
| 2606 | 15CE | 9E08 | | RET | 02347000 |
| 2607* | | | | | 02348000 |
| 2608 | 1514 | | PPIK1 | EQU PENNO | 02349000 |
| | | | | | 02349100 |

| Line | Addr | Code | | | Label | Op | Operands | Comment | Seq1 | Seq2 |
|---|---|---|---|---|---|---|---|---|---|---|
| 2609* | 1566 | | | | | | | | | 02349200 |
| 2610 | | | | | | | | | | 02349300 |
| 2611* | | | | | PPIK2 | EQU | HPGO | | 02349400 | |
| 2612 | 15D0 | D06B | | | PPIK3 | CALR | NOPOWER | | | 02349500 |
| 2613 | 15D2 | 5F00 14AC | | | | CALL | SLODN | | | 02349600 |
| 2614 | 15D6 | D055 | | | | CALR | STBGO | | | 02349700 |
| 2615 | 15D8 | D07A | | | | CALR | RESTORP | | | 02349800 |
| 2616 | 15DA | D07A | | | | CALR | SPDUP | | | 02349900 |
| 2617 | 15DC | 9E08 | | | | RET | | | | 02349910 |
| 2618* | | | | | | | | | | |
| 2619 | 15DE | D072 | | | PPIK4 | CALR | NOPOWER | | | 02349930 |
| 2620 | 15E0 | D09R | | | | CALR | SLODN | | | 02349940 |
| 2621 | 15E2 | D03F | | | | CALR | HPGO | | | 02349950 |
| 2622 | 15E4 | D06E | | | | CALR | RESTORP | | | 02349960 |
| 2623 | 15E6 | D080 | | | | CALR | SPDUP | | | 02349970 |
| 2624 | 15E8 | 9E08 | | | | RET | | | | 02349980 |
| 2625* | | | | | | | | | 02349990 | |
| 2627* | | | | | | | | | 02350010 | |
| 2628 | 15EA | 6000 00C8 | | | TCAL1 | LDR | MOTOR,R0 | | | 02350020 |
| 2629 | 15EE | A404 | | | | SBITB | R0,4 | | | 02350030 |
| 2630 | 15F0 | 3A06 0101 | | | | OUTB | R0,STEPR | | | 02350040 |
| 2631 | 15F4 | 4C05 0191 FFFF | | | | STRIB | IGERROR,=HFF | | | 02350050 |
| 2632 | 15FA | 4D05 0068 C180 | | | | STRI | YWANT,=D-16000 | | | 02350060 |
| 2633 | 1600 | 6100 0006 | | | | LD | PEN1,R0 | | | 02350070 |
| 2634 | 1604 | 6F00 0000 | | | | STR | POSTN,R0 | | | 02350080 |
| 2635 | 1608 | 9E08 | | | | RET | | | | 02350090 |
| 2636* | | | | | | | | | | |
| 2637 | 160A | BD00 | | | TCAL2 | LDK | 0,R0 | | | 02350110 |
| 2638 | 160C | D068 | | | | CALR | MINIM | | | 02350120 |
| 2639 | 160E | D10A | | | | CALR | ROTAT | | | 02350130 |
| 2640 | 1610 | D028 | | | | CALR | OTSET | | | 02350140 |
| 2641 | 1612 | 9E08 | | | | RET | | | | 02350150 |
| 2642* | | | | | | | | | 02350160 | |
| 2643 | 1614 | BD01 | | | TCAL3 | LDK | 1,R0 | | | 02350170 |
| 2644 | 1616 | D082 | | | | CALR | PENND | | | 02350180 |
| 2645 | 1618 | 9E08 | | | | RET | | | | 02350190 |
| 2646* | | | | | | | | | 02350200 | |
| 2647*SP | | | | | | | | | 02350210 | |
| 2648* | | | | | | | | | 02351000 | |
| 2649 | 161A | A105 | | | PSSET | LD | R0,R5 | V:=R5 | | 02352000 |
| 2650 | 161C | 9904 | | | | MULT | R0,R4 | V**2:=R5 | | 02353000 |
| 2651 | 161E | 1904 0065 | | | | MULT | =D101,R4 | (3.156*32)=101 | | 02354000 |
| 2652 | 1622 | B34D FFFB | | | | SRAL | R4,5 | | | 02354100 |
| 2653 | 1626 | 1604 0000 0001 | | | | ADDL | =D1,R4 | | | 02354200 |
| 2654 | 162C | 31F6 0002 | | | | LDR | 2(S),R6 | | | 02355000 |
| 2655 | 1630 | A161 | | | | LD | R6,R1 | | | 02355100 |
| 2656 | 1632 | 9B64 | | | | DIV | R6,R4 | | | 02356000 |
| 2657 | 1634 | BD40 | | | | LDK | 0,R4 | | | 02357000 |
| 2658 | 1636 | 1604 0000 0001 | | | | ADDL | =D1,R4 | | | 02357100 |
| 2659 | 163C | 91F4 | | | | PUSHL | R4,S | (V**2/A)3.156=CNST0 | | 02357200 |

```
2660*                                                                          02362000
2661   163E   A115         LD     R1,R5                A:=R5                   02363000
2662   1640   1904 DFCD    MULT   =D776,R4             776=3.031*256           02364000
2663   1644   91F4         CALR   TRUNK                                        02365000
2664   1646   91F4         PUSHL  R4,S                 A(3.031)::=CNST1        02366000
2665*                                                                          02367000
2666   1648   A105         LD     R0,R5                V:=R5                   02368000
2667   164A   1904 DFD2    MULT   =D792,R4             792=3093*256            02369000
2668   164E   DFD2         CALR   TRUNK                V(3.093)::=CNST2        02370000
2669   1650   1204 0000 0001 SUBL =D1,R4                                       02370100
2670   1656   91F4         PUSHL  R4,S                                         02371000
2671*                                                                          02372000
2672   1658   A105         LD     R0,R5                                        02373000
2673   165A   1904 0105    MULT   =D261,R4             261=(1.020*256)         02374000
2674   165E   A116         LD     R1,R6                                        02375000
2675   1660   9B64         DIV    R6,R4                                        02376000
2676   1662   BD40         LDK    0,R4                                         02377000
2677   1664   1604 0000 0001 ADDL =D1,R4               V*1.02/A:=CNST3         02377100
2678   166A   DFE0         CALR   TRUNK                                        02378000
2679   166C   91F4         PUSHL  R4,S                                         02382000
2680*                                                                          02383000
2681   166E   4D04 0142    TEST   UP                   IF PEN IS UP SAVE NEW PEN PARAMETERS 02384000
2682   1672   EE09         JR     PUTTM,NZ             TEMPORARILY             02385000
2683*                                                                          02386000
2684   1674   55F0 012E    POPL   CNST3,S              IF IT IS DOWN SAVE PEN PARAMETERS 02387000
2685   1678   55F0 012A    POPL   CNST2,S              IMMEDIATELY             02388000
2686   167C   55F0 0126    POPL   CNST1,S                                      02389000
2687   1680   55F0 0122    POPL   CNST0,S                                      02390000
2688   1684   E808         JR     DOFOR                                        02391000
2689*                                                                          02392000
2690   1686   55F0 013E    PUTTM  POPL  OLSPD+12,S     TEMPORARY STORE SECTION 02393000
2691   168A   55F0 013A    POPL   OLSPD+8,S                                    02394000
2692   168E   55F0 0136    POPL   OLSPD+4,S                                    02395000
2693   1692   55F0 0132    POPL   OLSPD,S                                      02396000
2694*                                                                          02397000
2695   1696   31F5 0004    DOFOR  LDR   4(S),R5                                02398000
2696   169A   AB50         DEC    R5,1                                         02399000
2697   169C   B359 0005    SLA    R5,5                                         02400000
2698   16A0   6E0D 00F6    STRB   FORCE,R13                                    02401000
2699*                                                                          02402000
2700   16A4   97F4         PUP    R4,S                                         02403000
2701   16A6   A9F3         INC    S,4                                          02404000
2702   16A8   93F4         PUSH   R4,S                                         02405000
2703   16AA   9E08         RET                                                 02406000
2704*                                                                          02407000
2705   16AC   A05D         TRUNK  LDB   R5,R13                                 02408000
2706   16AE   A0C5         LDB    R12,R5                                       02409000
2707   16B0   A04C         LDB    R4,R12                                       02410000
2708   16B2   C400         LDKB   0,R4                                         02411000
2709   16B4   1604 0000 0001 ADDL =D1,R4                                       02411100
2710   16BA   9E08         RET                                                 02412000
```

```
2712*SP
2713*
2714   16BC   5F00 15C2 09C4           JSSET   CALL  OTSET                                                      02413100
2715   16C0   4D05 0154 0008                   STRI  ENDJOY,=D2500                                              02414000
2716   16C6   4D05 0042 FFFF                   STRI  CMTMP,=D8                                                  02415000
2717   16CC   4C05 0187 FFFF                   STRIB JOYUP,=HFF                                                 02415100
2718   16D2   4D05 0016 FFFF                   STRI  MBRDY,=HFFFF                                               02416000
2719   16D8   9E08                              RET                                                             02416100
2720*                                                                                                           02417000
2721   16DA   5400 0060                 SVPOS  LDL   XWANT,R0                                                   02418000
2722   16DE   8D00                              COM   R0                                                        02420000
2723   16E0   8D10                              COM   R1                                                        02421000
2724   16E2   1600 0000 0001                    ADDI  =D1,R0                                                    02422000
2725   16E8   5D00 0029                         STRL  XPRESD,R0                                                 02423000
2726   16EC   5400 0068                         LDL   YWANT,R0                                                  02424000
2727   16F0   8D00                              COM   R0                                                        02425000
2728   16F2   8D10                              COM   R1                                                        02426000
2729   16F4   1600 0000 0001                    ADDI  =D1,R0                                                    02427000
2730   16FA   5D00 002A                         STRL  YPRESD,R0                                                 02428000
2731   16FE   9E08                              RET                                                             02429000
2732*                                                                                                           02430000
2733   1700   6100 0021                 JOYST  LD    LEDST,RQ                                                   02431000   CYCLE MODULO 4 COUNTER,SKIP INPUT
2734   1704   A686                              BITB  R8,6                                                      02432000   IF 1 OR 3
2735   1706   E605                              JR    INPUT,Z                                                   02433000
2736   1708   0008 4040                         ADDB  =H40,R8                                                   02434000
2738*                                                                                                           02435000
2739   1710   E856                              JR    GODOIT                                                    02437000
2739*                                                                                                           02438000
2740   1712   000B 4040                 INPUT  ADDB  =H40,R8                                                    02439000
2741   1716   6F00 0021                         STR   LFDST,R0                                                  02440000
2742*                                                                                                           02441000
2743   171A   BD00                              LDK   0,R0                                                      02442000   IF S=1 X AXIS
2744   171C   ED11                              JR    YAXIS,P                                                   02443000   IF S=0 Y AXIS
2745*                                                                                                           02444000
2746   171E   210F 016E                 XAXIS  LD    =LYOFX,R14                                                 02445000   OTHER
2747   1722   210D 0156                         LD    =LXVALUE1,R13                                             02446000   VALUE1; 2(R13)=INTGRAT
2748   1726   210C 015E                         LD    =LXOFX,R12                                                02447000   BIG
2749   172A   210B 0166                         LD    =LXOFY,R11                                                02448000   SMALL
2750   172E   210A 0060                         LD    =LXWANT,R10                                               02449000   WANT
2751   1732   2109 0027                         LD    =LEUXHI,R9                                                02450000   HILIM
2752   1736   2108 0025                         LD    =LEUXLO,R8                                                02451000   LOLIM
2753   173A   6008 00C6                         LDB   MCNTR,R8                                                  02452000   CENTER
2754   173E   E810                              JR    READY                                                     02453000
2755*                                                                                                           02454000
2756   1740   210E 0166                 YAXIS  LD    =LXOFY,R14                                                 02455000   OTHER
2757   1744   210D 015A                         LD    =LYVALUE1,R13                                             02456000   VALUE1; 2(R13)=INTGRAT
2758   1748   210C 0176                         LD    =LYOFY,R12                                                02457000   BIG
2759   174C   210B 016E                         LD    =LYOFX,R11                                                02458000   SMALL
2760   1750   210A 0068                         LD    =LYWANT,R10                                               02459000   WANT
2761   1754   2109 0028                         LD    =LEUYHI,R9                                                02460000   HILIM
```

| | | | | | |
|---|---|---|---|---|---|
| 2762 | 1758 | 2108 0026 | | LD | =LEDYLO,R8 | 02461000 |
| 2763 | 175C | 6008 00C7 | | LDB | PCNTR,R8 | 02462000 |
| 2764* | | | | | LOLIM | 02463000 |
| 2765 | 1760 | DF88 | READY | CALR | MAKEV CENTER | 02464000 |
| 2766* | | | | | | 02465000 RETURNS VALUE IN R0 |
| 2767 | 1762 | 8D14 | | TEST | R1 | 02466000 |
| 2768 | 1764 | ED01 | | JR | PLUSSVL,P | 02467000 |
| 2769* | | | | | | 02468000 |
| 2770 | 1766 | 8D02 | | NEG | R0 | 02469000 NEGATE VALUE |
| 2771* | | | | | | 02470000 |
| 2772 | 1768 | 0BD0 | PLUSSVL | CMP | (R13),R0 | 02471000 |
| 2773 | 176A | E60B | | JR | MAKEINC,Z | 02472000 |
| 2774* | | | | | | 02473000 IF VALUE=VALUE1, A=0 |
| 2775 | 176C | E105 | | JR | JSMALER,LT | 02474000 |
| 2776* | | | | | | 02475000 |
| 2777 | 176E | 29D0 | LARGER | INC | (R13),1 | 02476000 VALUE=VALUE1+1 |
| 2778 | 1770 | 0BD0 | | CMP | (R13),R0 | 02477000 |
| 2779 | 1772 | E606 | | JR | THISVAL,Z | 02478000 |
| 2780 | 1774 | 29D1 | | INC | (R13),2 | 02479000 |
| 2781 | 1776 | E804 | | JR | THISVAL | 02480000 |
| 2782* | | | | | | 02481000 |
| 2783 | 1778 | 2BD0 | JSMALER | DEC | (R13),1 | 02482000 VALUE=VALUE1-1 |
| 2784 | 177A | 0BD0 | | CMP | (R13),R0 | 02483000 |
| 2785 | 177C | E601 | | JR | THISVAL,Z | 02484000 |
| 2786 | 177E | 2BD1 | | DEC | (R13),2 | 02485000 |
| 2787 | 1780 | 21D0 | THISVAL | LD | (R13),R0 | 02486000 |
| 2788* | | | | | | 02487000 SAVE VALUE IN R0 |
| 2789 | 1782 | 6107 018A | MAKEINC | LD | JOYBC,R7 | 02488000 |
| 2790 | 1786 | 9906 | | MULT | R0,R6 | 02489000 |
| 2791 | 1788 | B147 | | EXTSL | R4 | 02490000 |
| 2792 | 178A | DFA2 | | CALR | SRAQ8 | 02491000 |
| 2793 | 178C | 1DC4 | | STRL | (R12),R4 | 02492000 |
| 2794 | 178E | 5DC6 0004 | | STRL | 4(R12),R6 | 02493000 |
| 2795* | | | | | | 02494000 BIG=JOYBC*VALUE |
| 2796 | 1792 | 6107 0188 | | LD | JOYSC,R7 | 02495000 |
| 2797 | 1796 | 9906 | | MULT | R0,R6 | 02496000 |
| 2798 | 1798 | 6707 0021 | | BIT | LEDST,7 | 02497000 |
| 2799 | 179C | E605 | | JR | NOINV,Z | 02498000 |
| 2800 | 179E | 8D60 | | COM | R6 | 02499000 |
| 2801 | 17A0 | 8D70 | | COM | R7 | 02500000 |
| 2802 | 17A2 | 1606 0000 0001 | | ADDL | =D1,R6 | 02501000 |
| 2803 | 17A8 | B147 | | EXTSL | R4 | 02502000 |
| 2804 | 17AA | DFB2 | NOINV | CALR | SRAQ8 | 02503000 |
| 2805 | 17AC | 1DE4 | | STRL | (R14),R4 | 02504000 |
| 2806 | 17AE | 5DE6 0004 | | STRL | 4(R14),R6 | 02505000 |
| 2807* | | | | | | 02506000 OTHER=JOYSC*VALUE |
| 2808 | 17B2 | DF4A | | CALR | HARDCLIP | 02507000 VMAX RETURNED IN R1,PROBLEM IN R0 |
| 2809 | 17B4 | DF2E | | CALR | OFFAXIS | 02507100 CHECK OFF AXIS MOVE COMPONENT |
| 2810 | 17B6 | 5D00 01BC | | STRL | LASTPRO,R0 | 02507200 SAVE PROBLEM AND VMAX AS LASTPRO&LASTVM |
| 2811 | 17BA | DF1A | | CALR | DOEDGE | 02508000 LIMIT MOVE COMPONENT SIZE |

```
2812  17BC                      CALR  DEE3                                              02508100
2813*                                                                                   02509000  XWANT=XWANT+XOFX+XOFY
2814  17BE  5400 0060    GODNIT LDL   XWANT,R0                                          02510000
2815  17C2  5402 0064           LDL   XWANT+4,R2                                        02511000
2816  17C6  5404 015E           LDL   XOFX,R4                                           02512000
2817  17CA  5406 0162           LDL   XOFX+4,R6                                         02513000
2818  17CE  DFCA                CALR  ADDQUAD                                           02514000
2819  17D0  5404 0166           LDL   XOFY,R4                                           02515000
2820  17D4  5406 016A           LDL   XOFY+4,R6                                         02516000
2821  17D8  DFCD                CALR  ADDQUAD                                           02517000
2822  17DA  5D00 0060           STRL  XWANT,R0                                          02518000
2823  17DE  5D02 0064           STRL  XWANT+4,R2                                        02519000
2824  17E2  5D00 007E           STRL  XEND,R0                                           02520000
2825*                                                                                   02521000  YWANT=YWANT+YOFX+YOFY
2826  17E6  5400 0068           LDL   YWANT,R0                                          02522000
2827  17EA  5402 006C           LDL   YWANT+4,R2                                        02523000
2828  17EE  5404 016E           LDL   YOFX,R4                                           02524000
2829  17F2  5406 0172           LDL   YOFX+4,R6                                         02525000
2830  17F6  DFDC                CALR  ADDQUAD                                           02526000
2831  17F8  5404 0176           LDL   YOFY,R4                                           02527000
2832  17FC  5406 017A           LDL   YOFY+4,R6                                         02528000
2833  1800  DFE1                CALR  ADDQUAD                                           02529000
2834  1802  5D00 0068           STRL  YWANT,R0                                          02530000
2835  1806  5D02 006C           STRL  YWANT+4,R2                                        02531000
2836  180A  5D00 0082           STRL  YEND,R0                                           02532000
2837*                                                                                   02533000
2838  180E  6100 0021           LD    LEDST,R0                                          02534000
2839  1812  8D00                COM   R0                                                02535000
2840  1814  A101                LD    R0,R1                                             02536000
2841  1816  0608 C0C0           ANDB  =HC0,R8                                           02537000
2842  181A  3A86 010D           OUTB  R8,KEYOT                                          02538000
2843  181E  3A04 010B           INB   R0,KEYIN                                          02539000
2844  1822  3A96 010D           OUTB  R9,KEYOT                                          02540000
2845  1826  8C04                TESTB R0                                                02541000
2846  1828  BD00                LDK   0,R0                                              02542000
2847  182A  A101                LD    R0,R1                                             02543000
2848  182C  EE30                JR    QUIT,NZ                                           02544000
2849*                                                                                   02572000
2850  182E  5400 001A    RESTR  LDL   NN,R0                                             02573000
2851  1832  1600 0000 0001      ADDL  =D1,R0                                            02574000
2852  1838  5D00 001A           STRL  NN,R0                                             02575000
2853  183C  5E08 08D0           JP    RETURN                                            02576000
2854*                                                                                   02577000
2855  1840  9662         ADDQUAD ADDL R6,R2                                             02578000
2856  1842  B551                ADC   R5,R1                                             02579000
2857  1844  B540                ADC   R4,R0                                             02580000
2858  1846  9E08                RET                                                     02581000
2859*                                                                                   02582000
2860  1848  A154         SRA08  LD    R5,R4                                             02583000
2861  184A  A165                LD    R6,R5                                             02584000
2862  184C  A176                LD    R7,R6                                             02585000
```

```
2863    184E    8D70            LDK     0,R7                                                        02586000
2864    1850    9E08            RET                                                                 02587000
2865*sp                                                                                             02587100
2866*                                                                                               02588000
2867*           SUBROUTINE TO READ JOYSTICK ADC AND FIND A MOVE SPEED                               02589000
2868*           FOR THE REST OF THE CODE TO PROCESS AND CALCULATE A MOVE                            02590000
2869*                                                                                               02591000
2870*                                                                                               02592000
2871*           MAGNITUDE IN R0,SIGN IN R1                                                          02593000
2872*                                                                                               02594000
2873*                                                                                               02595000
2874    1852    3A94 0105   MAKEV   INB     R9,LEDWD                                                02595100
2875    1856    A697            BITB    R9,7                                                        02595200
2876    1858    E61A            JR      QUIT,Z      CHECK OSHA LID; QUIT IF IT IS UP                02595300
2877*                                                                                               02595400
2878    185A    3A94 0107       INB     R9,JOYIN                                                    02596000
2879    185E    A001            LDR     R0,R1                                                       02597000
2880    1860    3A96 0107       OUTB    R9,JOYIN    BEGIN NEXT CONVERSION                           02598000
2881    1864    8301            SUB     R0,R1                                                       02599000
2882    1866    A110            LD      R1,R0                                                       02600000
2883    1868    BD10            LDK     0,R1        VALUE=(JOYIN)-CENTER                            02601000
2884    186A    8D04            TEST    R0                                                          02602000
2885    186C    E902            JR      PLUSVAL,GE  !MAGNITUDE! AND FIX SIGN                        02603000
2886*                                                                                               02604000
2887    186E    8D10            COM     R1                                                          02605000
2888    1870    8D02            NEG     R0                                                          02606000
2889*                                                                                               02607000
2890    1872    0B00 0008   PLUSVAL CMP     =D8,R0                                                  02608000
2891    1876    E92C            JR      OUTDEAD,GE  DEADBAND 0-8                                    02609000
2892*                                                                                               02610000
2893    1878    6B00 0154       DEC     ENDJOY,1    CODE FOR DEADBAND                               02611000
2894    187C    BD00            LDK     0,R0                                                        02612000
2895    187E    A101            LD      R0,R1       MAGNITUDE=0, SIGN=PLUS                          02613000
2896    1880    E106            JR      QUIT,LT                                                     02613100
2897    1882    4DD4 0002       TEST    2(R13)                                                      02614000
2898    1886    9E02            RET     LE                                                          02615000
2899    1888    6BD1 0002       DEC     2(R13),2                                                    02615100
2900    188C    9E08            RET                                                                 02615200
2901*                                                                                               02616000
2902    188E    9200        QUIT    SUBL    R0,R0                                                   02616100
2903    1890    6E00 0186       STRB    JSFLG,R0                                                    02617000
2904    1894    5D00 015A       STRL    XVALUE1,R0  CODE TO QUIT JOYSTICK MODE                      02617100
2905    1898    5D00 015E       STRL    YVALUE1,R0                                                  02617200
2906    189C    5D00 0162       STRL    XOFX,R0                                                     02617300
2907    18A0    5D00 0176       STRL    XOFX+4,R0                                                   02617400
2908    18A4    5D00 017A       STRL    YOFY,R0                                                     02617500
2909    18A8    5D00 0166       STRL    YOFY+4,R0                                                   02617600
2910    18AC    5D00 016A       STRL    XOFY,R0                                                     02617700
2911    18B0    5D00 016A       STRL    XOFY+4,R0                                                   02617800
2912    18B4    5D00 016E       STRL    YOFX,R0                                                     02617900
```

```
2913  18B8  5D00 0172              STRL   YOFX+4,R0                                           02617910
2914  18BC  5D00 001A              STRL   NN,R0                                               02618000
2915  18C0  6F00 0016              STR    MRDY,R0                                             02619000
2916  18C4  6F00 0070              STR    CMAND,R0                                            02620000
2917  18C8  6E00 0187              STR    JOYUP,R0                                            02620100
2918  18CC  5E08 09E0              STRB   IGNOR                                               02621000
2919*                              JP                                                         02622000
2920  18D0  4D05 0154 09C4 OUTDEAD STR1   ENDJOY,=D2500  IF JOYSTICK MOVED RESET QUIT         02623000
2921  18D6  0B00 003C              CMP    =D60,R0        COUNTER                              02624000
2922  18DA  E907                   JR     BIGR60,GE      8-60 VALUE=1                         02625000
2923*                                                                                         02626000
2924  18DC  BD01                   LDK    1,R0                                                02627000
2925  18DE  4DD4 0002              TEST   2(R13)                                              02628000
2926  18E2  9F02                   RET    LE                                                  02629000
2927  18E4  6BD1 0002              DEC    2(R13)                                              02629100
2928  18E8  9F08                   RET                                                        02629200
2929*                                                                                         02630000
2930  18EA  0B00 005A       BIGR60 CMP    =D90,R0                                             02631000
2931  18EE  E907                   JR     BIGEST,GE      IF 60-90 VALUE=10                    02632000
2932*                                                                                         02633000
2933  18F0  BD0A                   LDK    10,R0                                               02634000
2934  18F2  4DD4 0002              TEST   2(R13)                                              02635000
2935  18F6  9F02                   RET    LE                                                  02636000
2936  18F8  6BD1 0002              DEC    2(R13)                                              02636100
2937  18FC  9E08                   RET                                                        02636200
2938*                                                                                         02637000
2939  18FE  69D0 0002       BIGEST INC    2(R13),1       IF >90 INCREASE SPEED WITH TIME      02638000
2940  1902  61D0 0002              LD     2(R13),R0                                           02639000
2941  1906  B309 FFFF              SRA    R0,1                                                02640000
2942  190A  0100 000A              ADD    =D10,R0        VALUE=INTGRAT/2+10                   02641000
2943  190E  0B00 015E              CMP    =D350,R0                                            02642000
2944  1912  9F02                   RET    LE             IF VALUE >350, VALUE=350             02643000
2945  1914  2100 015E              LD     =D350,R0                                            02644000
2946  1918  4DD5 0002 02BC         STRI   2(R13),=D700                                        02644100
2947  191E  9E08                   RET                                                        02645000
2948*                                                                                         02646000
2949*        SUBROUTINE TO CHECK HARDCLIP LIMITS AND MANUFACTURE A                             02647000
2950*        VMAX TO PREVENT GOING OFF OF THE PAPER                                            02648000
2951*                                                                                         02649000
2952*        PROBLEM IS IN R0:                                                                 02650000
2953*                =-1 IF TOO LOW                                                            02651000
2954*                =0  IF NO PROBLEM                                                         02652000
2955*                =1  IF TOO HIGH                                                           02653000
2956*                                                                                         02654000
2957*        VMAX IN R1                                                                        02655000
2958*                                                                                         02656000
2959  1920  1492           HARDCLIP LDL   (R9),R2        MARGIN=HILIM-WANT                    02657000
2960  1922  1082                   CMPL   (R8),R2                                             02657100
2961  1924  E617                   JR     ZERO,EQ        IF HILIM=LOLIM DO NOT MOVE           02657200
2962  1926  12A2                   SUBL   (R10),R2                                            02658000
```

```
2963*                                                                02660000
2964   1928   8D10            LDK    0,R1                            02661000
2965   192A   BD01            LDK    1,R0                            02662000
2966   192C   9E02            RET    LE                              
2967*                                                                02663000
2968   192E   1002 0000 1388  CMPL   =D5000,R2    IF MARGIN<=0, VMAX=0,PROBLEM=1  02664000
2969   1934   E20A            JR     CALMAX,LE                       02665000
2970*                                                                
2971   1936   8D02            NEG    R0           IF MARGIN<=5000, CALCULATE VMAX  02666000
2972*                                                                
2973   1938   1482            LDL    (R8),R2      PROBLEM=-1         02667000
2974   193A   12A2            SUBL   (R10),R2                        02668000
2975*                                                                
2976   193C   9E09            RET    GE           MARGIN=LOLIM-WANT  02669000
                                                                     02670000
2977*                                                                
2978   193E   1002 FFFF EC78  CMPL   =D-5000,R2   IF MARGIN>0,VMAX=0,PROBLEM=-1  02671000
2979   1944   EA02            JR     CALMAX,GT                       02672000
                                                                     02673000
2980*                                                                
2981   1946   A110            LD     R1,R0        IF MARGIN>-5000,PROBLEM=-1  02674000
2982   1948   9E08            RET                 CALCULATE VMAX     02675000
2983*                                                                
2984   194A   B32D FFFB  CALMAX  SRAL  R2,5                          02676000
2985   194E   A131            LD     R3,R1        IF NOT CLOSE TO EITHER EDGE,  02677000
2986   1950   8101            ADD    R0,R1        PROBLEM=0          02678000
2987   1952   9E08            RET                                    02679000
2988   1954   BD00       ZERO  LDK   0,R0         VMAX=.03125*MARGIN+PROBLEM  02680000
2989   1956   BD11            LDK    1,R1                            02681000
2990   1958   9E08            RET                                    02682000
2991*                                                                02683000
2992*                                                                02683001
2993* SUBROUTINE TO LIMIT THE OFFAXIS MOVE COMPONENT (OTHER)          02683002
2994* IN AXIS ALIGNED MOVES                                           02683003
2995*                                                                
2996*                                                                
2997   195A   6103 018E  OFFAXIS  LD  LASTVM,R3                      02683010
2998   195E   BD40            LDK    0,R4                            02683020
2999   1960   A145            LD     R4,R5                           02683030
3000   1962   B339 FFFE       SRA    R3,2                            02683040
3001   1966   B12A            EXTS   R2                              02683050
3002*                                                                02683060
3003   1968   4D04 018C       TEST   LASTPRO                         02683070
3004   196C   9E06            RET    Z                               02683071
3005*                                                                02683072
3006   196E   E506            JR     MPROB,M                         02683080
3007*                                                                02683090
3008   1970   10E2            CMPL   (R14),R2                        02683100
3009   1972   9E0A            RET    GT                              02683110
3010*                                                                02683120
3011   1974   1DE2            STRL   (R14),R2                        02683130
3012   1976   5DE4 0004       STRL   4(R14),R4                       02683140
3013   197A   9E08            RET                                    02683150
                                                                     02683160
                                                                     02683170
                                                                     02683180
                                                                     02683190
                                                                     02683191
                                                                     02683200
```

```
3014*                                                                                02683220
3015    197C    10E2            MPROB   CMPL    (R14),R2                             02683230
3016    197E    9E01                    RET     LT                       02683210
3017*                                                                                02683250
3018    1980    1DE2                    STRL    (R14),R2                             02683251
3019    1982    5DE4    0004            STRL    4(R14),R4                02683240    02683260
3020    1986    9E08                    RET
3021*                                                                                02684000
3022*           SUBROUTINE TO MODIFY MOVE COMPONENTS SO THAT THE JOYSTICK            02685000
3023*           WILL NOT RUN OFF THE EDGE OF THE PAPER.  USES VMAX IN                02686000
3024*           RO, SIGN IN R1                                           02684000    02687000
3025*                                                                    02685000    02688000
3026*                                                                    02686000    02689000
3027*                                                                    02687000    02690000
                                                                         02688000
                                                                         02689000
                                                                         02690000
3028    1988    8D20            DOEDGE  LDK     0,R2                                 02691000
3029    198A    A123                    LD      R2,R3                                02692000
3030*                                                                    02693000
3031    198C    8D04            NONCOM  TEST    R0                       02694000    02694000
3032    198E    EE03                    JR      LIMITIT,NZ   KEEP A "0" IN R2        02695000
3033    1990    8D14                    TEST    R1                                   02695100
3034    1992    EF28                    JR      NOMOVE,NZ                            02695200
3035    1994    9E08                    RET                                          02695300
3036*                                                                    02695400
3037    1996    B10A            LIMITIT EXTS    R0           IF PROBLEM<>0, LIMIT THE V'S    02696000
3038    1998    E50B                    JR      TOOLOW,M     IF PROBLEM=0 AND VMAX<>0 NO MOVE 02697000
3039*                                                                    02698000   IF PROBLEM=0 AND VMAX=0 NO LIMIT
3040    199A    10C0            TOOHIGH CMPL    (R12),R0                             02699000
3041    199C    EA03                    JR      HIGHAX,GT    MAKE VMAX DOUBLE  02695400      02700000
3042*                                                                                02701000
3043    199E    1DC0                    STRL    (R12),R0     IF BIG IS TOO BIG USE VMAX FOR BIG  02702000
3044    19A0    5DC2    0004            STRL    4(R12),R2                            02703000
3045*                                                         USE VMAX FOR BIG       
3046    19A4    6707    0021    HIGHAX  BIT     LEDST,7                  02704000
3047    19A8    EE0D                    JR      MAXSMAL,NZ   GO TO MAXSMAL IF X AXIS          02705000
3048*                                                                                02706000
3049    19AA    8D12                    NEG     R1                       02707000
3050    19AC    B10A                    EXTS    R0
3051    19AE    EB12                    JR      MINSMAL
3052*                                                                                02708000
3053    19B0    10C0            TOOLOW  CMPL    (R12),R0                             02709000
3054    19B2    E103                    JR      LOWMAX,LT                            02710000
3055*                                                                    02711000
3056    19B4    1DC0                    STRL    (R12),R0                             02712000
3057    19B6    5DC2    0004            STRL    4(R12),R2                            02713000
3058*                                                                                
3059    19BA    6707    0021    LOWMAX  BIT     LEDST,7                  02714000
3060    19BE    EE0A                    JR      MINSMAL,NZ   IF BIG IS TOO SMALL USE VMAX    02715000
3061*                                                                                02716000
3062    19C0    8D12                    NEG     R1                       02717000    02718000
3063    19C2    B10A                    EXTS    R0                                   02719000
                                                                         02720000    02721000
                                                                                     02722000
```

```
3064*                                                                              02724000
3065  19C4  B30D FFFE        MAXSMAL  SRAL   R0,2                         02723000  02725000
3066  19C8  10B0                      CMPL   (R11),R0                               02726000
3067  19CA  9E0A                      RET    GT       IF VMAX/4 > SMALL, SMALL=VMAX/4
3068*                                                                              02728000
3069  19CC  1DB0                      STRL   (R11),R0                              02729000
3070  19CE  5DB2 0004                 STRL   4(R11),R2                             02729010
3071  19D2  9E08                      RET             SMALL=VMAX/4         02727000
3072*                                                                              02732000
3073  19D4  B30D FFFE        MINSMAL  SRAL   R0,2                         02729410  02733000
3074  19D8  10B0                      CMPL   (R11),R0                               02734000
3075  19DA  9E01                      RET    LT       IF VMAX/4 < SMALL, SMALL=VMAX/4
3076*                                                                              02736000
3077  19DC  1DB0                      STRL   (R11),R0                              02737000
3078  19DE  5DB2 0004                 STRL   4(R11),R2                              02738000
3079  19E2  9E08                      RET             SMALL=VMAX/4         02735000
3080*                                                                              02738200
3081  19E4  1DB2             NOMOVE   STRL   (R11),R2                     02738100  02738300
3082  19E6  5DB2 0004                 STRL   4(R11),R2                              02738400
3083  19EA  1DC2                      STRL   (R12),R2                               02738500
3084  19EC  5DC2 0004                 STRL   4(R12),R2                              02738600
3085  19EE  1DE2                      STRL   (R14),R2                               02738700
3086  19F2  5DE2 0004                 STRL   4(R14),R2                              02738800
3087  19F6  9E08                      RET
3088*                                                                    02738801
3089*          SUBROUTINE TO STOP OFFAXIS COMPONENT OF MOVE WHEN          02738802
3090*          MAJOR COMPONENT IS CLOSE TO EDGE                           02738803
3091*                                                                    02738804
3092*                                                                    02738805
3093*                                                                    02738806
3094  19F8  14C0             NODRIFT  LDL    (R12),R0                               02738807
3095  19FA  BD20                      LDK    0,R2                                   02738808
3096  19FC  A123                      LD     R2,R3                                  02738809
3097  19FE  9C08                      TESTL  R0                                     02738810
3098  1A00  E508                      JR     MINUSBG,M                              02738811
3099*                                                                    02738812
3100  1A02  1CE8                      TESTL  (R14)                                  02738813
3101  1A04  ED10                      JR     HISIDE,P                               02738814
3102*                                                                    02738815
3103  1A06  8D00                      COM    R0                                     02738816
3104  1A08  8D10                      COM    R1                                     02738817
3105  1A0A  1600 0000 0001            ADDL   =D1,R0                                 02738818
3106  1A10  E810                      JR     LOSIDE                                 02738819
3107*                                                                    02738820
3108  1A12  8D20             MINUSBG  COM    R2                                     02738821
3109  1A14  8D30                      COM    R3                                     02738822
3110  1A16  1CE8                      TESTL  (R14)                                  02738823
3111  1A18  E50C                      JR     LOSIDE,M                               02738824
3112*                                                                    02738825
3113  1A1A  8D00                      COM    R0                                     02738826
3114  1A1C  8D10                      COM    R1                                     02738827
```

| | | | | | | |
|---|---|---|---|---|---|---|
| 3115 | 1A1E | 1600 0000 0001 | | ADDL | =D1,R0 | | 02738828 |
| 3116 | 1A24 | E800 | | JR | HISIDE | | 02738829 |
| 3117* | | | | | | | |
| 3118 | 1A26 | 10E0 | HISIDE | CMPL | (R14),R0 | | 02738831 |
| 3119 | 1A28 | 9E0D | | RET | P | | 02738832 |
| 3120 | 1A2A | 1DE0 | | STRL | (R14),R0 | | 02738833 |
| 3121 | 1A2C | 5DE2 0004 | | STRL | 4(R14),R2 | | 02738834 |
| 3122 | 1A30 | 9E08 | | RET | | | 02738835 |
| 3123* | | | | | | | 02738836 |
| 3124 | 1A32 | 10E0 | LOSIDE | CMPL | (R14),R0 | | 02738837 |
| 3125 | 1A34 | 9F05 | | RET | M | | 02738838 |
| 3126 | 1A36 | 1DE0 | | STRL | (R14),R0 | | 02738839 |
| 3127 | 1A38 | 5DE2 0004 | | STRL | 4(R14),R2 | | 02738840 |
| 3128 | 1A3C | 9E08 | | RET | | | 02738841 |
| 3129* | | | | | | | 02739000 |
| 3130 | 1A3E | 3A04 0105 | SAFTY | INB | R0,LEDWD | | 02740000 |
| 3131 | 1A42 | A607 | | BITB | R0,7 | | 02741000 |
| 3132 | 1A44 | 6506 002B | | SBIT | OST,6 | | 02742000 |
| 3133 | 1A48 | 5F06 08D0 | | JP | RETURN,Z | | 02743000 |
| 3134 | 1A4C | 6306 002B | | RBIT | OST,6 | | 02744000 |
| 3135 | 1A50 | 4D08 001A | | CLR | NN | | 02745000 |
| 3136 | 1A54 | 4D08 001C | | CLR | NN+2 | | 02746000 |
| 3137 | 1A58 | E833 | | JR | LRETRN | | 02747000 |
| 3138* | | | | | | | 02748000 |
| 3139 | 1A5A | 7C01 | UNSET | DI | VI | DISABLE INTERRUPTS WHILE LOOKING | 02749000 |
| 3140 | 1A5C | 4D04 0016 | | TEST | MBRDY | AT BUFFER | 02750000 |
| 3141 | 1A60 | E60D | | JR | NOPND,Z | | 02751000 |
| 3142* | | | | | | | 02752000 |
| 3143 | 1A62 | 4D04 0042 | | TEST | CMTMP | IF A MOVE IS PENDING DUMP IT | 02754000 |
| 3144 | 1A66 | EE0A | | JR | NOPND,NZ | BUT ONLY IF IT IS A MOVE | 02755000 |
| 3145* | | | | | | | 02756000 |
| 3146 | 1A68 | 4D08 0016 | | CLR | MBRDY | DUMP BUFFER | 02757000 |
| 3147 | 1A6C | 5400 003A | | LDL | XSTRT,R0 | | 02758000 |
| 3148 | 1A70 | 5D00 007E | | STRL | XEND,R0 | | 02759000 |
| 3149 | 1A74 | 5400 003E | | LDL | YSTRT,R0 | | 02760000 |
| 3150 | 1A78 | 5D00 0082 | | STRL | YEND,R0 | | 02761000 |
| 3151* | | | | | | | 02762000 |
| 3152 | 1A7C | 7C05 | NOPND | EI | VI | | 02763000 |
| 3153 | 1A7E | 5400 007E | | LDL | XEND,R0 | PUT X POSITION IN R0 | 02764000 |
| 3154 | 1A82 | 8D00 | | COM | R0 | | 02765000 |
| 3155 | 1A84 | 8D10 | | COM | R1 | | 02766000 |
| 3156 | 1A86 | 1600 0000 0001 | | ADDL | =D1,R0 | | 02767000 |
| 3157 | 1A8C | 5D00 0029 | | STRL | XPRESD,R0 | | 02768000 |
| 3158 | 1A90 | 5400 0082 | | LDL | YEND,R0 | | 02769000 |
| 3159 | 1A94 | 8D00 | | COM | R0 | | 02770000 |
| 3160 | 1A96 | 8D10 | | COM | R1 | | 02771000 |
| 3161 | 1A98 | 1600 0000 0001 | | ADDL | =D1,R0 | | 02772000 |
| 3162 | 1A9E | 5D00 002A | | STRL | YPRESD,R0 | | 02773000 |
| 3163 | 1AA2 | 9F08 | | RET | | | 02774000 |
| 3164* | | | | | | | 02775000 |

```
3165  1AA4  4D05 00FA 0003  PENUP    STRI  BUTON,=D3
3166  1AAA  E80A                     JR    LRETRN
3167*
3168  1AAC  4D04 00FA       PENAWAY  TEST  BUTON
3169  1AB0  EE07                     JR    LRETRN,NZ
3170  1AB2  4D05 00FA 0002           STRI  BUTON,=D2
3171  1AB8  BD00                     LDK   0,R0
3172  1ABA  A101                     LD    R0,R1
3173  1ABC  5D00 00CC                STRL  LASTMOVE,R0
3174  1AC0  5E08 08D0       LRETRN   JP    RETURN
3175*
3176*SP
3177*
3178********************************************************
3179*
3180*       SUBROUTINES TO CONTROL PINCH WHEELS
3181*
3182********************************************************
3183*
3184*      THIS SUBROUTINE RAISES THE PINCH WHEELS TO
3185*      GET THEM INTO A KNOWN STATE AND THEN LOWERS THEM.
3186*      WHEN THEY ARE NOW JOYSTICK IS INITIALIZED AND THE
3187*      PAPER IS CHECKED. IF THERE IS NO PAPER "PAPER"=0
3188*      IF THERE IS PAPER "PAPER"=-1
3189*
3190  1AC4  4C05 0190 FFFF  CHSET    STRIB NORST,=HFF
3191  1ACA  5400 0106                IDL   INLED,R0
3192  1ACE  1200 0000 FA64           SUBL  =D64100,R0       PARK PEN CARRIAGE OVER
3193  1AD4  91F0                     PUSHL R0,S             PAPER SENSORS
3194  1AD6  51F0 007E                PUSHL XEND,S
3195  1ADA  5F00 01D0                CALL  MOVEA
3196  1ADE  DFE5                     CALR  WHLUP
3197  1AE0  DFEF                     CALR  WHLDN
3198  1AE2  DFDE                     CALR  WHLDN
3199  1AE4  6100 00F2                CALR  JOYCENTR
3200  1AE8  8D04                     LD    PAPER,R0
3201  1AEA  4C08 0190                TEST  R0
3202  1AEE  9E0E                     CLRB  NORST
3203*                                 RET   NZ
3204  1AF0  DFEE                     CALR  WHLUP
3205  1AF2  9E08                     RET
3206*
3207*      THIS SUBROUTINE MOVES THE CARRIAGE TO THE EDGE OF
3208*      THE PAPER AND THEN LOWERS THE GRIT WHEELS AND IMMEDIATELY
3209*      RAISES THEM AGAIN
3210*
3211  1AF4  4C05 0190 FFFF  CLSET    STRIB NORST,=HFF
3212  1AFA  DFFC                     CALR  WHLDN
3213  1AFC  DFF4                     CALR  WHLUP
3214  1AFE  4C08 0190                CLRB  NORST
3215  1B02  9E08                     RET
3216*
```

```
3217  1B04  5F00 009C        WHLDN    CALL  WAIT          THIS SUBROUTINE LOWERS THE PINCH WHEELS        02824000
3218  1B08  4D05 0042 0004            STRI  CMTMP,=D4                                                   02825000
3219  1B0E  4D05 0016 FFFF            STRI  MBRDY,=D-1                                                  02826000
3220  1B14  9E08              RET                                                                       02827000
3221*                                                                                         02828000
3222  1B16  5F00 009C        WHLUP    CALL  WAIT          THIS SUBROUTINE RAISES THE PINCH WHEELS       02829000
3223  1B1A  4D05 0042 0003            STRI  CMTMP,=D3                                                   02830000
3224  1B20  4D05 0016 FFFF            STRI  MBRDY,=D-1                                                  02831000
3225  1B26  9E08              RET                                                                       02832000
3226*                                                                                         02833000
3227  1B28  5F00 009C        JOYCENTR CALL  WAIT                                                        02834000
3228  1B2C  4D08 00BE                 CLR   POINTER                                                     02835000
3229  1B30  4D05 0042 000A            STRI  CMTMP,=D10                                                  02836000
3230  1B36  4D05 0016 FFFF            STRI  MBRDY,=D-1                                                  02837000
3231  1B3C  5F00 009C                 CALL  WAIT                                                        02838000
3232  1B40  9E08              RET                                                                       02839000
3233*                                                                                         02840000
3234  1B42  DFFF             CHKPAPER CAIR  STICKCNTR                                                   02841000
3235  1B44  5F08 0A08                 JP    INRET         SHORT SUBROUTINE TO CALL STICKCNTR            02842000
3236*                                                                                         02843000
3237  1B48  6102 00BE        STICKCNTR LD   POINTER,R2                                                  02844000
3238  1B4C  8122                      ADD   R2,R2                                                       02845000
3239  1B4E  6123 1B58                 LD    STICKLBL(R2),R3                                             02846000
3240  1B52  6900 00BE                 INC   POINTER,1                                                   02847000
3241  1B56  1E38                      JP    (R3)                                                        02848000
3242*                                                                                         02849000
3243  1B58  1R6C             STICKLBL DEF   OPENP       0                                               02850000
3244  1B5A  1B86                      DEF   ATODP       1                                               02851000
3245  1B5C  1B8C                      DEF   OPENM       2                                               02852000
3246  1B5E  1B9C                      DEF   ATODM       3                                               02853000
3247  1B60  1BAA                      DEF   BACKTOP     4                                               02854000
3248  1B62  1BBE                      DEF   READM       5                                               02855000
3249  1B64  1C1C                      DEF   NULSTAT                                                     02856000
3250  1B66  1BE0                      DEF   LEDFRONT    6                                               02857000
3251  1B68  1C1C                      DEF   NULSTAT                                                     02858000
3252  1B6A  1C02                      DEF   LEDBACK     7                                               02859000
3253*                                                                                         02860000
3254  1B6C  6100 0021        OPENP    LD    LEDST,R0      OPEN P AXIS ANALOG SWITCH FOR                 02861000
3255  1B70  0408 C0C0                 ORB   =HC0,R8       JOYSTICK AND WAIT FOR 1 MS                    02862000
3256  1B74  8C80                      CUMB  R8                                                          02863000
3257  1B76  3A86 010D                 OUTB  R8,KEYOT                                                    02864000
3258*                                                                                         02865000
3259  1B7A  6900 001C                 INC   NN+2,1                                                      02866000
3260  1B7E  4D05 00F2 FFFF            STRI  PAPER,=D-1    "PAPER"=-1 UNLESS ONE OF SENSORS             02867000
3261*                                          IS NOT BLOCKED                                 02868000
3262  1B84  9E08              RET                                                                       02869000
3263*                                                                                         02870000
3264  1B86  3A06 0107        ATODP    OUTB  R0,JOYIN      BEGIN P AXIS A TO D                           02871000
3265  1B8A  9E08              RET                                                                       02872000
3266*                                                                                         02873000
3267  1BAC  6100 0021        OPENM    LD    LEDST,R0      OPEN M AXIS ANALOG SWITCH                     02874000
```

```
3268  1B90  0608 3F3F        ANDB    =H3F,R8                        02875000
3269  1B94  8C80             COMB    R8                             02876000
3270  1B96  3A86 010D        OUTB    R8,KEYOT                       02877000
3271  1B9A  9E08             RET                                    02878000
3272*                                          02879000
3273  1B9C  3A04 0107        INB     R0,JOYIN   READ CENTER VALUE FOR P AXIS  02880000
3274  1BA0  6E00 00C7        STRB    PCNTR,R0   AND START M  A TO D CONVERSION 02881000
3275  1BA4  3A06 0107        OUTB    R0,JOYIN                       02882000
3276  1BA8  9E08             RET                                    02883000
3277*                                          02884000
3278  1BAA  6100 0021 BACKTOP LD     LEDST,R0   OPEN P AXIS SWITCH AND         02885000
3279  1BAE  0408 C0C0        ORR     =HC0,R8    INITIALIZE LEDST;S TOP TWO    02886000
3280  1BB2  6F00 0021        STR     LEDST,R0   BITS TO "11"                  02887000
3281  1BB6  8C80             COMB    R8                             02888000
3282  1BB8  3A86 010D        OUTB    R8,KEYOT                       02889000
3283  1BBC  9E08             RET                                    02890000
3284*                                          02891000
3285  1BBE  3A04 0107 READM   INB    R0,JOYIN   READ CENTER VALUE FOR M AXIS  02892000
3286  1BC2  6E00 00C6        STRB    MCNTR,R0   FOR M AXIS AND START P        02893000
3287  1BC6  3A06 0107        OUTB    R0,JOYIN   CONVERSION                    02894000
3288*                                          02895000
3289  1BCA  6000 00C8        LDR     MOTOR,R0   SWITCH PAPER SENSOR TO FROUNT 02896000
3290  1BCE  A406             SBITB   R0,6       SENSOR                        02897000
3291  1BD0  6E00 00C8        STRB    MOTOR,R0                       02898000
3292  1BD4  3A06 0101        OUTB    R0,STEPR                       02899000
3293  1BD8  4D05 00C0 000A   STRI    OTHERPOINT,=D10                02900000
3294  1BDE  9E08             RET                                    02901000
3295*                                          02902000
3296  1BE0  3A04 0105 LEDFRONT INB   R0,LEDWD   READ FROUNT SENSOR            02903000
3297  1BE4  4D05 00C0 000A   STRI    OTHERPOINT,=D10                02904000
3298*                                          02905000
3299  1BEA  6001 00C8        LDR     MOTOR,R1   SWITCH PAPER SENSOR TO BACK   02906000
3300  1BEE  A216             RBITB   R1,6       SENSOR                        02907000
3301  1BF0  6F01 00C8        STRB    MOTOR,R1                       02908000
3302  1BF4  3A16 0101        OUTB    R1,STEPR                       02909000
3303*                                          02910000
3304  1BF8  A604             RBITB   R0,4       IF NO PAPER, "PAPER" = 0      02911000
3305  1BFA  9F06             RET     Z                              02912000
3306*                                          02913000
3307  1BFC  4D08 00F2        CLR     PAPER                          02914000
3308  1C00  9E08             RET                                    02915000
3309*                                          02916000
3310  1C02  HD00             LEDBACK LDK   0,R0                    02917000
3311  1C04  A101             LD      R0,R1                          02918000
3312  1C06  6F00 0016        STR     MBRDY,R0                       02919000
3313  1C0A  5D00 001A        STRL    NN,R0                          02920000
3314*                                          02921000
3315  1C0E  3A04 0105        INB     R0,LEDWD   READ BACK SENSOR             02922000
3316  1C12  A604             RBITB   R0,4                           02923000
```

| | | | | | |
|---|---|---|---|---|---|
| 3317 | 1C14 | 9E06 | | RET | Z | | 02924000 |
| 3318* | | | | | | |
| 3319 | 1C16 | 4D08 00F2 | | CLR | PAPER | IF NO PAPER, "PAPER"=0 | 02925000 |
| 3320 | 1C1A | 9E08 | | RET | | | 02926000 |
| 3321* | | | | | | | 02927000 |
| 3322 | 1C1C | 6B00 00BE | NULSTAT | DEC | POINTER,1 | | 02928000 |
| 3323 | 1C20 | 6B00 00C0 | | DEC | OTHERPOINT,1 | | 02929000 |
| 3324 | 1C24 | 9E0A | | RET | GT | | 02930000 |
| 3325* | | | | | | | 02931000 |
| 3326 | 1C26 | 6900 00BE | | INC | POINTER,1 | | 02932000 |
| 3327 | 1C2A | 9E08 | | RET | | | 02933000 |
| 3328* | | | | | | | 02934000 |
| 3329 | 1C2C | 0000 | | ABS | 0 | | 02950000 |
| 3330 | 1C2E | 0000 | | ABS | 0 | | 02951000 |
| 3331 | 1C30 | 0000 | | ABS | 0 | GROWING ROOM FOR CODE | 02952000 |
| 3332 | 1C32 | 0000 | | ABS | 0 | | 02953000 |
| 3333 | 1C34 | 0000 | | ABS | 0 | | 02954000 |
| 3334 | 1C36 | 0000 | | ABS | 0 | | 02955000 |
| 3335 | 1C38 | 0000 | | ABS | 0 | | 02956000 |
| 3336 | 1C3A | 0000 | | ABS | 0 | | 02957000 |
| 3337 | 1C3C | 0000 | | ABS | 0 | | 02958000 |
| 3338 | 1C3E | 0000 | | ABS | 0 | | 02959000 |
| 3339 | 1C40 | 0000 | | ABS | 0 | | 02960000 |
| 3340 | 1C42 | 0000 | | ABS | 0 | | 02961000 |
| 3341 | 1C44 | 0000 | | ABS | 0 | | 02962000 |
| 3342 | 1C46 | 0000 | | ABS | 0 | | 02963000 |
| 3343 | 1C48 | 0000 | | ABS | 0 | | 02964000 |
| 3344 | 1C4A | 0000 | | ABS | 0 | | 02965000 |
| 3345 | 1C4C | 0000 | | ABS | 0 | | 02966000 |
| 3346 | 1C4E | 0000 | | ABS | 0 | | 02966080 |
| 3347 | 1C50 | 0000 | | ABS | 0 | | 02966090 |
| 3348 | 1C52 | 0000 | | ABS | 0 | | 02966100 |
| 3349 | 1C54 | 0000 | | ABS | 0 | | 02966110 |
| 3350 | 1C56 | 0000 | | ABS | 0 | | 02966120 |
| 3351 | 1C58 | 0000 | | ABS | 0 | | 02966130 |
| 3352* | | | | | | | 02966140 |
| 3353 | 1C5A | 5F08 02CE | SVINI | JP | ASVINI | ENTRY POINT FOR INIT ROUTINE | 02967000 |
| 3354 | 1C5E | | | END | | | 02968000 |
| | | | | | | | 02969000 |

LITERALS ALLOCATED

| | | | |
|---|---|---|---|
| AHSREF 0C46.R | ACALC 026R.R | ACCUM 0004.C | ACLRT 0732.R |
| ACPEN 0007.X | ADDQUAD1B40.R | AFSTFRCFB58.A | AHUNDRD0082.A |
| AHUNDRD0073.A | AJMPTBL000R.R | ALIMT 0246.R | APRELFT0005.A |
| AKM 0C64.R | ARMED 0C8E.R | ASIZE 0005.X | ASVIN1 02CE.R |
| ATDWNBD0005.A | ATEND 12D4.R | ATHUNLD03F2.A | ATLFTHI0005.A |
| ATLFTLO0064.A | ATLFTSH0003.A | ATODM 1B9C.R | ATODP 1B86.R |
| AXDIF 0086.C | AYDIF 008F.C | BACKTOP1BAA.R | BEFOR 0114.C |
| BEGIN 0000.A | BEGINDO0B2E.R | BIGEST 18FE.R | BIGGER 0C24.R |
| BIGK60 18EA.R | BTM1ST 0E04.R | BTM2ND 0E6C.R | BTMNEAROE3A.R |
| BUTON 00FA.C | BWLMT 0110.C | CALMAX 194A.R | CHINT 0B8E.R |
| CHKPAPF1B42.R | CHOSE 09D8.R | CHSET 1AC4.R | CLINT 0B3C.R |
| CLRFG 0023.X | CLSET 1AF4.R | CMAND 0070.C | CMD 002D.X |
| CMTMP 0042.C | CNSTO 0122.C | CNST1 0126.C | CNST2 012A.C |
| CNST3 012F.C | CONTINUOABE.R | CUPA 001B.X | CUPB 001C.X |
| CUPC 001D.X | CUPD 001E.X | CUPE 001F.X | D1 0148.C |
| D1FST 0FER.R | D2 014C.C | D2FST 1034.R | D2SEC 10EE.R |
| DERNC 000C.C | DECEL 084R.R | DEFLT 0116.C | DEL 002C.X |
| DOEDGE 198R.R | DOFUR 1696.R | DOJOY 09CA.R | DRCTN 000A.C |
| EDGE 0A9F.R | EIGHT 0486.R | END 0A14.R | ENDENDS1314.R |
| ENDJOY 0154.C | ENDPT 00D0.C | ENDS 0006.C | ENTX 0A38.R |
| ERRO 1226.R | EUXHI 0027.X | EUXLO 0025.X | EUYHI 0028.X |
| EUYLO 0026.X | EXFLG 0020.X | FINAL 0014.C | FIND1 0CE6.R |
| FIND2 0D3A.R | FINDLOCOD06.R | FIRST 0ADC.R | FIRSTLE000A.A |
| FIXFLA 09EC.R | FLASH 000D.C | FORCE 00F6.C | FOUND 1402.R |
| FRONTLEODCE.R | FSTFRCFE56.A | FTPNL 0922.R | FULL 15B0.R |
| FULLTUR000E.X | FYINIT 0FA6.R | GETBAK11012.R | GETBAK21054.R |
| GETBAK310CC.R | GETOUT 0CC0.R | GLITCH 0952.R | GOBAK 1348.R |
| GODOIT 17BE.R | GOFWD 136A.R | GUTIT 0D42.R | GOTONE 1446.R |
| GRCLR 0024.X | GRITO 00CB.C | HARDCLI1920.R | HIGHAX 19A4.R |
| HIGHL 0A8E.R | HILFT 0A2C.R | HISIDE 1A26.R | HPGO 1566.R |
| HPSET 1582.R | HUNDRDL011C.C | HUNDRDS011E.C | HVPEN 00FE.C |
| IGFRROR0191.C | IGNOR 09E0.R | INIT 0010.C | INITL 0C34.R |
| INITT 13DA.R | INLBL 0C5A.R | INLED 0106.C | INPUT 1712.R |
| INRET 0A08.R | INSPD 0078.R | INTUR 0RE8.R | ITSET 1390.R |
| JOYBC 018A.C | JOYCENT1B28.R | JOYCK 0986.R | JOYIN 0107.A |
| JOYSC 0188.C | JOYST 1700.R | JOYUP 0187.C | JPTBL 0032.X |
| JSFLG 0186.C | JSMALER1778.R | JSSET 16BC.R | JYMIN 09B6.R |
| KEY 0960.R | KEYHI 010F.A | KEYIN 010R.A | KEYOT 010D.A |
| KILLIT 123R.R | KLUGE 002E.X | KWAIT 04DA.R | LARGER 176E.R |
| LASTD1 10A2.R | LASTD2 1112.R | LASTG 0031.X | LASTI 08BC.R |
| LASTK 00F8.C | LASTMOV00CC.C | LASTPR0018C.C | LASTVM 018E.C |
| LEDBACK1C02.R | LEDFL 0022.X | LEDFRON1REO.R | LEDST 0021.X |
| LEDWD 0105.A | LEN 0037.X | LENCK 0019.X | LFTGT 0R4E.R |
| LFTPFN 0A46.R | LFTPN 0000.A | LIFTED00A64.R | LIMITFN0D96.R |
| LIMITIT1996.P | LOC 010C.C | LOCATE 0150.C | LONGER 021A.R |
| LOOPY 0964.R | LUSIDE 1A32.R | LOWL 0AH0.R | LOWMAX 19BA.R |
| LRETRN 1AC0.R | LWRGT 0BA0.R | LWRPEN 0AD8.R | LWRPN 0000.A |

| | | | | | |
|---|---|---|---|---|---|
| MAKEINC | 1782.R | MAKEV | 1852.R | MAPEN | 1428.R | MASK | 00C2.C |
| MAXSMAL | 19C4.X | MBRDY | 0016.C | MBWLM | 0098.R | MCNTR | 00C6.C |
| MHVPF | 0016.X | MIDDLE | 12AA.R | MINT | 1556.R | MINIM | 153E.R |
| MINSMAL | 19D4.R | MINUSBG | 1A12.R | MJOY | 09AC.R | MLAST | 0182.C |
| MOTOR | 00C8.C | MOVE | 0C20.R | MOVEA | 01D0.R | MPROB | 197C.R |
| MSTRL | 0017.X | MUL31 | 02B4.P | MOVEL | 0036.X | NA | 0044.C |
| NALIM | 0018.X | NAMIN | 001A.X | NATMP | 001E.C | ND | 004C.C |
| NDTMP | 0026.C | NEARFND | 12CA.R | NEG | 1356.R | NEG1 | 0A7E.R |
| NEX1 | 0586.P | NP | 001A.C | NN2 | 0146.C | NODRIFT | 19F8.R |
| NOFXP | 112C.R | NGFLA | 09FF.R | NOTNV | 17AB.R | NOLIMT | 0276.R |
| NOMOVE | 19F4.R | NORCOM | 198C.R | NONEG | 127F.R | NOPND | 1A7C.R |
| NOPOWER | 14FC.R | NOPKR | 0080.R | NORML | 132E.R | NORST | 0190.C |
| NOTDIN | 13F2.R | NOTEXP | 0F3A.R | NS | 0048.R | NSTMP | 0022.C |
| NULSTATIC | 1C1C.R | OFF | 1418.R | OFFAXIS | 195A.R | OK | 0598.R |
| OLSED | 0132.C | ON | 13F8.R | OPENM | 1B8C.R | OPENP | 1B6C.R |
| OSHA | 090A.R | OST | 002B.X | OTHERPO | 00C0.C | OTSET | 15C2.R |
| OUT | 1376.R | OUTO | 123A.R | OUTDEAD | 18D0.R | PAINT | 0632.R |
| PAPER | 00F2.C | PARS1 | 05F0.P | PARSR | 06DA.R | PASET | 01AE.R |
| PCN1R | 00C7.C | PDINT | 0000.X | PDSET | 00F0.R | PEN1 | 0006.X |
| PEN2 | 0007.X | PEN3 | 0008.X | PEN4 | 0009.X | PEN5 | 000A.X |
| PEN6 | 000H.X | PEN7 | 000C.X | PEN8 | 000D.X | PENADD | 1522.R |
| PENAWAY1 | AAC.R | PENIO | 00CA.C | PENLF | 0103.A | PENMA | 0001.X |
| PENNO | 1514.R | PENQUIT | OACE.R | PENRETN | OB14.R | PENTU | 0012.C |
| PENUP | 1AA4.R | PJOY | 09B2.R | PLAST | 017E.C | PLOTT | 0712.R |
| PLUSSVL | 1768.R | PLMSVAL | 1872.R | PNTER | 0008.C | POINTER | 00BE.C |
| POS | 1334.R | PUSTN | 0000.C | PPIK1 | 1514.R | PPIK2 | 1566.R |
| PPIK3 | 15D0.R | PPIK4 | 15DE.R | PPSET | 147E.R | PRELFT | 0114.C |
| PRFSL | 07AB.R | PSAP | 0005.A | PSSET | 161A.R | PTIME | 0030.X |
| PUINT | 0000.A | PUSET | 00B8.R | PUSPD | 0088.R | PUTTM | 1686.R |
| OUIT | 188E.R | R0 | 0000.A | R1 | 0001.A | R10 | 000A.A |
| R11 | 000B.A | R12 | 000C.A | R13 | 000D.A | R14 | 000E.A |
| R2 | 0002.A | R3 | 0003.A | R4 | 0004.A | R5 | 0005.A |
| R6 | 0006.A | R7 | 0007.A | R8 | 0008.A | R9 | 0009.A |
| RAM1 | 0033.X | RAM2 | 0034.X | RAM3 | 0035.X | READM | 1BBE.R |
| READY | 1760.R | REEDCHK | 11B2.R | RESTORP | 150A.R | RESTR | 182E.R |
| RETURN | 08D0.R | ROTAT | 125A.R | RSPORT | 0059.A | S | 000F.A |
| SAFTY | 1A3E.R | SECD1 | 1076.R | SECFRCE | FE57.A | SEEK | 0BE2.R |
| SELPN | 12A0.R | SERVO | 04E6.R | SETEND | 0E8C.R | SETLIM | 0F28.R |
| SIZE | 0004.X | SKINT | 1306.R | SLEW | 07FE.R | SLODN | 14AC.R |
| SMALLERO | C2C.R | SNTMP | 0002.C | SORT | 0B00.R | SPDUP | 14E8.R |
| SPSET | 1450.R | SQRT | 003R.X | SRAQB | 1848.R | STARTLO | 0AF6.R |
| STARTSHO | AEF.R | STAT2 | 0144.C | STATE | 00C4.C | STBGO | 152E.R |
| STHLE | 0102.C | STEP | 1324.R | STEPR | 0101.A | STICKCN | 1B48.R |
| STICKLB | 1B58.R | STOP | 0914.R | STRTEND | 0088.A | STRTLFT | 0A52.R |
| STRTSEC | 0B18.R | SVINI | 1C5A.R | SVPOS | 16DA.R | SWCHK | 0BD4.R |
| SWOOP | 0018.C | TABLE | 0000.R | TCAL1 | 15EA.R | TCAL2 | 160A.R |
| TCAL3 | 1614.R | TDOWN | 011A.C | TDWNROT | 011A.C | TDWNLON | 001E.A |
| TDWNSHO | 00F.A | TEMPI | 00D2.C | TEST | 010A.C | THISVAL | 1780.C |
| THOULON | FE58.A | TIME | 00F4.C | TLFTHI | 0120.C | TLFTLON | 0116.C |

| | | | | | | |
|---|---|---|---|---|---|---|
| TLFTSHR | 0118.C | TLONG | 011C.C | TLOW | 0118.C | TOOBIG | 0E2C.R |
| TOOHIGH | 199A.R | TOOLOW | 1980.R | TOP1ST | 0EB2.R | TOP2ND | 0F12.R |
| TOPNEAR | 0EDA.R | TOUT | 08F8.R | TRAP21 | 11BE.R | TRAP22 | 11C2.R |
| TRAP23 | 11C6.R | TRAP24 | 11CA.R | TRAP25 | 11CE.R | TRAP26 | 11D2.R |
| TRAP27 | 11D6.R | TRAP28 | 11FE.R | TRAP29 | 11DA.R | TRAP30 | 11DE.R |
| TRAP32 | 11E2.R | TRAP33 | 11E6.R | TRAP34 | 11EA.R | TRAP35 | 11EE.R |
| TRAP36 | 11F2.R | TRAP37 | 11F6.R | TRAP38 | 11FA.R | TRUNK | 16AC.R |
| TSHORT | 011E.C | TTYP1 | 000F.X | TTYP2 | 0010.X | TTYP3 | 0011.X |
| TTYP4 | 0012.X | TTYP5 | 0013.X | TTYP6 | 0014.X | TTYP7 | 0015.X |
| TURET | 0105.A | TURTI | 00FC.C | TURVA | 0003.X | TYPE | 000E.C |
| UNSET | 1A5A.R | UP | 0142.C | UPA | 0192.C | UPB | 0196.C |
| UPC | 019A.C | UPD | 019E.C | UPE | 01A2.C | UPYORS | 0B20.R |
| URERR | 002F.X | VLIMT | 022A.R | VXMAX | 0096.C | VYMAX | 009F.C |
| WAIT | 009C.R | WHLDN | 1B04.R | WHLUP | 1B16.R | XACCELE | 00AE.C |
| XACCL | 0050.C | XATMP | 002A.C | XAXIS | 171E.R | XCURREN | 00A6.C |
| XDESIRE | 00B6.C | XDONE | 0F7A.R | XEND | 007E.C | XHAVE | 0076.C |
| XINTGT | 0158.C | XIPRT | 0084.A | XLIMIT | 0DAA.R | XLLBL | 0DBE.R |
| XLSFT | 0118.R | XIJFX | 015E.C | XOFY | 0166.C | XUPRT | 0080.A |
| XPRESU | 9029.X | XSTRT | 003A.C | XVALUE | 0156.C | XVINP | 0072.C |
| XWAIT | 0060.C | YACCEL | 00B2.C | YACCL | 0058.C | YATMP | 0032.C |
| YAXIS | 1740.R | YCURREN | 00AA.C | YDESIRE | 00BA.C | YDONE | 1196.R |
| YEND | 0082.C | YHAVE | 007A.C | YINTGT | 015C.C | YIPRT | 0086.A |
| YLIMIT | 0F7C.R | YLLBL | 0F90.R | YOFX | 016E.C | YOFY | 0176.C |
| YOPRT | 0082.A | YPRESD | 002A.X | YSTRT | 003E.C | YVALUE | 1015A.C |
| YVINP | 0074.C | YWANT | 0068.C | ZERO | 1954.R | | |

KSPMAX=2 NSPMAX=2 DSPMAX=483 SSPMAX=29640
LAPSED TIME 2:47
PU TIME 2:30

0 ERRORS

KSPMAX=2 NSPMAX=2 DSPMAX=483 SSPMAX=29640
LAPSED TIME 0:09
PU TIME 0:00

We claim:

1. A pen control apparatus for vertically positioning a pen in a plotter, the apparatus comprising:
 a platen for supporting a recording medium thereon;
 pen carrier means, positionable over the platen, for carrying the pen;
 pen lift means, connectable to the pen carrier means, for selectably vertically positioning the pen carrier means in one of a down position in which the pen is in contact with the recording medium, a short position in which the pen is at a short height over the recording medium and a long position in which the pen is at a long height over the recording medium, the long height being greater than the short height;
 position control means, coupled to the pen lift means, for sensing the vertical position of the pen carrier means;
 measuring means, coupled to the position control means and to the pen carrier means, for measuring a short horizontal distance travelled by the pen carrier means while positioned in the short position;
 processor means, coupled to the pen lift means and to the measuring means, for receiving the measurement of the short horizontal distance from the measuring means and for causing the pen lift means to change the vertical position of the pen carrier means from the short position to the long position if the short horizontal distance exceeds a predetermined critical distance.

2. An apparatus as in claim 1, wherein the short position is the short height above a down vertical position sensed by the position control means during a time in which the pen carrier means was last at the down position.

3. An apparatus as in claim 2, wherein the down vertical position is the vertical position sensed by the position control means just prior to actuation of the pen lift means by the processor means to position the pen carrier means at one of the short and long positions.

4. An apparatus as in claim 3, wherein the critical distance is a horizontal distance in which vertical perturbations in the platen and the recording medium are less than the short height.

5. An apparatus as in claim 4, wherein the critical distance is less than 6 centimeters.

6. An apparatus as in claim 5, wherein the short height is less than 0.64 millimeters.

7. An apparatus as in claim 4, wherein the processor means comprises a microprocessor.

8. An apparatus as in claim 7, wherein the pen lift means comprises a voice coil.

9. An apparatus as in claim 8, wherein the position control means comprises an optical sensor.

10. An apparatus as in claim 9, wherein the long height is substantially a maximum vertical deflection height of the pen carrier means.

11. A method for vertically positioning a plotter pen relative to a platen supporting a recording medium thereon, comprising the steps of:
 determining a horizontal pen movement desired distance; and
 comparing the desired distance to a predetermined critical distance and raising the pen to a short height if the desired distance is less than or equal to the critical distance and raising the pen to a long height if the desired distance is greater than the critical distance.

12. A method as in claim 11, further comprising an initial step of sensing a height of the recording medium.

13. A method as in claim 12, wherein the short and long heights are relative to the sensed height of the recording medium.

14. A method as in claim 13, wherein the predetermined critical distance is a horizontal distance in which vertical perturbations in the platen and the recording medium are less than the short height.

15. A method as in claim 14, wherein the critical distance is a horizontal distance which requires movement of the pen for at least 100 milliseconds.

16. A pen control apparatus for vertically positioning a pen in a plotter, the apparatus comprising:
 a platen for supporting a recording medium thereon;
 pen carrier means, positionable over the platen, for carrying the pen;
 pen lift means, connectable to the pen carrier means, for selectably vertically positioning the pen carrier means in one of a down position in which the pen is in contact with the recording medium, a short position in which the pen is at a short height over the recording medium and a long position in which the pen is at a long height over the recording medium, the long height being greater than the short height;
 position control means, coupled to the pen lift means, for sensing the vertical position of the pen carrier means;
 timing means, coupled to the position control means and to the pen carrier means, for measuring a short time period during which the pen carrier means is positioned in the short position;
 processor means, coupled to the pen lift means and to the measuring means, for receiving the measurement of the short time period from the timing means and for causing the pen lift means to change the vertical position of the pen carrier means from the short position to the long position if the short time period exceeds a predetermined critical time period.

17. An apparatus as in claim 16, wherein the short position is the short height above a down vertical position sensed by the position control means during a time in which the pen carrier means was last at the down position.

18. An apparatus as in claim 17, wherein the down vertical position is the vertical position sensed by the position control means just prior to actuation of the pen lift means by the processor means to position the pen carrier means at one of the short and long positions.

19. An apparatus as in claim 18, wherein the critical time period is less than a period of time in which the pen carrier means could move a horizontal distance in which vertical perturbations in the platen and the recording medium are at least equal to the short height.

20. An apparatus as in claim 19, wherein the critical time period is 100 milliseconds.

21. An apparatus as in claim 20, wherein the short height is less than 0.64 millimeters.

22. An apparatus as in claim 19, wherein the processor means comprises a microprocessor.

23. An apparatus as in claim 22, wherein the pen lift means comprises a voice coil.

24. An apparatus as in claim 23, wherein the position control means comprises an optical sensor.

25. An apparatus as in claim 24, wherein the long height is substantially a maximum vertical deflection height of the pen carrier means.

* * * * *